(12) United States Patent
Akkaya et al.

(10) Patent No.: US 8,542,956 B2
(45) Date of Patent: Sep. 24, 2013

(54) OPTICAL-FIBER-COMPATIBLE ACOUSTIC SENSOR

(75) Inventors: Onur Can Akkaya, Stanford, CA (US); Michel J. F. Digonnet, Palo Alto, CA (US); Onur Kilic, Mountain View, CA (US); Gordon S. Kino, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 236 days.

(21) Appl. No.: 13/047,668

(22) Filed: Mar. 14, 2011

(65) Prior Publication Data

US 2011/0268384 A1    Nov. 3, 2011

Related U.S. Application Data

(60) Provisional application No. 61/314,090, filed on Mar. 15, 2010, provisional application No. 61/331,303, filed on May 4, 2010, provisional application No. 61/382,385, filed on Sep. 13, 2010.

(51) Int. Cl.
  *G02B 6/00* (2006.01)
  *G01B 9/02* (2006.01)
(52) U.S. Cl.
  USPC .................................. 385/12; 356/480
(58) Field of Classification Search
  USPC .................................. 385/12; 356/480
  See application file for complete search history.

(56) References Cited

U.S. PATENT DOCUMENTS

| | | | |
|---|---|---|---|
| 3,831,137 A | 8/1974 | Cuomo | |
| 4,446,543 A | 5/1984 | McLandrich et al. | |
| 4,449,781 A | 5/1984 | Lightstone et al. | |
| 4,519,252 A | 5/1985 | McMahon | |
| 4,525,818 A * | 6/1985 | Cielo et al. | 367/149 |
| 4,911,516 A | 3/1990 | Palfrey et al. | |
| 4,933,545 A * | 6/1990 | Saaski et al. | 250/227.14 |
| 5,000,901 A * | 3/1991 | Iyer et al. | 264/299 |
| 5,039,492 A * | 8/1991 | Saaski et al. | 422/82.09 |

(Continued)

FOREIGN PATENT DOCUMENTS

| | | |
|---|---|---|
| EP | 1 380 861 | 1/2004 |
| EP | 2 434 319 | 3/2012 |

(Continued)

OTHER PUBLICATIONS

PCT International Search Report and Written Opinion, re PCT Application No. PCT/US2011/028407, mailed Nov. 27, 2012.

(Continued)

*Primary Examiner* — Charlie Peng
(74) *Attorney, Agent, or Firm* — Knobbe, Martens, Olson & Bear LLP

(57) ABSTRACT

An acoustic sensor includes a diaphragm having a reflective element. The sensor has an optical fiber positioned relative to the reflective element such that light emitted from the optical fiber is reflected by the reflective element. A first end of the optical fiber and the reflective element form an optical cavity therebetween. The acoustic sensor further includes a structural element mechanically coupled to the diaphragm and the optical fiber. The structural element includes a material having a coefficient of thermal expansion substantially similar to the coefficient of thermal expansion of the optical fiber. For example, the material can be silica.

21 Claims, 43 Drawing Sheets

(56) References Cited

U.S. PATENT DOCUMENTS

| | | | |
|---|---|---|---|
| 5,280,173 A * | 1/1994 | Morse et al. | 250/227.23 |
| 5,311,485 A * | 5/1994 | Kuzmenko et al. | 367/149 |
| 5,488,504 A | 1/1996 | Worchesky et al. | |
| 5,910,286 A | 6/1999 | Lipskier | |
| 6,289,143 B1 | 9/2001 | Berthold et al. | |
| 6,539,136 B1 * | 3/2003 | Dianov et al. | 385/12 |
| 6,717,707 B2 | 4/2004 | Clark | |
| 6,777,244 B2 | 8/2004 | Pepper et al. | |
| 6,798,960 B2 | 9/2004 | Hamada | |
| 6,807,342 B2 | 10/2004 | Fan | |
| 6,822,784 B2 | 11/2004 | Fukshima et al. | |
| 6,885,784 B2 | 4/2005 | Bohnert | |
| 6,925,213 B2 * | 8/2005 | Boyd et al. | 385/12 |
| 7,024,072 B2 | 4/2006 | Chen et al. | |
| 7,054,011 B2 | 5/2006 | Zhu et al. | |
| 7,134,343 B2 | 11/2006 | Suzuki et al. | |
| 7,155,087 B2 | 12/2006 | Suh et al. | |
| 7,173,713 B2 * | 2/2007 | Xu et al. | 356/480 |
| 7,187,816 B2 | 3/2007 | Huang | |
| 7,190,869 B2 | 3/2007 | Jin et al. | |
| 7,193,725 B2 | 3/2007 | Brunfeld et al. | |
| 7,224,465 B2 | 5/2007 | Balachandran et al. | |
| 7,233,729 B2 | 6/2007 | Romagnoli et al. | |
| 7,280,265 B2 | 10/2007 | Miles | |
| 7,283,716 B2 | 10/2007 | Park et al. | |
| 7,308,163 B2 | 12/2007 | Bratkovski et al. | |
| 7,330,277 B2 | 2/2008 | Brunfeld et al. | |
| 7,333,703 B2 | 2/2008 | Hatsuda et al. | |
| 7,474,823 B2 | 1/2009 | Wang et al. | |
| 7,483,144 B2 | 1/2009 | Sanders | |
| 7,489,846 B2 | 2/2009 | Grot et al. | |
| 7,526,148 B2 | 4/2009 | Kilic et al. | |
| 7,545,513 B2 | 6/2009 | Kiesel et al. | |
| 7,619,744 B2 | 11/2009 | Liess | |
| 7,630,589 B2 | 12/2009 | Kilic et al. | |
| 7,751,055 B2 | 7/2010 | Sanders et al. | |
| 7,809,219 B2 | 10/2010 | Kilic et al. | |
| 7,881,565 B2 | 2/2011 | Kilic et al. | |
| 7,940,400 B2 * | 5/2011 | Lopushansky et al. | 356/519 |
| 7,944,567 B2 | 5/2011 | Asano | |
| 7,973,936 B2 | 7/2011 | Dantus | |
| 8,139,227 B2 | 3/2012 | Kilic et al. | |
| 8,160,406 B2 | 4/2012 | Kilic et al. | |
| 8,249,400 B2 | 8/2012 | Kilic et al. | |
| 8,331,741 B2 | 12/2012 | Kilic et al. | |
| 2002/0135863 A1 | 9/2002 | Fukshima et al. | |
| 2002/0159671 A1 * | 10/2002 | Boyd et al. | 385/12 |
| 2004/0008934 A1 | 1/2004 | Takiguchi et al. | |
| 2004/0080726 A1 | 4/2004 | Suh et al. | |
| 2004/0196874 A1 * | 10/2004 | Spiegelberg et al. | 372/6 |
| 2004/0208449 A1 | 10/2004 | Chen et al. | |
| 2004/0228575 A1 | 11/2004 | Kim et al. | |
| 2005/0052724 A1 | 3/2005 | Suzuki et al. | |
| 2005/0062979 A1 * | 3/2005 | Zhu et al. | 356/480 |
| 2005/0169590 A1 | 8/2005 | Alkeskjold | |
| 2005/0175304 A1 | 8/2005 | Romagnoli et al. | |
| 2005/0186117 A1 | 8/2005 | Uchiyama et al. | |
| 2005/0191025 A1 | 9/2005 | Kim et al. | |
| 2005/0200498 A1 | 9/2005 | Gleitman | |
| 2005/0201660 A1 | 9/2005 | Grot et al. | |
| 2005/0237602 A1 | 10/2005 | Yanagisawa | |
| 2006/0024813 A1 | 2/2006 | Warthoe | |
| 2006/0034559 A1 * | 2/2006 | Arias Vidal et al. | 385/13 |
| 2006/0072875 A1 | 4/2006 | Bhagavatula et al. | |
| 2006/0133715 A1 * | 6/2006 | Belleville et al. | 385/13 |
| 2006/0193550 A1 | 8/2006 | Wawro et al. | |
| 2006/0227331 A1 | 10/2006 | Vollmer et al. | |
| 2006/0280403 A1 | 12/2006 | Suh et al. | |
| 2007/0081165 A1 * | 4/2007 | Kilic et al. | 356/477 |
| 2007/0277974 A1 | 12/2007 | Difoggio | |
| 2008/0034866 A1 | 2/2008 | Kilic et al. | |
| 2008/0089645 A1 | 4/2008 | Wang et al. | |
| 2009/0028407 A1 | 1/2009 | Seibel et al. | |
| 2009/0208163 A1 | 8/2009 | Kilic et al. | |
| 2010/0007893 A1 | 1/2010 | Hall | |
| 2010/0092125 A1 | 4/2010 | Kilic et al. | |
| 2011/0041616 A1 | 2/2011 | Kilic et al. | |
| 2011/0268384 A1 | 11/2011 | Akkaya et al. | |
| 2012/0182557 A1 | 7/2012 | Kilic et al. | |

FOREIGN PATENT DOCUMENTS

| | | |
|---|---|---|
| GB | 1 558 689 | 1/1980 |
| JP | 56-081802 | 7/1981 |
| JP | 2002-328243 | 11/2002 |
| JP | 2003-185864 | 7/2003 |
| JP | 2005-045463 | 2/2005 |
| JP | 2005-077711 | 3/2005 |
| JP | 2008-541513 | 11/2008 |
| JP | 2009-535977 | 10/2009 |
| JP | 2010-516124 | 5/2010 |
| WO | WO 2006/092052 | 9/2006 |
| WO | WO 2006/119200 | 11/2006 |
| WO | WO 2007/130152 | 11/2007 |
| WO | WO 2008/086448 | 7/2008 |
| WO | WO 2011/115933 | 9/2011 |

OTHER PUBLICATIONS

PCT International Preliminary Report on Patentability, re PCT Application No. PCT/US2011/028407, issued Dec. 4, 2012.

PCT International Invitation to Pay Additional Fees and Partial Search Report, re PCT Application No. PCT/US2011/028407, mailed Mar. 2, 2012 in 7 pages.

Ackemann, T. et al., "The Gouy phase shift, the average phase lag of Fourier components of Hermite-Gaussian modes and their application to resonance conditions in optical cavities," Opt. Commun., vol. 189, pp. 5-14, 2001.

Akulichev, V.A. et al., "Acoustic cavitation thresholds of sea water in different regions of the world ocean," Acoust. Phys. vol. 51, No. 2, 128-138, 2005.

Andrews, M., et al., A comparison of squeeze-film theory with measurements on a microstructure, Sensors and Actuators A, vol. 36, pp. 79-87, 1993.

Arya, V. et al., "Exact Analysis of the Extrinsic Fabry-Perot Interferometric Optical Fiber Sensor Using Kirchhoff's Diffraction Formalism," Opt. Fiber Technol., vol. 1, pp. 380-384, 1995.

Astratov, V.N., et al., Resonant coupling of near-infrared radiation to photonic band structure waveguides, J. Lightwave Technol., vol. 17, No. 11, 2050-57, 1999.

Baba, K., "Theoretical characteristics of optical polarizing films using oblique metal island films," Proceedings of SPIE, vol. 6116, 611605-1, 2006.

Belleville, C. et al., "White-light interferometric multimode fiber-optic strain sensor," Opt. Lett., vol. 18, No. 1, pp. 78-80, Jan. 1, 1993.

Bergqvist, J., "Finite-element modelling and characterization of a silicon condenser microphone with a highly perforated backplate," Sensors and Actuators A 39, 191-200, 1993.

Bucaro, et al., "Fiber-optic hydrophone," J. Acoust. Soc. Am. vol. 62, No. 5, 1302-04, Nov. 1977.

Bucaro, J.A., et al., Miniature, High Performance, Low-Cost Fiber Optic Microphone, J. Acoust. Soc. Am., vol. 118, No. 3, Part 1, pp. 1406-1413, Sep. 2005.

Callen, et al., "Irreversibility and generalized noise," Phys. Rev. vol. 83, No. 1, 34-40, Jul. 1, 1951.

Chin, K.K. et al "Fabry-Perot diaphragm fiber-optic sensor," Appl. Opt., vol. 46, No. 31, pp. 7614-7619, Nov. 2007.

Chow, Jong H., et al., Ultra Resolution Fiber Sensor Using a Pre-stabilized Diode Laser, Post-deadline CLEO 2005, CPDA9, three pages.

Cole, et al., "Fiber-optic detection of sound," J. Acoust. Soc. Am. vol. 62, 1136-38, Nov. 1977.

Crane, P.H.G., "Method for the calculation of the acoustic radiation impedance of unbaffled and partially baffled piston sources," J. Sound Vib. vol. 5, No. 2, 257-277, 1967.

Dorn, et al., "Sharper focus for a radially polarized light beam," Phys. Rev. Lett., vol. 91, No. 23, 233901-1-233901-4, Dec. 5, 2003.

Eaton, W.P., et al., A new analytical solution for diaphragm deflection and its application to a surface micromachined pressure sensor, Int'l. Conf. on Modeling and Simulation of Microsystems, 1999.

European Examination Report re EP Application No. 06752016.3-1240, dated Dec. 15, 2009.
European Examination Report re EP Application No. 06846402.3-2216, dated Apr. 22, 2010.
European Examination Report and Summons to Attend Oral Proceedings re Application No. 08 713 689.1-2213, dated Oct. 13, 2010.
European Examination Report re Application No. 08 713 689.1-2213, dated Mar. 15, 2010.
Fan, S., et al.: "Analysis of guided resonances in photonic crystal slabs", Phys. Rev. B, vol. 65, p. 235112-1-235112-8, 2002.
Fine, R.A. et al., "Compressibility of water as a function of temperature and pressure," J. Chem. Phys. 59, No. 10, 5529-5536, Nov. 15, 1973.
Furstenau, N. et al., "Extrinsic Fabry-Perot interferometer vibration and acoustic sensor systems for airport ground traffic monitoring," IEE Proc. Optoelectron., vol. 144, No. 3, pp. 134-144, Jun. 1997.
Gabrielson, T.B., "Mechanical-thermal noise in micromachined acoustic and vibration sensors," IEEE Trans. Electron Devices vol. 40, No. 5, 903-909, May 1993.
Gangopadhyay, T.K., et al., Modeling and Analysis of an Extrinsic Fabry-Perot Interferometer Cavity, Appl. Optics, vol. 44, No. 16, pp. 3192-3196, Jun. 1, 2005.
Haakestad, Magnus W., et al., Acousto-Optic Properties of Photonic Crystal Fibers, 2004 IEEE Ultrasonics Symposium, pp. 56-59, 2004.
Han, M. et al., "Exact analysis of low-finesse multimode fiber extrinsic Fabry-Perot interferometers," Appl. Opt., vol. 43, No. 24, pp. 4659-4666, Aug. 20, 2004.
Hirsekorn, M., et al., Modelling and simulation of acoustic wave propagation in locally resonant sonic materials, www.sciencedirect.com, Ultrasonics 42, pp. 231-235, 2004.
Holden, J., "Multiple-beam interferometry: intensity distribution in the reflected system," Proc. Phys. Soc. B, vol. 62, Part 7, pp. 405-417, Jul. 1, 1949.
Homentcovschi, D. et al., "Viscous damping of perforated planar micromechanical structures," Sensors and Actuators A 119, 544-552, 2005.
Homentcovschi, et al., "Modeling of Viscous Damping of Perforated Planar Microstructures. Applications in Acoustics," Journal of the Acoustical Society of America, vol. 116, No. 5, 2939-2947, Nov. 2004.
Hu, Y. et al., "Influence of three-dimensional roughness on pressure-driven flow through microchannels," J. Fluids Eng. 125, 871-879, Sep. 2003.
Japanese Office Action re Japanese Patent Application No. 509229/2008, dated Jul. 26, 2011.
Kadirvel, K., et al., Design and Characterization of MEMS Optical Microphone for Aeroacoustic Measurement, 42nd AIAA Aerospace Science Meeting and Exhibit, Jan. 5-8, 2004, Reno, Nevada.
Kanskar, M., et al., Observation of leaky slab modes in an air-bridged semiconductor waveguide with a two-dimensional photonic lattice, Appl. Phys. Lett., vol. 70, No. 11, p. 1438-40, Mar. 1997.
Karathanos, V., "Inactive Frequency Bands in Photonic Crystals", Journal of Modern Optics, vol. 45, No. 8, pp. 1751-1758, 1998.
Kersey et al.: "Fiber grating sensors", J. Lightwave Tehnol., vol. 15, No. 8, p. 1442-62, Aug. 1997.
Kilic, O. et al., "Analysis of guided-resonance-based polarization beam splitting in photonic-crystal slabs," J. Opt. Soc. Am. A, vol. 25, No. 11, pp. 2680-2692, Nov. 2008.
Kilic, O. et al., "Asymmetrical spectral response in fiber Fabry-Perot interferometers," J. Lightwave Technol. 28, 8 pages, 2009.
Kilic, O. et al., "External fiber Fabry-Perot acoustic sensor based on photonic-crystal mirror," in 18th International Optical Fiber Sensors Conference, Cancun, Mexico, 2006; published in Measurement Science and Technology, vol. 18, pp. 3049-3054, 2007.
Kilic, O. et al., "Fiber-optical acoustic sensor based on a photonic-crystal diaphragm," in 15th International Conference on Solid-State Sensors, Actuators, and Microsystems, Denver, CO, Jun. 21-25, 2009.
Kilic, O. et al., "Photonic crystal slabs demonstrating strong broadband suppression of transmission in the presence of disorders," Opt. Lett. vol. 29, No. 23, 2782-2784, Dec. 1, 2004.

Kilic, O. et al., "Photonic-crystal-diaphragm-based fiber-tip hydrophone optimized for ocean acoustics," in 19th International Optical Fiber Sensors Conference, Perth, Australia, 2008.
Kim, S. et al., "Single-film broadband photonic crystal micro-mirror with large angular range and low polarization dependence," in Conference on Lasers and Electro-Optics (CLEO), Baltimore, MD, CThP7, 2007.
Kim, Y. et al., "Micromachined Fabry-Perot cavity pressure transducer," IEEE Photon. Technol. Lett., vol. 7, No. 12, pp. 1471-1473, Dec. 1995.
Kuhnel, et al., "A silicon condenser microphone with structured back plate and silicon nitride membrane," Sensors and Actuators A, vol. 30, 251-258, 1992.
Kuzmenko, P.J., Experimental Performance of a Miniature Fabry-Perot Fiber Optic Hydrophone, Proceedings of 8th Optical Fiber Sensors Conference, Monterey, California, Jan. 29-31, 1992, pp. 354-357.
Ladabaum, I., et al., Surface micromachined capacitive ultrasonic transducers, Ultrasonics, Ferroelectrics and Frequency Control, IEEE Transactions, vol. 45, No. 3, pp. 678-690, May 1998.
Lee, C.E. et al., "Fiber-optic Fabry-Perot temperature sensor using a low-coherence light source," J. Lightwave Technol., vol. 9, No. 1, pp. 129-134, Jan. 1991.
Lee, C.E. et al., "Interferometric optical fibre sensors using internal mirrors," Electron. Lett., vol. 24, No. 4, pp. 193-194, Feb. 18, 1988.
Levy, et al., "Engineering space-variant inhomogeneous media for polarization control," Opt. Lett., vol. 29, No. 15, 1718-20, Aug. 1, 2004.
Mala, G.M. et al., "Flow characteristics of water in microtubes," Int. J. Heat Fluid Flow 20, 142-148, 1999.
Marcuse, D. et al., "Coupling efficiency of front surface and multilayer mirrors as fiber-end reflectors," J. Lightwave Technol., vol. LT-4, No. 4, pp. 377-381, 1986.
Marcuse, D., "Loss analysis of single-mode fiber splices," Bell Syst. Tech. J., vol. 56, No. 5, pp. 703-718, May-Jun. 1977.
Marin, E., et al., Acoustic modes of a dual-core square-lattice photonic crystal fiber preform, Proc. 27th Eur. Conf. on Opt. Comm. (ECOC'01—Amsterdam), pp. 518-519, 2001.
Mellen, R.H., "The thermal-noise limit in the detection of underwater acoustic signals," J. Acoust. Soc. Am. vol. 24, No. 5, 478-480, Sep. 1952.
Mellow, T. et al., "On the sound field of an oscillating disk in a finite open and closed circular baffle," J. Acoust. Soc. Am. vol. 118, No. 3, Pt. 1, 1311-1325, Sep. 2005.
Morey, W.W. et al., "Multiplexing fiber Bragg grating sensors," Fiber and Integrated Optics, vol. 10, pp. 351-360, 1991.
Murphy, A.K. et al., "Quadrature phase-shifted, extrinsic Fabry-Perot optical fiber sensors," Opt. Lett., vol. 16, No. 4, pp. 273-275, Feb. 15, 1991.
Ochiai, et al., Dispersion relation and optical transmittance of a hexagonal photonic crystal slab, Phys. Rev. B, vol. 63, p. 125107-1-125107-7, 2001.
Pacradouni, et al., Photonic band structure of dielectric membranes periodically textured in two dimensions, Phys. Rev. B, vol. 62, No. 7, p. 4204-07, Aug. 15, 2000.
Paddon et al., Two-dimensional vector-coupled-mode theory for textured planar waveguides, Phys. Rev. B, vol. 61, No. 3, p. 2090-2101, Jan. 15, 2000.
PCT International Search and Written Report re PCT/US2006/016650, dated Oct. 23, 2006.
PCT International Search Report and Written Opinion re / US2008/050677 dated Sep. 12, 2008 issued in the name of The Board of Trustees of the Leland Stanford Junior University.
PCT International Search Report and Written Opinion re US 2006/061356 dated Apr. 27, 2007 issued in the name of The Board of Trustees of the Leland Stanford Junior University.
Pedersen, et al., "On the mechanical behaviour of thin perforated plates and their application in silicon condenser microphones," Sens. Actuators A, vol. 54, 499-504, 1996.
Petuchowski, S. et al., "A sensitive fiber-optic Fabry-Perot interferometer," IEEE J. Quantum Electron., vol. 17, No. 11, pp. 2168-2170, Nov. 1981.

Rands, C. et al., "Characterization of transition to turbulence in microchannels," Int. J. Heat Mass Transfer 49, 2924-2930, 2006.

Sharp, K.V. et al., "Transition from laminar to turbulent flow in liquid filled microtubes," Exp. Fluids 36, 741-747, 2004.

Sharpe, W.N. et al., "Effect of specimen size on Young's modulus and fracture strength of polysilicon," J. Micromech. Syst. vol. 10, No. 3, 317-326, Sep. 2001.

Škvor, "On acoustical resistance due to viscous losses in the air gap of electrostatic transducers," Acustica, vol. 19, 295-299, 1967-1968.

Spillman, W.B., Jr., et al., Moving Fiber-Optic Hydrophone, Optics Lett., vol. 5, No. 1, pp. 30-31, Jan. 1980.

Starr, J.B., "Squeeze-film damping in solid-state accelerometers," in IEEE Workshop in Solid-State Sensor and Actuator 4th Technical Digest, pp. 44-47, 1990.

Suh, W., et al., Displacement-sensitive photonic crystal structures based on guided resonance in photonic crystal slabs, Appl. Phys. Lett., vol. 82, No. 13, pp. 1999-2001, Mar. 31, 2003.

Szymanski, M.D. et al., "Killer whale (*Orcinus orca*) hearing: Auditory brainstem response and behavioral audiograms," J. Acoust. Soc. Am. vol. 106, No. 2, 1134-1141, Aug. 1999.

Thomson, et al., A Fabry-Perot acoustic sensor vibration detector—application to acoustic holography, J. Phys. D.: Appl. Phys., vol. 6, p. 677, 1973.

Totsu, K., et al., Ultra-Miniature Fiber-Optic Pressure Sensor Using White Light Interferometry, J. Micromech. Microeng., vol. 15, pp. 71-75, 2005.

Wenz, G.M., "Acoustic ambient noise in the ocean: Spectra and sources," J. Acoust. Soc. Am. vol. 34, No. 12, 1936-1956, Dec. 1962.

Worth, R.A., "Accuracy of the parallel-plate analogy for representation of viscous flow between coaxial cylinders," J. Appl. Polym. Sci. 24, 319-328, 1979.

Yu, M., et al., Acoustic Measurements Using a Fiber Optic Sensor System, J. Intelligent Mat'l. Systems and Structures, vol. 14, pp. 409-414, Jul. 2003.

Yu, M., Fiber-Optic Sensor Systems for Acoustic Measurements, Ph.D. Dissertation, University of Maryland, College Park, MD. 2002.

Zhu, Y. et al., "Miniature Fiber-Optic Pressure Sensor," IEEE Photonics Technology Letters, vol. 17, No. 2, 447-449, Feb. 2005.

European Exam Report re EP Application No. 06846402.3-2216, dated Oct. 31, 2011.

Suh et al., "Mechanically switchable photonic crystal structures based on coupled photonic crystal slabs", SPIE, Jul. 9, 2004, Photonic Crystal Materials and Devices II, Jan. 26-29, 2004, San Jose, CA USA, pp. 299-306, vol. 5360, No. 1.

Kilic, et al., "External Fibre Fabry-Perot Acoustic Sensor Based on Photonic-Crystal Mirror," Measurement Science and Technology, vol. 18, No. 10, Oct. 1, 2007, pp. 3049-3054.

\* cited by examiner

Deposit oxide

Expose

Develop

Dry etch to define the PC holes

Remove resist and oxide

Deposit low temperature silicon oxide (LTO)

Pattern LTO layer using reactive ion etching

TMAH silicon etch

Etch LTO and oxide using hydrofluoric-acid

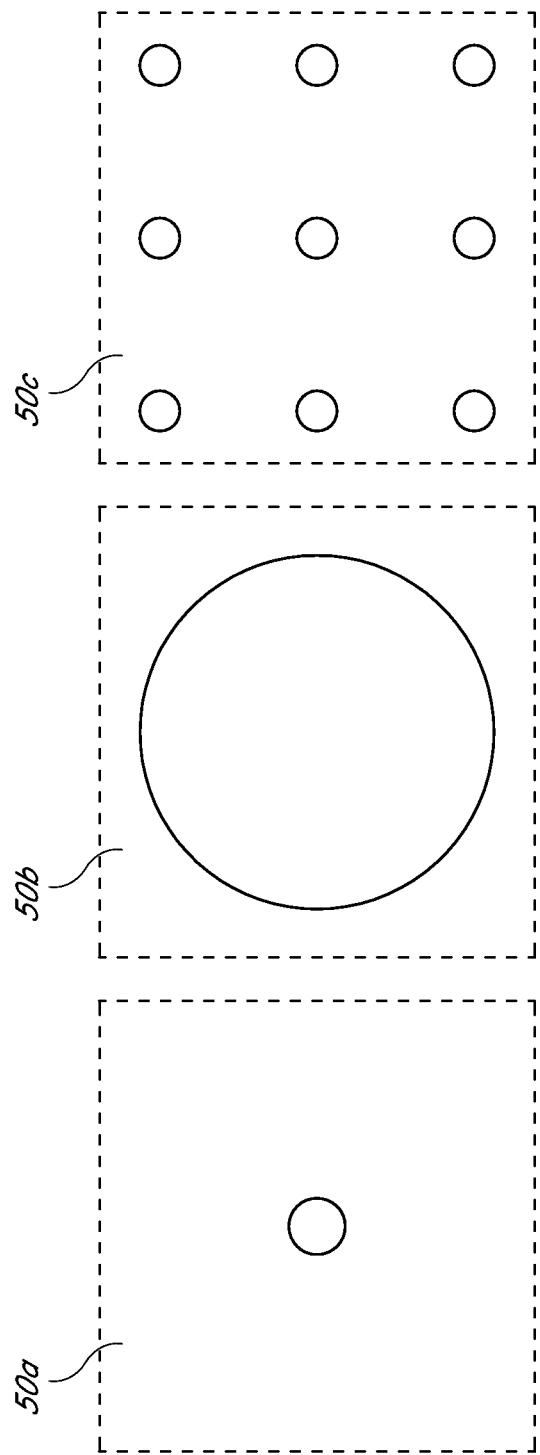

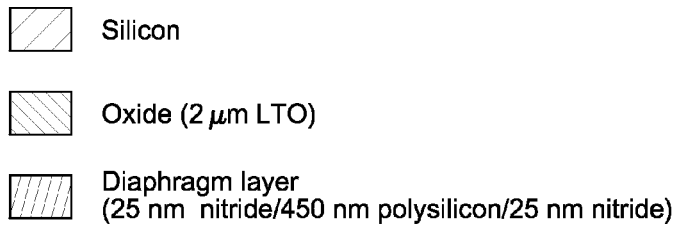
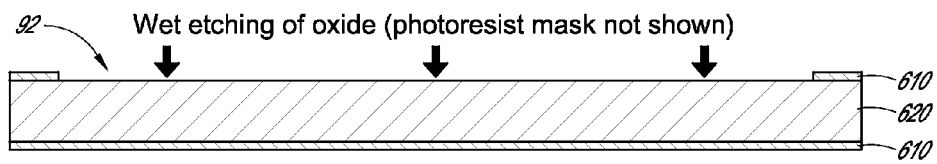
FIG. 31A
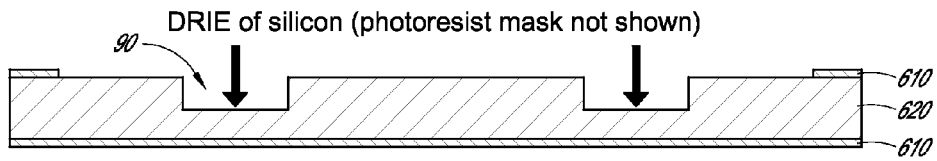
FIG. 31B
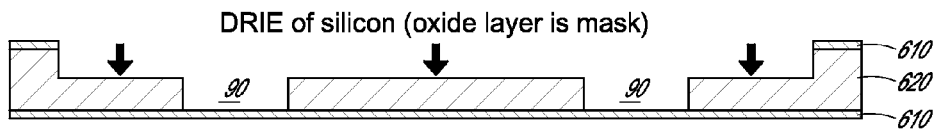
FIG. 31C
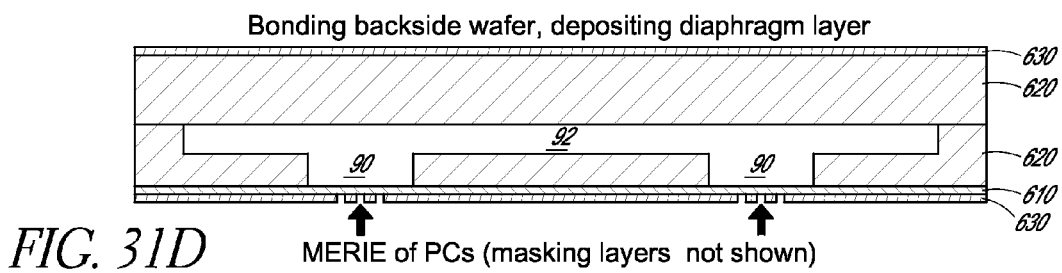
FIG. 31D
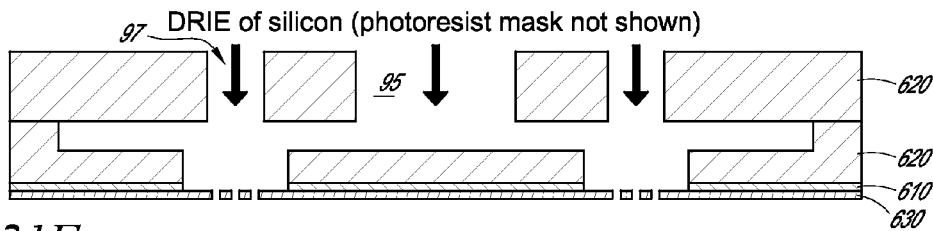
FIG. 31E

OPTICAL-FIBER-COMPATIBLE ACOUSTIC SENSOR

CLAIM OF PRIORITY

This application claims the benefit of U.S. Provisional Patent Application No. 61/314,090, filed Mar. 15, 2010; U.S. Provisional Patent Application No. 61/331,303, filed May 4, 2010; and U.S. Provisional Patent Application No. 61/382,385, filed Sep. 13, 2010. Each of the foregoing applications is incorporated in its entirety by reference herein.

BACKGROUND

1. Field of the Invention

This application relates generally to acoustic sensor systems, and more particularly to optical-fiber-compatible acoustic sensor systems.

2. Description of the Related Art

Various fiber optic sensor systems have been previously disclosed that provide acoustic pressure measurements based on the relative displacements of the two mirrors of a Fabry-Perot interferometric cavity. See, e.g., M. Yu et al., "*Acoustic Measurements Using a Fiber Optic Sensor System,*" J. Intelligent Material Systems and Structures, vol. 14, pages 409-414 (July 2003); K. Totsu et al., "*Ultra-Miniature Fiber-Optic Pressure Sensor Using White Light Interferometry,*" J. Micromech. Microeng., vol. 15, pages 71-75 (2005); W. B. Spillman, Jr. et al., "*Moving Fiber-Optic Hydrophone,*" Optics Lett., vol. 5, no. 1, pages 30-31 (January 1980); K. Kardirvel et al., "*Design and Characterization of MEMS Optical Microphone for Aeroacoustic Measurement,*" 42nd AIAA Aerospace Sciences Meeting and Exhibit, 5-8 January 2004, Reno, Nev.; J. A. Bucaro et al., "*Miniature, High Performance, Low-Cost Fiber Optic Microphone,*" J. Acoust. Soc. Am., vol. 118, no. 3, part 1, pages 1406-1413 (September 2005); T. K. Gangopadhyay et al., "*Modeling and Analysis of an Extrinsic Fabry-Perot Interferometer Cavity,*" Appl. Optics, vol. 44, no. 16, pages 312-3196 (1 Jun. 2005); and P. J. Kuzmenko, "Experimental Performance of a Miniature Fabry-Perot Fiber Optic Hydrophone," Proceedings of 8th Optical Fiber Sensors Conference, Monterey, Calif., Jan. 29-31, 1992, pages 354-357; 0. Kilic, M. Digonnet, G. Kino, and O, Solgaard, "*External fiber Fabry-Perot acoustic sensor based on photonic-crystal mirror,*" in 18th International Optical Fiber Sensors Conference, Cancun, Mexico (2006); O. Kilic, M. Digonnet, G. Kino, and O, Solgaard, "*External fibre Fabry-Perot acoustic sensor based on a photonic-crystal mirror,*" Meas. Sci. Technol. 18, 3049-3054 (2007); O. Kilic, M. Digonnet, G. Kino, and O, Solgaard, "*Photonic-crystal-diaphragm-based fiber-tip hydrophone optimized for ocean acoustics,*" in 19th International Optical Fiber Sensors Conference, Perth, Australia (2008); O. Kilic, M. Digonnet, G. Kino, and O, Solgaard, "*Fiber-optical acoustic sensor based on a photonic-crystal diaphragm,*" in 15th International Conference on Solid-State Sensors, Actuators, and Microsystems, Denver, Colo. (2009).

Photonic-crystal slabs (PCSs) are photonic-crystal structures having a spatially periodically varying refractive index. A PCS exhibits guided resonance optical modes that are strongly confined within the PCS, but are coupled to incident radiation through a phase matching mechanism due to the periodically varying refractive index. These guided resonance modes are typically manifest in transmission or reflection spectra as sharp Fano lineshapes superimposed on a smoothly varying background. See, e.g., M. Kanskar et al., "*Observation of leaky slab modes in an air-bridged semiconductor waveguide with a two-dimensional photonic lattice,*" Appl. Phys. Lett., vol. 70, page 1438 (1997); V. N. Astratov et al., "*Resonant coupling of near-infrared radiation to photonic band structure waveguides,*" J. Lightwave Technol., vol. 17, page 2050 (1999); and S. Fan and J. D. Joannopoulos, "*Analysis of guided resonances in photonic crystal slabs,*" Phys. Rev. B, vol. 65, page 235112 (2002). Such guided resonance modes have been used previously as optical filters or mirrors in light emitting diodes and lasers

SUMMARY

In certain embodiments, an acoustic sensor is provided. The sensor comprises a diaphragm comprising a reflective element. The sensor also comprises an optical fiber positioned relative to the reflective element such that light emitted from the optical fiber is reflected by the reflective element. A first end of the optical fiber and the reflective element forms an optical cavity therebetween. The sensor further comprises a structural element mechanically coupling the diaphragm and the optical fiber. The structural element of certain embodiments comprises a material having a coefficient of thermal expansion substantially similar to the coefficient of thermal expansion of the optical fiber. For example, the structural element of certain embodiments comprises silica.

In certain embodiments, at least a portion of the light reflected by the reflective element can propagate into the optical fiber. The first end of the optical fiber can comprise a second reflective element. The second reflective element and the reflective element can form a Fabry-Perot cavity therebetween. In certain embodiments, the optical fiber can comprise fused silica and the structural element can comprise fused silica. In some embodiments, the reflective element can comprise a photonic-crystal structure. Additionally, the diaphragm of some embodiments can comprise silica. In various embodiments, the diaphragm of the acoustic sensor can have a thickness approximately equal to a distance between the first end of the optical fiber and the reflective element.

In certain embodiments, the acoustic sensor can further comprise a compensating element comprising silica. The compensating element can be spaced from the diaphragm and positioned within the optical cavity. The diaphragm of certain embodiments can have a lateral dimension and a ratio of the lateral dimension to the optical fiber diameter can be in a range between 1.2 and 8. The diaphragm can have a movable portion having an area and a ratio of the area to a cross-sectional area of the optical fiber can be in a range between 1.4 and 64.

In certain embodiments, the diaphragm can comprise one or more fluid conduits. One or more fluid conduits can be separate from the reflective element. In the acoustic sensor of certain embodiments, the optical cavity can comprise a liquid. The acoustic sensor can further comprise at least one generally compressible and generally elastic element to increase sensitivity. At least one generally compressible and generally elastic element can be a gas bubble.

In certain embodiments, an acoustic sensor is provided. The sensor comprises a reflective element. The sensor further comprises an optical fiber positioned relative to the reflective element such that light emitted from the optical fiber is reflected by the reflective element. The first end of the optical fiber and the reflective element form an optical cavity therebetween. The optical cavity comprises a medium having a refractive index change with temperature. In these embodiments, an element within the optical cavity has a coefficient of thermal expansion and thickness that compensate the refractive index change with temperature.

In various embodiments, the medium can be water. In these embodiments, the element within the optical cavity can comprise silica and can have a thickness approximately equal to a distance between the first end of the optical fiber and the reflective element. In some embodiments, the element within the optical cavity can be a diaphragm mechanically coupled to the reflective element. The element within the optical cavity can also be mechanically coupled to the optical fiber.

In certain embodiments, a method of fabricating an acoustic sensor is provided. The method comprises providing a diaphragm. The diaphragm comprises a reflective element. The method further comprises positioning an optical fiber relative to the reflective element such that light emits from the optical fiber and is reflected from the reflective element. Positioning the optical fiber relative to the reflective element comprises forming an optical cavity therebetween. The method further comprises mechanically coupling the diaphragm to the optical fiber with a structural element. The structural element comprises a material having a coefficient of thermal expansion similar to the coefficient of thermal expansion of the optical fiber. For example, the structural element can comprise silica.

In certain embodiments, providing a diaphragm comprising a reflective element can include providing a photonic-crystal structure as the reflective element. In these embodiments, providing a photonic-crystal structure can comprise providing a photonic-crystal structure fabricated by photolithography. In various embodiments, the method of fabricating an acoustic sensor can further comprise silicate bonding the diaphragm to the structural element.

The method of fabricating an acoustic sensor can further comprise employing an element comprising silica with the optical cavity. In certain such embodiments, the method can further comprise selecting a thickness for the element comprising silica approximately equal to a distance between the first end of the optical fiber and the diaphragm. The method of certain embodiments can comprise selecting a diaphragm diameter to increase mechanical compliance. The method can further comprise selecting a diaphragm cross-sectional area to increase mechanical compliance.

In certain embodiments, the method can further comprise employing one or more fluid conduits separate from the reflective element. In some embodiments, the method can further comprise employing at least one generally compressible and generally elastic element to increase sensitivity. At least one generally compressible and generally elastic element can be a gas bubble.

BRIEF DESCRIPTION OF THE DRAWINGS

FIGS. 17A-17C schematically illustrate example portions of three individual wafers and their patterns of holes to be used as building blocks of the silica structural element in accordance with certain embodiments described herein.

FIG. 31 schematically illustrates an example fabrication process for producing a sensor system in accordance with certain embodiments described herein

DETAILED DESCRIPTION OF EXAMPLE EMBODIMENTS

Optical acoustic sensing has various important applications. For example, for structural health monitoring, acoustic sensors can monitor the health of massive aerospace and wind-energy structures. Acoustic sensors can also provide mobile detection, tracking, and reporting of submarine contacts at long range in defense applications. As a further example, the production from wells and zones within a well in oil and gas applications can be monitored and controlled. In yet another example, acoustic sensing can measure the pressure of any bodily fluid, used in many medical applications, including life-support devices.

Certain embodiments described herein include structures, elements, or features which advantageously address one or more issues arising from previously-disclosed acoustic sensors which utilize a mechanical diaphragm, a first reflective element, and a second reflective element (e.g., one or more photonic-crystal slabs) to produce a Fabry-Perot sensor with optical properties which are responsive to acoustic waves (e.g., acoustic waves incident on the sensor from the ambient environment or acoustic waves generated within the sensor). Certain embodiments described herein can be practiced by appropriate modification of these previously-disclosed acoustic sensors. Examples of such previously-disclosed acoustic sensors are described in U.S. Pat. No. 7,526,148, issued on Apr. 28, 2009; U.S. Pat. No. 7,630,589, issued on Dec. 8, 2009; U.S. Pat. No. 7,809,219, issued on Oct. 5, 2010; and U.S. Pat. No. 7,881,565, issued on Feb. 1, 2011, each incorporated in its entirety by reference herein, and U.S. Pat. Appl. Publ. No. 2011/0041616, which is also incorporated in its entirety by reference herein. The structures, elements, or features described below can be used individually, or can be used with one another in combinations of two or more. Certain embodiments described herein can alternatively be practiced by appropriate modification of other previously-disclosed acoustic sensor configurations (e.g., configurations not corresponding to those described in U.S. Pat. Nos. 7,526, 148, 7,630,589; 7,809,219, 7,881,565, and U.S. Pat. Appl. Publ. No. 2011/0041616.

Reduced Sensitivity to Thermal Variation

Figure 1A:
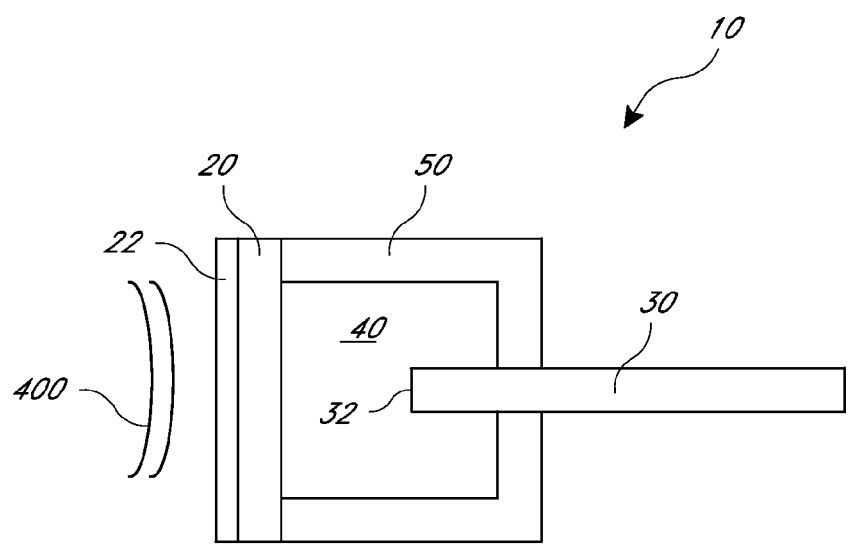
FIGS. 1A-1B schematically illustrate examples of acoustic sensors compatible with certain embodiments described herein.
Figure 1B:
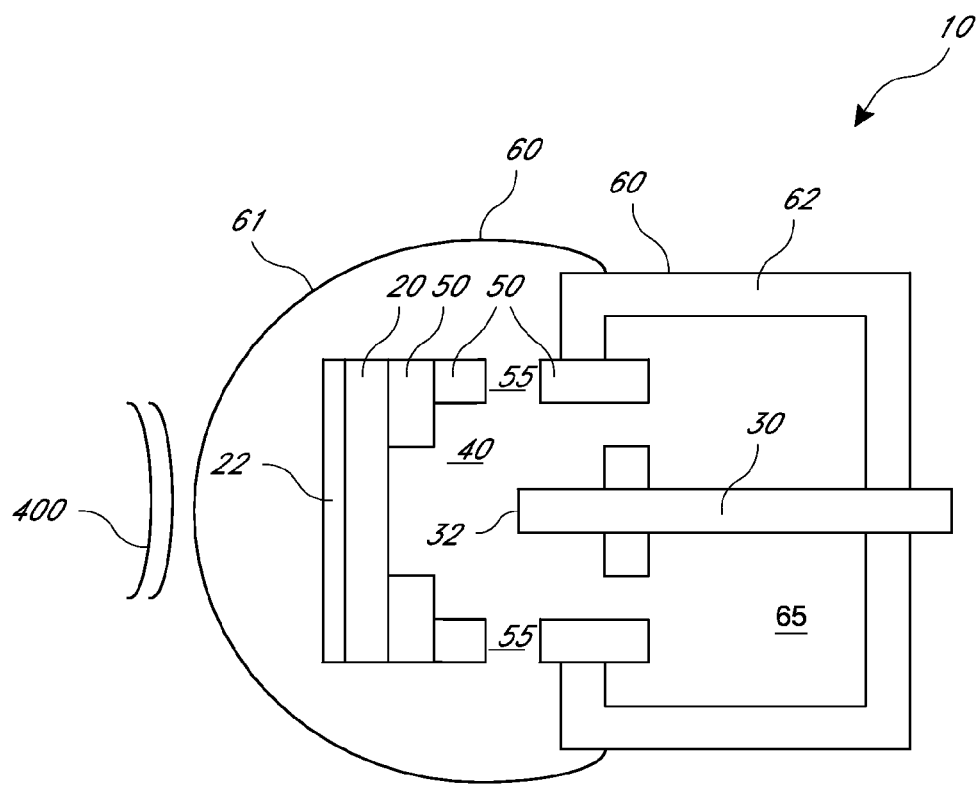

FIGS. 1A-1B schematically illustrate example acoustic sensors 10 in accordance with certain embodiments described herein. The acoustic sensor 10 comprises a diaphragm 20 comprising a reflective element 22. In certain embodiments, the diaphragm 20 is deflectable by acoustic waves 400 and can comprise silicon, as is typically used in acoustic sensors.

In certain other embodiments, the diaphragm 20 can advantageously comprise silica as will be discussed in more detail below. In yet other embodiments, the diaphragm 20 can comprise silicon nitride. Other materials are possible. The reflective element 22 of certain embodiments can be positioned (e.g., deposited) on the diaphragm 20. In certain embodiments, the reflective element 22 can be bonded directly onto the diaphragm 20 (e.g., through thermal bonding). In certain embodiments, the reflective element 22 is positioned (e.g., deposited or bonded) on a surface of the diaphragm 20 facing away from the optical fiber 30, as shown in FIGS. 1A-1B. However, in other embodiments, the reflective element 22 can be positioned (e.g., deposited or bonded) on a surface of the diaphragm 20 facing towards the optical fiber 30. In still other embodiments, the reflective element 22 can be positioned (e.g., found) within the diaphragm 20. In various embodiments, the diaphragm 20 comprises a reflective element 22 comprising a photonic-crystal structure.

In certain embodiments, the reflective element 22 comprises a metallic mirror structure (e.g., one or more layers of gold, silver, aluminum, chromium, or combinations thereof). In certain embodiments, chromium, e.g., about 2 to about 5 nm thickness, can be used as an adhesion layer beneath the reflective element 22. In these embodiments, the chromium can be relatively absorptive at certain wavelengths of interest. The reflective element 22 can further comprise a thin (e.g., between about 10 nanometers to about 100 nanometers thick) layer of silicon oxide to protect the metal surface against oxidation and scratching.

In certain other embodiments, the reflective element 22 comprises a dielectric mirror (e.g., multilayer structure comprising a plurality of transparent dielectric layers with selected thicknesses and refractive indices to provide a predetermined reflectivity). In certain such embodiments, the dielectric mirror can have a thickness between 1 micron and microns, and can have an area on the order of square inches (e.g., a film stretched across a frame). Examples of dielectric materials compatible with certain embodiments described herein include, but are not limited to, silicon dioxide, magnesium fluoride, silicon monoxide, and tantalum oxide.

In certain other embodiments, the reflective element 22 comprises at least a portion of a photonic crystal structure. The photonic crystal structure of certain embodiments comprises one or more photonic crystal slabs. To make a photonic-crystal slab in accordance with certain such embodiments, a dielectric layer, such as silicon or silicon nitride is deposited on the outer surface of the diaphragm 20, and is subsequently patterned with holes going through the dielectric layer. An example process compatible with certain embodiments described herein is more fully discussed in U.S. Pat. Nos. 7,526,148, 7,630,589; 7,809,219, 7,881,565, and U.S. Pat. Appl. Publ. No. US2011/0041616, each of which is incorporated in its entirety by reference herein.

The acoustic sensor 10 further comprises an optical fiber 30 positioned relative to the reflective element 22 such that light emitted from the optical fiber 30 is reflected by the reflective element 22. The optical fiber 30 of certain embodiments is a single-mode fiber. Examples compatible with certain embodiments described herein include, but are not limited to, silica-based fiber, SMF-28® fiber available from Corning Incorporated of Corning, N.Y., cutoff shifted fiber, low-water-peak fiber, dispersion-shifted fiber, non-zero dispersion-shifted fiber, and non-standard microstructured fiber (e.g., photonic crystal fiber).

As schematically illustrated by FIGS. 1A-1B, the optical fiber 30 comprises a reflective element 32 (e.g., the first end 32 of the optical fiber 30), and the reflective element 22 and the reflective element 32 of the optical fiber 30 form an optical cavity 40 therebetween. The reflective element 32 of the optical fiber 30 and the reflective element 22 are spaced from one another in certain embodiments by a distance between 500 nanometers and 50 microns. In certain embodiments, sensors 10 with a smaller optical cavity 40 can have a more advantageous thermal stability. In certain embodiments, the optical cavity 40 comprises a gas (e.g., air), while in certain other embodiments, the cavity 40 comprises a liquid (e.g., water).

In certain embodiments, the optical fiber 30 transmits light from a light source to irradiate at least a portion of the reflective element 22. Examples of light sources compatible with certain embodiments described herein include, but are not limited to, monochromatic sources (e.g., laser, laser diode), broadband sources (e.g., incandescent lamp, light-emitting diode), and tunable sources (e.g., tunable laser).

In certain embodiments, the reflective element 32 of the optical fiber 30 comprises a metal layer at or on a first end of the optical fiber 30 which is partially reflective and partially transmissive to light emitted from the optical fiber 30. In certain embodiments, the metal layer comprises multiple sub-layers of various materials, examples of which include, but are not limited to, chromium, gold, silver, aluminum, and combinations thereof. In certain such embodiments, the metal layer further comprises a thin (e.g., between about 10 nanometers to about 100 nanometers thick) layer of silicon oxide to protect the metal surface against oxidation and scratching. In certain embodiments, the metal layer has a thickness in a range between 1 nanometer and 50 nanometers. In certain other embodiments, the reflective element 32 of the optical fiber 30 comprises a dielectric mirror at or on the first end of the optical fiber 30 comprising a plurality of dielectric material layers. Examples of dielectric materials compatible with certain embodiments described herein include, but are not limited to, magnesium fluoride, zinc sulfide, silicon dioxide, titanium dioxide, and tantalum pentoxide. In certain embodiments, the reflective element 32 of the optical fiber 30 comprises a photonic crystal structure at or on the first end of the optical fiber 30.

In embodiments where the reflective element 32 of the optical fiber 30 comprises a partially reflective end of the optical fiber 30, the end of the optical fiber 30 and the reflective element 22 of the diaphragm 20 define a Fabry-Perot optical cavity 40 therebetween. After light propagates out of the optical fiber 30, at least a portion of the light reflected by the reflective element 32 propagates back into the optical fiber 30. As an incident acoustic wave 400 deflects the diaphragm 20, a frequency shift in the Fabry-Perot reflection spectrum can be induced. This shift can be detected as a change in the power reflected by the Fabry-Perot optical cavity 40 at a fixed wavelength.

In certain embodiments, one or more factors, other than the incident acoustic field that deflects the diaphragm 20 and affects the length of the optical cavity 40, can induce a frequency shift in the Fabry-Perot spectrum, and therefore an error in the measured acoustic pressure can occur. For example, if the temperature of the Fabry-Perot optical cavity 40 slowly increases, the material surrounding the Fabry-Perot optical cavity 40 can expand. Hence, the spacing of the Fabry-Perot optical cavity 40 can increase, and the reflection spectrum can slowly shift. In certain embodiments, this frequency shift can be indistinguishable from a slow change in acoustic pressure. Furthermore, since at the probing wavelength the rate of change of the reflected power with wavelength (or optical frequency) can change as the spectrum shifts, the responsivity of certain embodiments of the acoustic sensor 10 to a given displacement of the reflective element 22 can also change.

Figure 2:
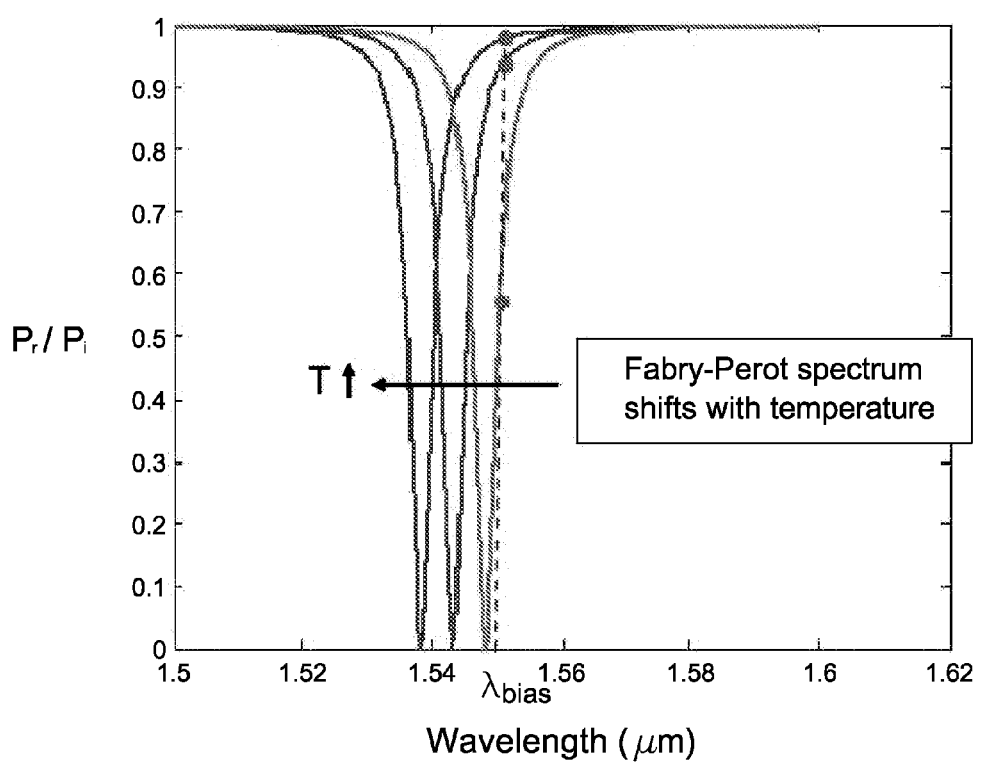
FIG. 2 is a plot of a portion of the response of an example acoustic sensor as a function of wavelength for various temperatures.

This process is illustrated in FIG. 2, which plots a portion of the response (reflected power/incident power) of an example acoustic sensor 10 as a function of wavelength for various temperatures. As the temperature is increased and the spectrum shifts (to the left in FIG. 2), the operating (or bias) point at the laser wavelength (which is fixed), represented by a dot, shifts from a steep portion of the curve in the rightmost spectrum (for highest sensitivity) to a less steep portion. In certain embodiments, this can be undesirable because the scale factor of the acoustic sensor 10, which is proportional to the slope of the curve, decreases, e.g., the calibration of the sensor response to an acoustic field decreases. This can also be undesirable because the scale factor, and hence the response, can vary. Because it can vary in an unpredictable manner, the ability of the acoustic sensor 10 to perform calibrated measurements of acoustic power can be compromised. An important environmental parameter that results in such an extraneous spectrum shift is temperature. As explained above, a variation in the temperature of the medium in which the acoustic sensor 10 is located can shift the spectrum. In particular, if the thermal expansion coefficients of the optical fiber 30 and the material surrounding the optical cavity 40 are different, the optical cavity 40 can experience a length change with temperature variation.

Thus, certain embodiments described herein advantageously utilize a structural element mechanically coupling the diaphragm 20 with the optical fiber 30 and comprising a material having a similar coefficient of thermal expansion as the optical fiber 30. For example, in certain embodiments as shown in FIGS. 1A-1B, the acoustic sensor 10 comprises a structural element 50 mechanically coupling the diaphragm 20 and the optical fiber 30 and surrounding the optical cavity 40, wherein the structural element 50 advantageously comprises a material having a similar coefficient of thermal expansion as the optical fiber 30. In certain embodiments, as shown in FIG. 1B, the structural element 50 can include a plurality of elements. Additionally, in certain embodiments as will be described more fully below, the structural element 50 can include one or more holes, fluid conduits, or channels 55.

In certain embodiments, the optical fiber 30 is made of fused silica, which has a small thermal expansion coefficient (e.g., $\alpha=0.55\times10^{-6}/°$ C.), and the structural element 50 also comprises fused silica. By using a structural element 50 made of the same low-thermal-expansion material as is the optical fiber 30, the acoustic sensor 10 is rendered substantially insensitive to variations in ambient temperature. In certain embodiments, as will be discussed below, the optical fiber 30 can be inserted within a capillary tube. In various embodiments, the capillary tube can advantageously comprise a material having a similar coefficient of thermal expansion as the optical fiber 30. For example, the material can be silica.

As shown in FIG. 1B, the acoustic sensor 10 of certain embodiments further comprises a housing 60 substantially surrounding the diaphragm 20 comprising a reflective element 22, the structural element 50, the optical cavity 40, and the optical fiber 30. In certain embodiments, the housing 60 can comprise a plurality of elements, e.g., a protective membrane 61 and a backchamber housing 62. The protective membrane 61 can keep the reflective element 22 and the optical cavity 40 isolated from the environment, e.g., to keep contaminants away and to prevent corrosion. The protective membrane 61 can be configured to allow acoustic waves 400 to propagate across the membrane 61 to deflect the diaphragm 20 (e.g. the membrane 61 can comprise a flexible, polymeric material).

In certain embodiments, the backchamber housing 62 can surround a backchamber or reservoir 65 that is in fluidic communication with the optical cavity 40. It can be mechanically coupled to both the structural element 50 and the optical fiber 30, as shown in FIG. 1B. In some embodiments, the backchamber housing 62 comprises brass or aluminum. In other embodiments, the backchamber housing 61 advantageously comprises a material with a similar coefficient of thermal expansion as the optical fiber 30 and/or structural element 50 for similar reasons discussed above. Thus, the backchamber housing 62 can comprise silica.

Figure 3:
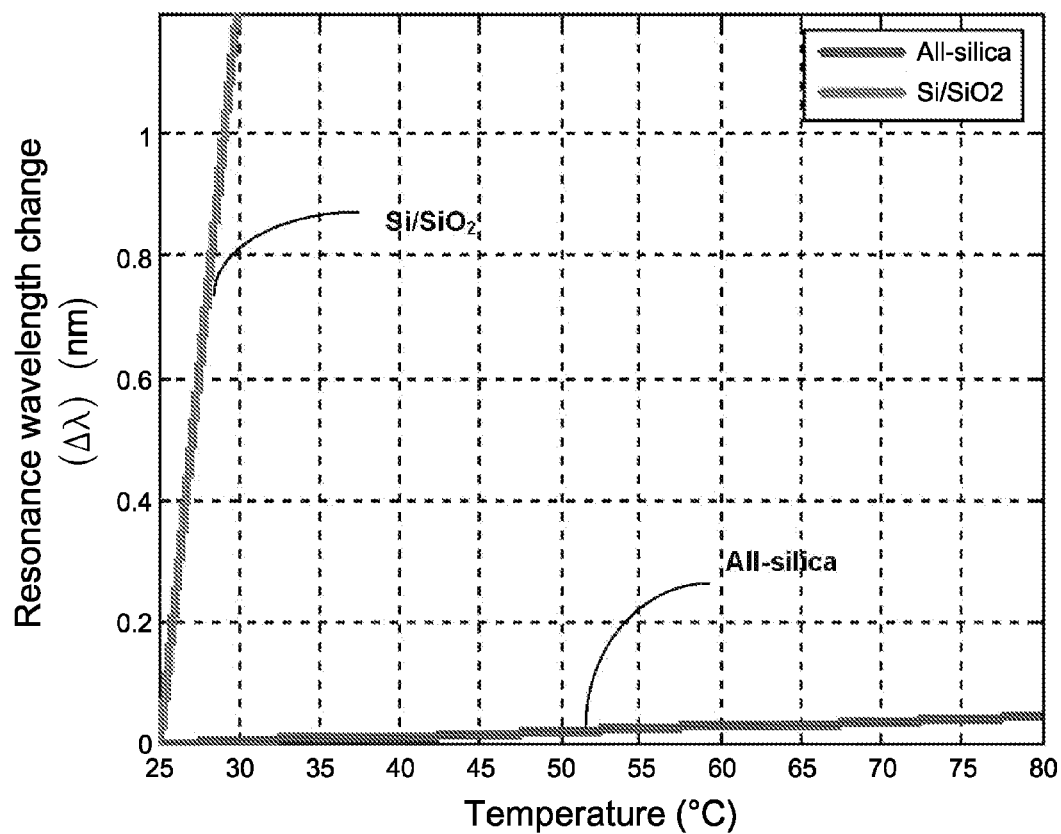
FIG. 3 is an example plot of the calculated resonance wavelength change as a function of temperature for a Fabry-Perot sensor comprising silica compared to one comprising silicon.

FIG. 3 is an example plot of the resonance wavelength change as a function of temperature for a Fabry-Perot sensor 10 with a sensor head comprising silica in accordance with certain embodiments described herein compared to one comprising silicon, using a probing wavelength of 1550 nm. As shown in FIG. 3, the all-silica sensor 10 (e.g., silica fiber 30, silica capillary tube, and silica structural element 50) of certain embodiments offers a substantial enhancement in thermal stability as compared to the sensor comprising the silica fiber and the silicon sensor head.

In certain embodiments, the effects of thermal expansion on the sensitivity of the acoustic sensor 10 are at least a factor of 10 smaller than other effects on the sensitivity of the acoustic sensor 10. Simulations show that with suitable design, the sensitivity of certain embodiments of the acoustic sensor 10 does not change by more than 10% for a temperature variation of greater than 100° C. Assuming that the Fabry-Perot cavity 40 is filled with air, for a Fabry-Perot cavity 40 with a 10-μm mirror spacing and a finesse of 30, the temperature change that changes the sensitivity of the sensor 10 by 10% is 300° C. The finesse F of a Fabry-Perot cavity is defined as $F=2\pi N$, where N is the number of round trips when the loss factor becomes 1/e. In other words, the energy inside the cavity drops to 1/e of its initial value after N round trips. The temperature change is approximately inversely proportional to the finesse, so that, e.g., a sensor 10 having an air-filled Fabry-Perot cavity 40 with a mirror spacing of 10 μm and a finesse of 300 can tolerate a maximum temperature change of around 30° C. for a sensitivity variation of no more than 10%.

For a Fabry-Perot cavity 40 containing water, thermal variations of the refractive index of water can have further detrimental effects on the performance of certain embodiments of the optical-fiber-compatible acoustic sensor 10. In certain embodiments in which the sensor 10 of FIG. 1B is employed in water as a hydrophone, the Fabry-Perot cavity 40 is filled with water. This water can be either the ambient water in which the sensor 10 or hydrophone head is immersed, or a separate reservoir of water isolated from the ambient water by an enclosure, such as the protective membrane 61. The refractive index of water varies with temperature, more so than does the refractive index of air, and its effect on the thermal sensitivity of the sensor 10 is about one order of magnitude larger than the effect of the thermal expansion of silica (the dn/dT coefficient of water is $-11.8\times10^{-6}/°$ C. for optical wavelengths around 1550 nm).

In a sensor 10 as schematically illustrated by FIGS. 1A-1B, the maximum tolerable temperature change for a cavity filled with water is generally smaller by a factor of 15 than the maximum tolerable temperature change for a cavity filled with air. For example, for a 10-μm water-filled Fabry-Perot cavity 40 with a finesse of 30, the temperature change which changes the sensitivity of the sensor 10 by 10% is only 20° C.

This temperature change is approximately inversely proportional to the finesse, so that, e.g., a sensor 10 having a cavity 40 with a finesse of 300 can tolerate a maximum temperature change of only 2° C. for a sensitivity variation of no more than 10%.

Figure 4A:
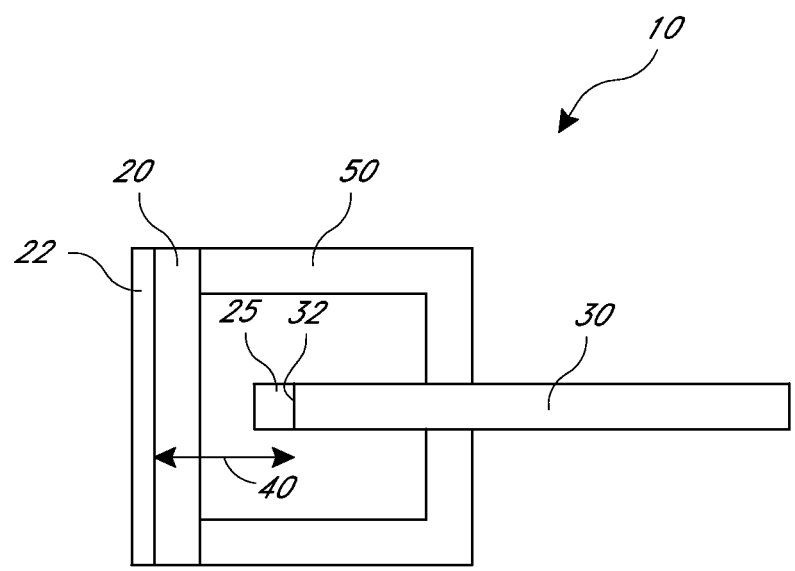
FIGS. 4A-4B schematically illustrate examples of acoustic sensors compatible with certain embodiments described herein.

Certain embodiments described herein advantageously compensate for the refractive index change of water with temperature. FIG. 4A schematically illustrates an example of an acoustic sensor 10 compatible with certain embodiments described herein. The acoustic sensor 10 comprises a reflective element 22. The acoustic sensor 10 further comprises an optical fiber 30 positioned relative to the reflective element 22 such that light emitted from the optical fiber 30 is reflected by the reflective element 22. The reflective element 32 of the optical fiber 30 and the reflective element 22 define an optical cavity 40 therebetween. The optical cavity 40 comprises a medium having a refractive index change with temperature. The acoustic sensor 20 further comprises a compensating element 25 positioned within the optical cavity 40 and having a coefficient of thermal expansion and thickness. In certain embodiments, the coefficient of thermal expansion and the thickness are selected such that the compensating element 25 compensates the refractive index change with temperature of the medium. In certain such embodiments, this compensation is sufficient for the optical sensor to have reduced thermal variation in performance as compared to an optical sensor without the compensating element.

The compensating element 25 can comprise one or more pieces of material that are selected to provide a coefficient of thermal expansion and total thickness so that the sensor 10 has a reduced sensitivity to temperature variations. As shown in FIG. 4A, the compensating element 25 within the optical cavity 40 comprises of material spaced away from the diaphragm 20. Such a material can be part of the first end 32 of the optical fiber 30. For example, the material can be attached to the reflective end of the optical fiber 30 before the optical fiber 30 is inserted into the sensor head. In certain embodiments in which the reflective element 32 of the optical fiber 30 is spaced along the optical fiber 30 and away from the end of the optical fiber 30, the compensating element 25 can comprise the portion of the optical fiber 30 between the reflective element 32 and the end of the optical fiber 30. Alternatively, at least a portion of the compensating element 25 can be formed by micro-fabrication such that it is positionable partway between the reflective element 32 of the optical fiber 30 and the reflective element 22. For example, at least a portion of the compensating element 25 can be on the diaphragm 20 facing the optical fiber 30 (or can be mechanically coupled to another portion of the optical sensor 10 (e.g., the structural element 50).

Figure 4B:
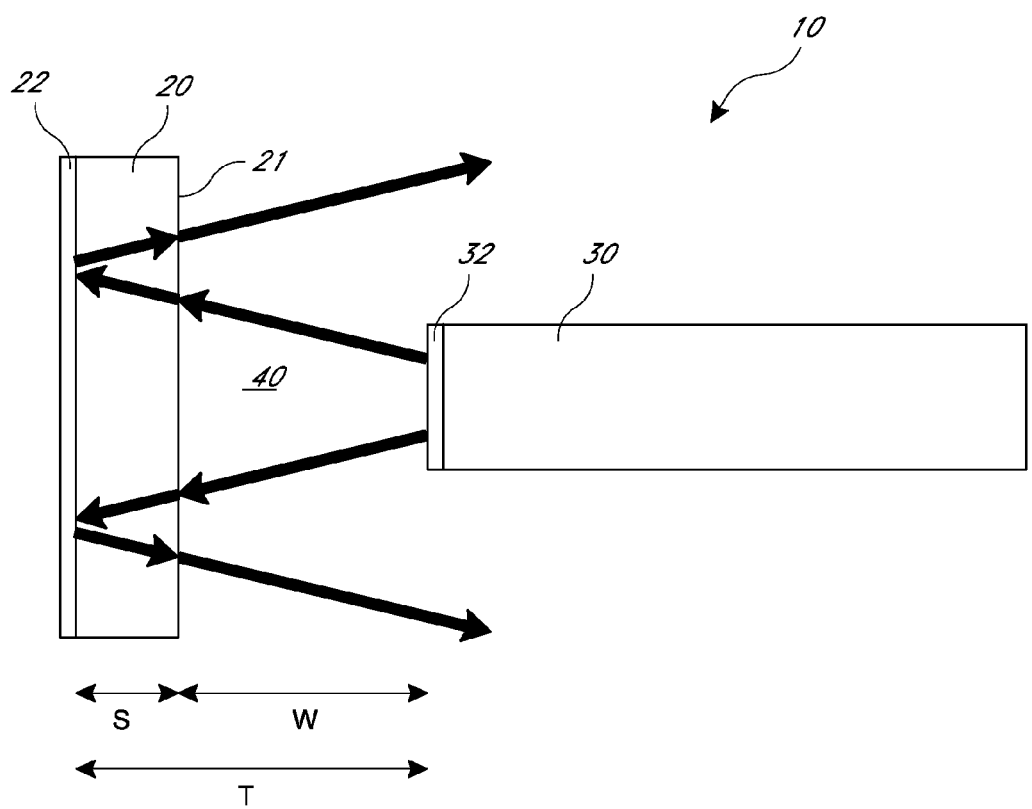

In certain embodiments, as shown in FIG. 4B, at least a portion of the diaphragm 20 can serve as the compensating element 25 within the optical cavity 40. In accordance with certain such embodiments in which the diaphragm 20 comprises silica, the compensating element 25 within the optical cavity 40 has a thickness (labeled S in FIG. 4B) substantially equal to the spacing between the fiber end 32 and the diaphragm 20 (labeled W in FIG. 4B). The reflective element 22 can be a material coated or fabricated on the diaphragm 20. The spacing volume is filled with water, and light is reflected from the reflective element 22 on the side of the diaphragm 20 facing away from the optical fiber 30. As discussed above, the reflective element 22 can comprise layers of metals, dielectrics, or photonic-crystal structure formed, deposited, or bonded on the diaphragm 20.

Figure 5:
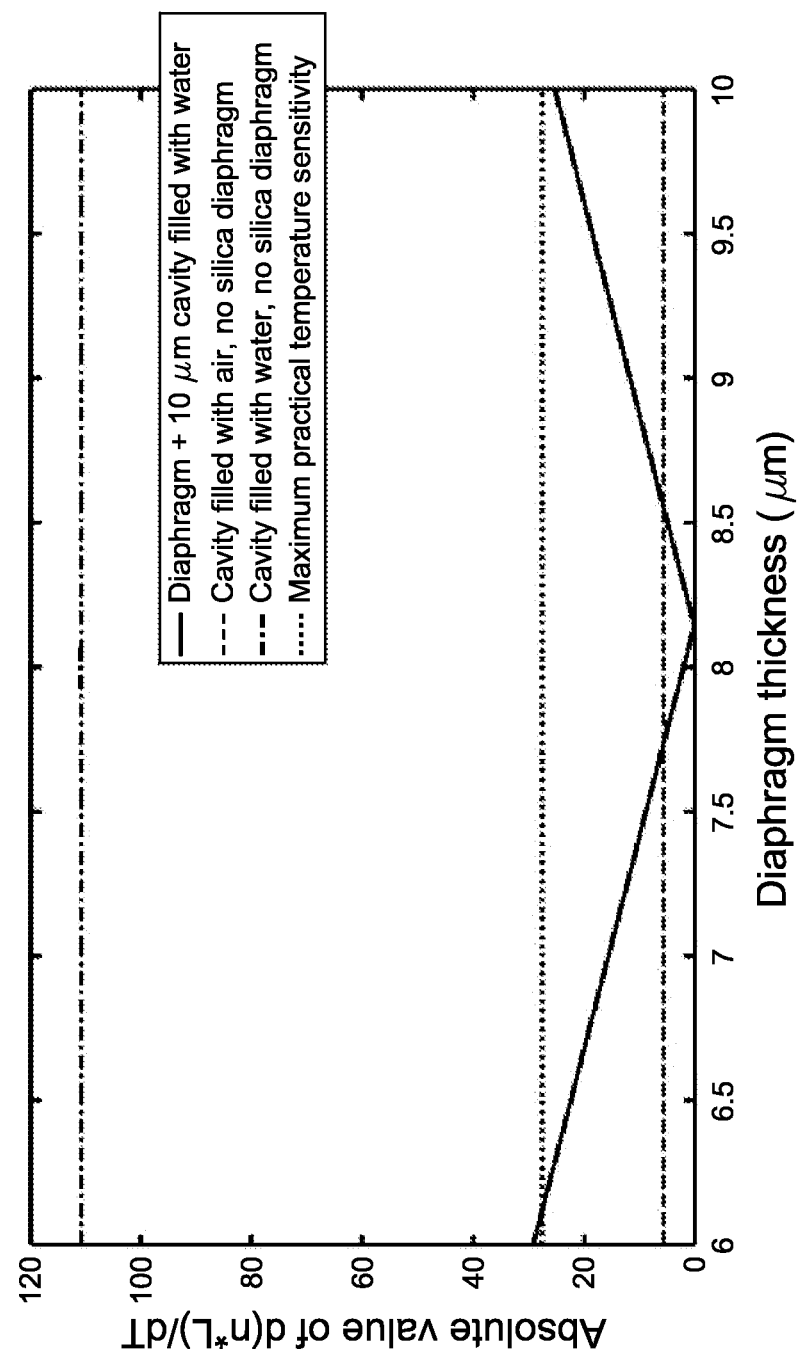
FIG. 5 is a graph showing the variation of the temperature sensitivity of the optical path length with respect to different thicknesses of a fused silica diaphragm in accordance with certain embodiments described herein.

For a given temperature change, the refractive index of fused silica changes by approximately the same magnitude as for water, but in the opposite direction (the dn/dT coefficient of fused silica is about +12.8×10$^{-6}$/° C. for optical wavelengths around 1550 nm while dn/dT for water is about −12.8×10$^{-6}$/° C. for these optical wavelengths). Therefore, in certain such embodiments, when light propagates by approximately equal distances through water and silica, the temperature effect on the refractive index of water is effectively cancelled out by the temperature effect on the refractive index of silica. FIG. 5 is a graph showing the variation of the temperature sensitivity of the optical path length (physical length multiplied by the refractive index) with respect to different thicknesses of the fused silica diaphragm 20. FIG. 5 corresponds to the spacing between the reflective tip of the fiber 32 and the diaphragm 20 (labelled "W" in FIG. 4B) being held constant at 10 μm, and the diaphragm thickness (labelled "S" in FIG. 4B) being varied from 6 μm to 10 μm, with the total optical thickness (T=S+W) being varied from 16 μm to 20 μm. The absolute value of the temperature sensitivity of the optical path length the light travels in the cavity versus diaphragm thickness (plotted as the solid curve) is significantly below the absolute value of the temperature sensitivity for a non-silica diaphragm (shown in FIG. 5 as the dash-dot line) and is below a maximum practical temperature sensitivity (shown in FIG. 5 as the dotted line) for the entire range of diaphragm thicknesses between about 6.15 μm and 10 μm. A minimum temperature sensitivity is observed for a diaphragm thickness of about 8.15 μm, corresponding to a sensor 10 in which the refractive index variations and material expansions compensate each other, such that the sensor 10 is rendered substantially insensitive to temperature variations. In certain embodiments, for a practical range of diaphragm thicknesses, a sensor 10 or hydrophone having a water-filled cavity and employing a silica diaphragm 20 is even less sensitive to temperature than is the sensor 10 upon having an air-filled cavity (shown in FIG. 5 as the dashed line). The relationship between the temperature sensitivity dn/dT of the optical path length with respect to different thicknesses for the compensating element can be determined for other materials for the compensating element and for other media for the optical cavity.

In certain embodiments, the diaphragm thickness is selected to render a sensor with a water-filled cavity substantially insensitive to thermal effects. For example, in certain embodiments in which the sensor comprises a 10-μm water-filled cavity between the diaphragm 20 and the optical fiber 30, the diaphragm thickness is in a range between about 5 μm and about 12 μm, between about 7 μm and about 10 μm, or between about 8 μm and about 9 μm. In certain embodiments, the ratio of the thickness of the diaphragm 20 to the cavity size between the diaphragm 20 and the optical fiber 30 is in a range between about 0.5 and about 1.2, between about 0.7 and about 1, or between about 0.8 and about 0.9. The value of the diaphragm thickness of 8.15 μm denoted in FIG. 5 for the 10-μm water-filled cavity is based on an assumption that the light is directly reflected from the reflective element 22 on the outer surface of the diaphragm 20. This assumption is accurate for certain embodiments when metal layers are used as the reflective element 22. When dielectric mirrors or photonic crystals (which can range in thickness approximately from 0.5 μm to 5 μm) are used, however, light travels beyond the outer surface of the diaphragm 20 into the reflective element 22 before it is reflected. Therefore, to compensate for thermal expansion and refractive index changes with temperature of the reflective element 22, the diaphragm thickness can be adjusted to obtain the optimum temperature insensitivity for a given reflective element 22.

Because the mechanical compliance of a thick diaphragm 20 (e.g., a thickness of 8.15 μm) is low, it can be difficult to deflect such a diaphragm 20 in certain embodiments. In certain embodiments, this issue can be resolved by increasing the diameter of the diaphragm 20 to increase the mechanical compliance, as described more fully below.

Another issue regarding the example configuration schematically illustrated in FIG. 4B could be the reflection from the surface 21 of the silica diaphragm 20 facing towards the optical fiber 30. However, due to the small difference between the refractive indices of silica and water ($n_{silica}$=1.444 vs. $n_{water}$=1.316 at 1550 nm wavelength), the reflection (R) from a silica-water interface, hence from the diaphragm surface 21, can be negligible (R<0.3%). In certain embodiments, this reflection can also be eliminated or reduced sufficiently by depositing an anti-reflection coating on the surface 21 of the diaphragm 20.

In embodiments where the reflective element 22 comprises a photonic-crystal mirror, the thermal response of the photonic-crystal mirror is another factor that affects the thermal stability of the sensor 10. As the temperature changes, the refractive index of the materials of the photonic-crystal mirror change, and so do its physical dimensions, (e.g., the thicknesses of the materials, and the periodicity and the diameter of the periodic structures, such as holes). Since all of these parameters affect the reflection spectrum of the photonic-crystal mirror, as these parameters change, the spectrum also changes. As a result of the change in the reflectivity of the photonic-crystal mirror, the finesse of the Fabry-Perot optical cavity 40 changes, and so does the slope of its reflection spectrum, in particular at the optimum bias point shown in FIG. 2, and the scale factor of the sensor 10.

Figure 6:
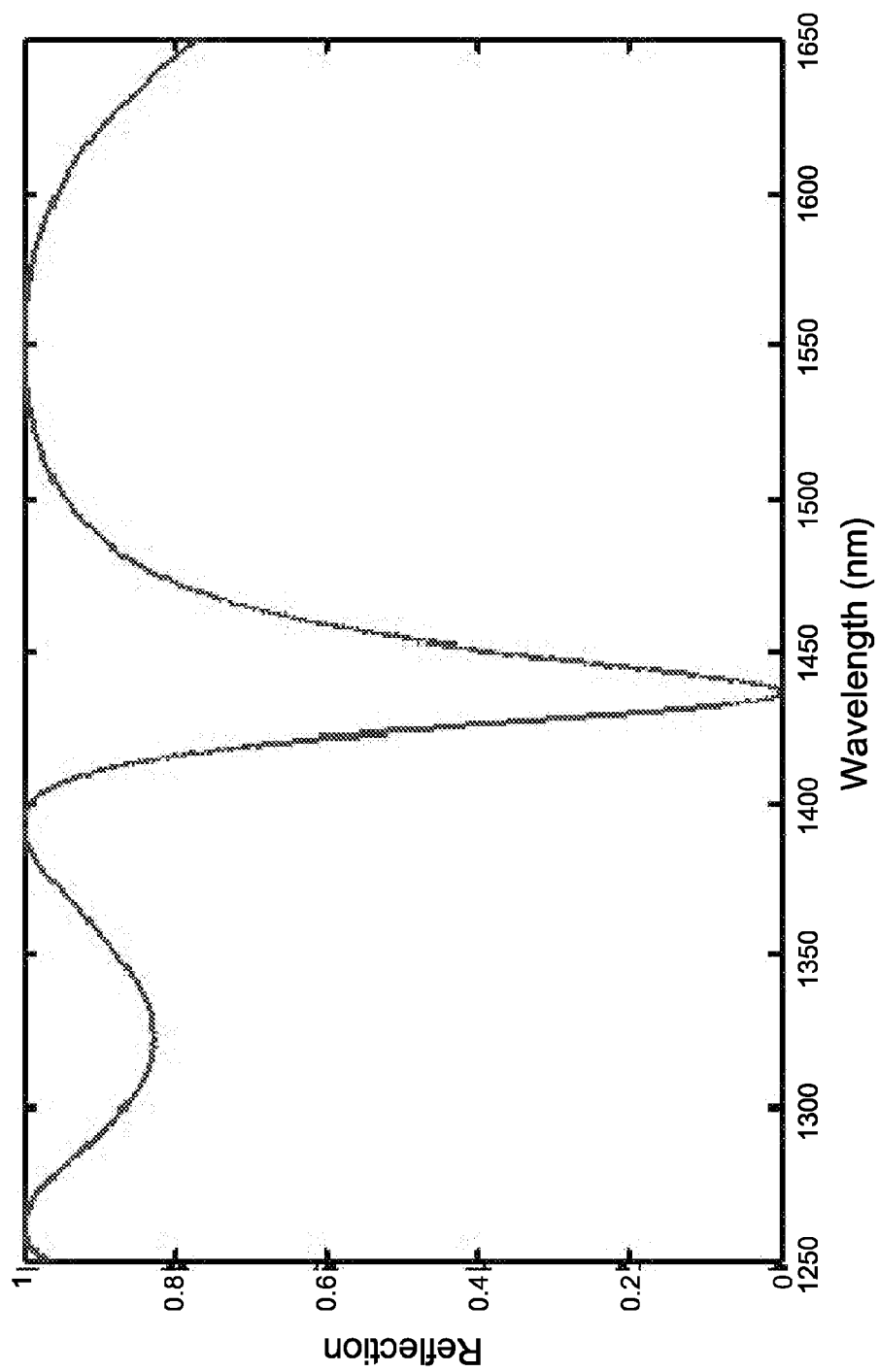
FIG. 6 shows the reflection spectrum calculated for an example photonic-crystal having a square pattern of holes with diameters of 800 nm and a period of 900 nm, fabricated on a silicon diaphragm of thickness 450 nm.

Finite-difference-time-domain (FDTD) simulations of the effect of temperature on the reflection spectrum of the photonic-crystal mirror show that this contribution is small for certain application. For example, FIG. 6 shows the reflection spectrum calculated for an example photonic-crystal structure having a square pattern of holes with diameters of 800 nm and a period of 900 nm, fabricated on a silicon diaphragm 20 of thickness 450 nm. These parameters were selected to obtain a high reflection at 1550 nm, a convenient target wavelength for this type of sensor. This photonic-crystal design provides ~99% reflectivity at 1550 nm and a bandwidth of 48 nm for 99% reflectivity.

Figure 7:
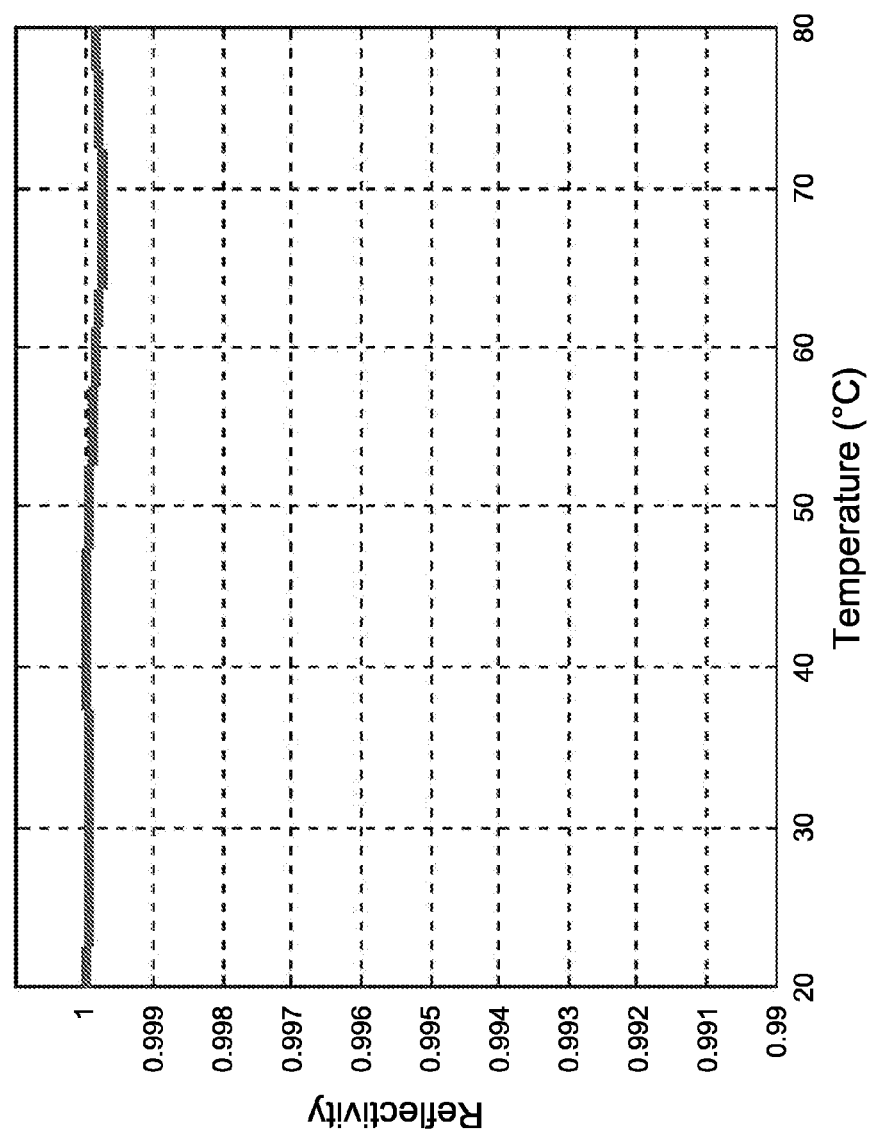
FIG. 7 shows the calculated change in reflectivity at 1550 nm as a function of temperature for an example sensor in accordance with certain embodiments described herein.

Using the same FDTD method, the spectrum of the same photonic-crystal structure can be simulated at different temperatures, taking into account the changes in refractive index, in hole radius, in period, and in thickness of the diaphragm. FIG. 7 shows the calculated change in reflectivity at 1550 nm as a function temperature for a sensor 10 in accordance with certain embodiments described herein. For a predetermined range of temperatures, e.g., from about 20° C. up to a maximum simulated temperature of about 80° C., the reflectivity remains within 0.02% of its value at 20° C. The bandwidth of the photonic-crystal structure for 99% reflectivity, not shown in FIG. 7, remains within 2.1% over this temperature range. In certain embodiments, the reflectivity remains within 0.03%, 0.04%, 0.05%, 0.08%, or 0.10% of its value at 20° C. over a range of temperature of about 20° C. to about 80° C.

The result of this small variation in the photonic-crystal reflectivity is that the resonance wavelength of the sensor remains within 0.02 nm over a 400° C. temperature range assuming a 90% reflectivity for the reflecting element 32 at the end 32 of the optical fiber 30, which translates into a nominal finesse for the Fabry-Perot optical cavity of 96.

Another contribution to the thermal instability of the Fabry-Perot-based acoustic sensor 10 is thermally induced variations in the refractive index of the optical cavity 40, e.g., the intra-cavity medium. When this medium is air, as in the case of a microphone for example, this contribution can be negligible. However, when it is water, as may be the case in a hydrophone, a change in this refractive index can induce an additional shift in the resonance of magnitude:

$$\left(\frac{\Delta\lambda}{\lambda}\right)_{RIM} = \frac{\Delta n}{n} \tag{1}$$

In the case of water, the shift in resonance wavelength due to this effect stays within ±1 nm, thus provides enough stability over ±100° C. before the maximum responsivity drops by more than 10% for a Fabry-Perot cavity of length 10 μm. This shift can be acceptable for many applications.

Figure 8:
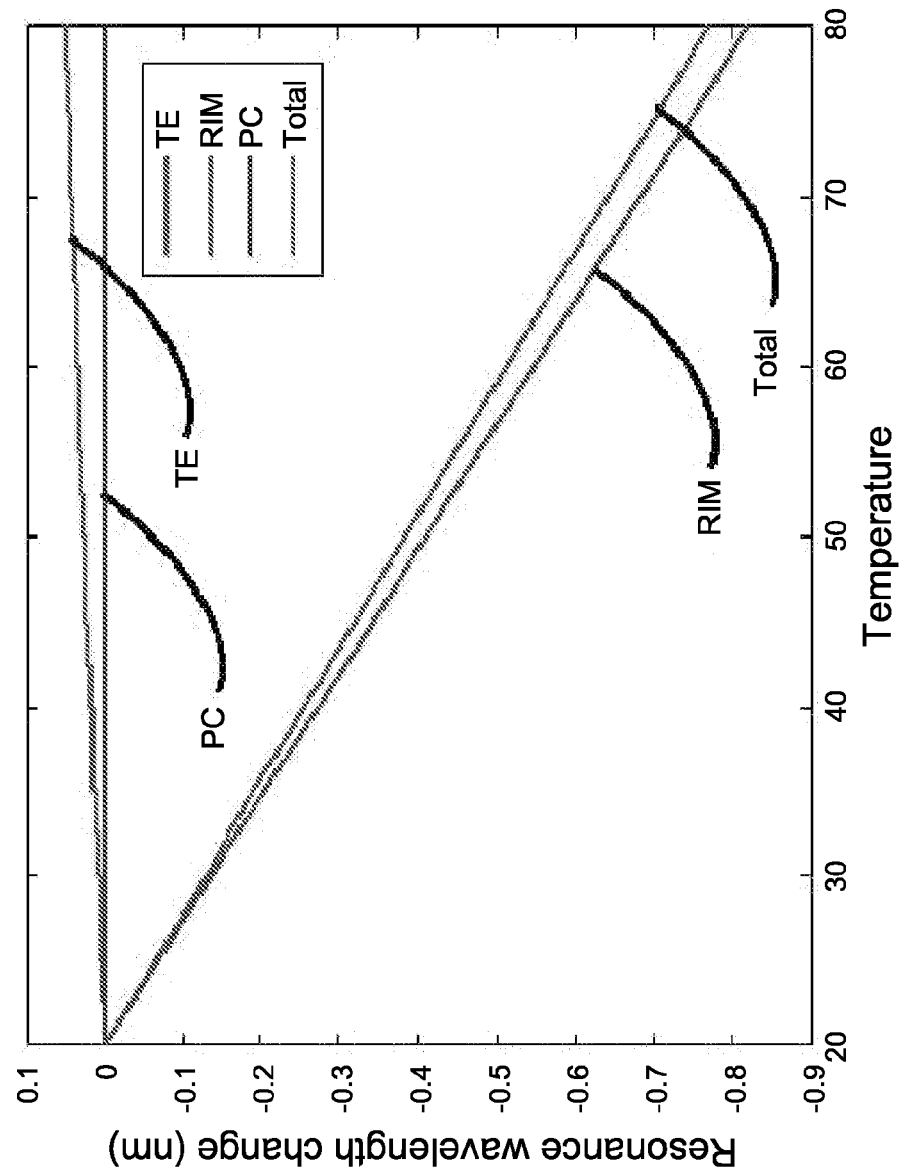
FIG. 8 illustrates the contribution to the resonance wavelength change as a function of temperature from various factors.

FIG. 8 illustrates the contribution from each individual factor described above: thermal expansion of silica (TE), thermally induced variation of the intra-cavity medium refractive index (RIM), and thermally induced variation in the spectral response of the photonic-crystal mirror (PC). FIG. 8 also shows the resonance wavelength change with temperature resulting from the sum of these three effects. Because the intra-cavity medium is taken to be water in this analysis, and because water has a negative thermo-optic coefficient, the contribution of the intra-cavity medium refractive index can be negative, e.g., its sign is opposite that of the other two contributions, hence it partially cancels them. A different choice of materials and/or design parameters could tailor the amount of cancellation and total contribution.

In certain embodiments, the material for the medium of the optical cavity 40 can be advantageously selected for improved thermal stability. In addition to the length of the optical cavity 40, the thermal modulation of the refractive index of the medium of the optical cavity 40 also can contribute to the thermal stability of the sensor 10. For example, $$L = q\frac{\lambda}{2n} \Rightarrow \lambda \propto nL. \tag{2}$$

For no resonance shift:

$$\frac{\partial(nL)}{\partial T} = 0 \Rightarrow n\frac{\partial L}{\partial T} + L\frac{\partial n}{\partial T} = nL\alpha_{SiO_2} + L\frac{\partial n}{\partial T} = 0 \tag{3}$$

$$n\alpha_{SiO_2} = -\frac{\partial n}{\partial T} \Rightarrow \alpha_{SiO_2} = -\frac{1}{n}\frac{\partial n}{\partial T}$$

where L is the length of the optical cavity 40, n is the refractive index of the cavity medium, and $\alpha_{SiO_2}$, is the thermal expansion coefficient of silica. In certain embodiments, this effect can be exploited for thermal stability. For example, in various embodiments, the effect of the thermal expansion of the silica structural element 40 and the refractive index modulation of the medium of the optical cavity 40 cancel each other if the right material is selected for the cavity medium. For example, $$-\frac{1}{n}\frac{\partial n}{\partial T} = \alpha_{SiO_2} = 0.55 \times 10^{-6}/° C. \tag{4}$$

Thus, in certain embodiments, the medium for the optical cavity 40 can be selected for improved thermal stability.

Increased Lateral Dimension or Area of the Diaphragm

As mentioned above, a thicker diaphragm 20 is generally mechanically less compliant than is a thinner diaphragm 20. In addition, one of the strongest damping effects that can limit the sensitivity of the sensor 10 is squeeze-film damping, which is due to the water forced out of the cavity 40 by the moving diaphragm 20, as is described more fully in U.S. Pat. Nos. 7,526,148, 7,630,589; 7,809,219, 7,881,565, and U.S. Pat. Appl. Publ. No. 2011/0041616, each of which is incorporated in its entirety by reference herein.

Certain embodiments described herein restore the compliance of the diaphragm 20 by increasing the diaphragm diameter (e.g., by approximately a factor of 5) or the diaphragm area (e.g., by approximately a factor of 25). Such a significant increase in the diaphragm diameter or area also reduces the squeeze-film damping significantly (e.g., by approximately a factor of 25), since the relative area of the end face of the optical fiber 30 to the area of the diaphragm 20 is reduced. In certain embodiments, the ratio of the diaphragm diameter to the end diameter of the optical fiber 30 is in a range between 1.2 and 8, in a range between 1.5 and 6, or in a range between 2 and 5. In certain embodiments, the ratio of the diaphragm area to the area of the end face of the optical fiber 30 is in a range between 1.4 and 64, in a range between 2.35 and 36, or in a range between 4 and 25. For example, for a diaphragm diameter of about 300 µm and a fiber end diameter of about 125 µm, the diameter ratio is about 2.4 and the area ratio is about 5.76. However, by increasing the diaphragm diameter to about 600 µm, the diameter ratio is about 4.8 and the area ratio is about 23, resulting in a reduction of the squeeze-film damping by about a factor of 23. In certain embodiments, the diaphragm diameter or area is limited by the desired resonance frequency of the diaphragm 20. For example, in certain embodiments in which higher frequencies are to be detected, the diaphragm diameter is less than 1 mm. The use of the diaphragm diameter in describing this feature is not intended to indicate that the diaphragm shape is limited to solely generally circular diaphragms. Other diaphragms having other shapes (e.g., oval, square, octagon, or other polygonal or irregular shapes) may also be used in accordance with certain embodiments described herein. In these embodiments, the diaphragm 20 has a lateral dimension and the compliance of the diaphragm 20 can be restored by increasing the diaphragm lateral dimension as described above. In these embodiments, the compliance of the diaphragm 20 can be restored by increasing the cross sectional area of the diaphragm 20.

Pressure-Equalization Channels

As discussed above, the reflective element 22 (e.g., a reflective surface on the outside of the diaphragm 20) of certain embodiments can be a dielectric- or metal-based mirror, or a photonic-crystal reflector. As described in U.S. Pat. Nos. 7,526,148, 7,630,589; 7,809,219, 7,881,565, and U.S. Pat. Appl. Publ. No. 2011/0041616, each of which is incorporated in its entirety by reference herein, a photonic-crystal mirror reflector can also serve as the mechanical diaphragm 20 comprising a reflective element 22. Besides serving to provide the refractive index and periodicity of the photonic-crystal structure, the holes extending through the diaphragm 20 in certain such embodiments can serve as pressure-equalization channels as well, to allow the hydrostatic pressures between the outside and inside of the sensor 10 to equalize. However, using the same holes to tailor the optical properties of the photonic-crystal reflector, the mechanical compliance of the diaphragm 20, and the acoustic response of the sensor 10 at low frequencies can create challenges in designing the optimum sensor 10 for a given application.

Figure 9:
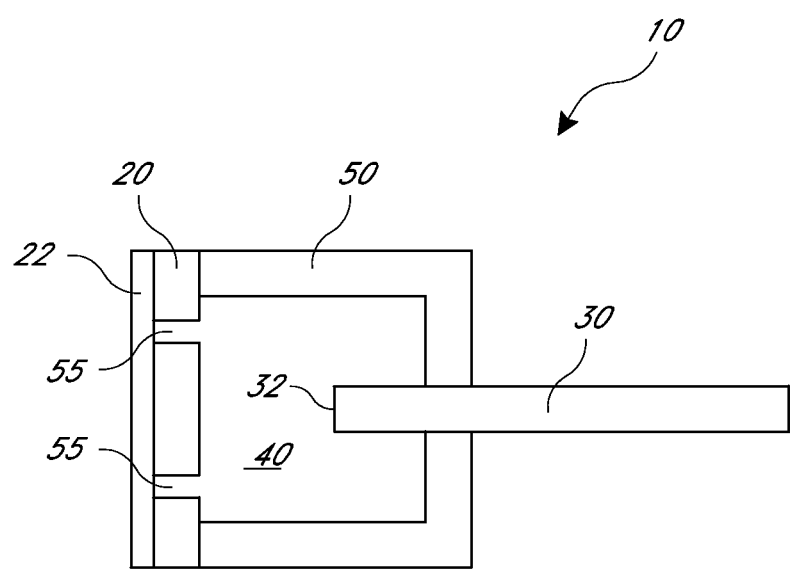
FIG. 9 schematically illustrates an example of an acoustic sensor with fluid conduits in accordance with certain embodiments described herein.

In certain embodiments, this issue can be alleviated wholly or in part as follows. A set of one or more fluid conduits (e.g., holes) is formed (e.g., by etching or drilling) in the sensor 10 to allow fluid flow from one side of the diaphragm 20 to the other for pressure equalization across the diaphragm 20. In certain embodiments, as shown in FIG. 9, one or more of the fluid conduits 55 can be through the diaphragm 20. For example, the one or more fluid conduits 55 can be through a diaphragm 20 sufficiently thick to reduce the sensitivity to thermal effects as described above, or through a thicker diaphragm 20 that is mechanically less compliant as described above.

In certain embodiments, one or more of the fluid conduits 55 are separate from the photonic-crystal structures of the diaphragm 20 (e.g., holes in a thick diaphragm 20 as described above) which affect the optical properties of the reflector or reflective element 22. For example, in certain such embodiments, one or more of the fluid conduits 55 are located in a portion of the diaphragm 20 which does not contribute to the optical properties of the Fabry-Perot cavity 40, e.g., separate from the reflective element 22. In certain other embodiments, as shown in FIG. 1B, one or more of the fluid conduits 55 are separate from the diaphragm 20 (e.g., conduits through or along a portion of the structural element 50). In some embodiments, the sensor 10 can include one or more fluid conduits 55 in both the diaphragm 20 and the structural element 50. In certain embodiments, the total cross-sectional area of the set of one or more fluid conduits is in a range between about 1 µm$^2$ and about 50 µm$^2$. In certain embodiments, the total cross-sectional area of the one or more fluid conduits is sufficiently small such that, at the desired operational acoustic frequency range, the fluid (e.g., water) preferably moves through the one or more fluid conduits rather than through the photonic-crystal structures (e.g., holes).

Certain embodiments described herein allow the optical and acoustic design constraints to be separately satisfied, thereby allowing better sensor optimization. For example, by having one or more fluid conduits 55 which are separate from the photonic-crystal holes which provide the optical properties of the photonic-crystal reflective element 22, other photonic-crystal reflector structures can be used which do not provide a fluid conduit for fluid flow across the diaphragm 20 (e.g., photonic-crystal structures with protrusions rather than holes, or photonic-crystal structures with holes that do not go through the full thickness of the diaphragm 20). This method of separating the optical, mechanical, and acoustical design is not specific to a thick diaphragm 20, and can also be employed for thinner diaphragms 20, whenever it is desired to decouple the mechanical and acoustical functions from the optical function of the photonic-crystals structures (e.g. holes).

Reduced Diffraction Losses

In certain embodiments, the thicker diaphragm 20 described above (e.g., the diaphragm 20 sufficiently thick to reduce the sensitivity to thermal effects, or the thicker diaphragm 20 that is mechanically less compliant) can result in an increase of the optical path length between the first end 32 of the optical fiber 30 and the reflective element 22, which can cause additional diffraction loss. Unless counteracted in some way, this additional diffraction loss can reduce the reflectivity, and hence the sensitivity of the sensor 10.

Figure 10:
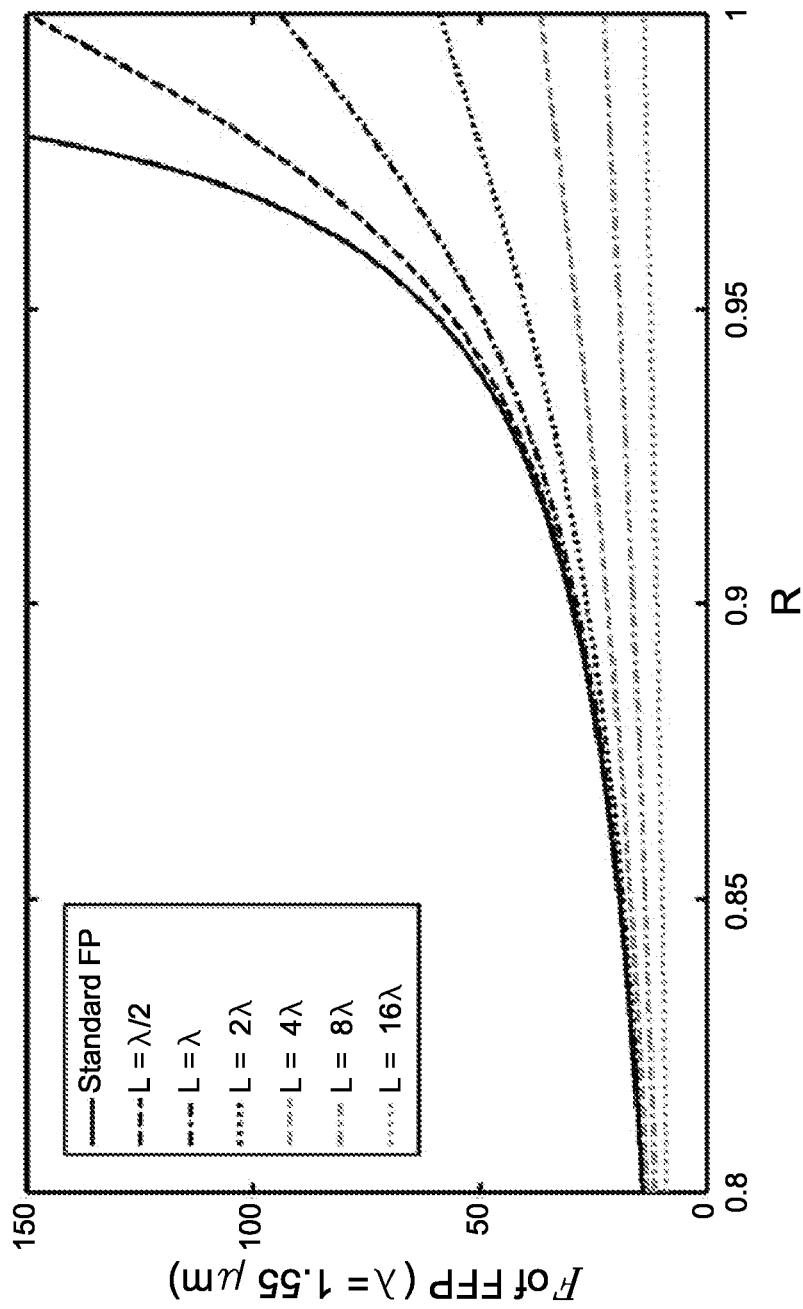
FIG. 10 shows the finesse of a fiber Fabry-Perot calculated for varying reflectivities and cavity lengths in accordance with certain embodiments described herein.

FIG. 10 shows the finesse of a fiber Fabry-Perot cavity 40 (e.g., as depicted in FIG. 4B) as a function of reflectivity and for various cavity lengths in accordance with certain embodiments described herein. The finesse of the fiber Fabry-Perot cavity 40, which can be termed the "effective finesse," includes the effect of diffractive loss of energy which is not coupled back into the optical fiber 30. The curves of FIG. 10 were calculated for a Fabry-Perot cavity 40 formed by an SMF-28 single-mode fiber 30 and a reflective element 22, and by varying both the cavity length 40 and the reflectivities of the reflective element 22. See, e.g., Kilic et al., "*Asymmetrical Spectral Response in Fiber Fabry-Perot Interferometers*," J. Lightwave Technology, vol. 27, no. 24, pages 5648-5656 (2009). The solid line of FIG. 10 corresponds to the calculated finesse as a function of reflectivity for a standard Fabry-Perot cavity between two planar and infinite reflective surfaces. For larger cavity 40 lengths, as would be the case for a thick diaphragm 20, the finesse is dominated by diffraction loss, and is therefore not affected much by the reflectivities of the reflective element 22 (see, e.g., the lines corresponding to cavity lengths of 8$\lambda$, and 16$\lambda$). Since the sensor sensitivity is proportional to finesse, a high finesse is desirable to improve the sensitivity of the sensor 10 (e.g., by reducing the diffraction loss).

Figure 11A:
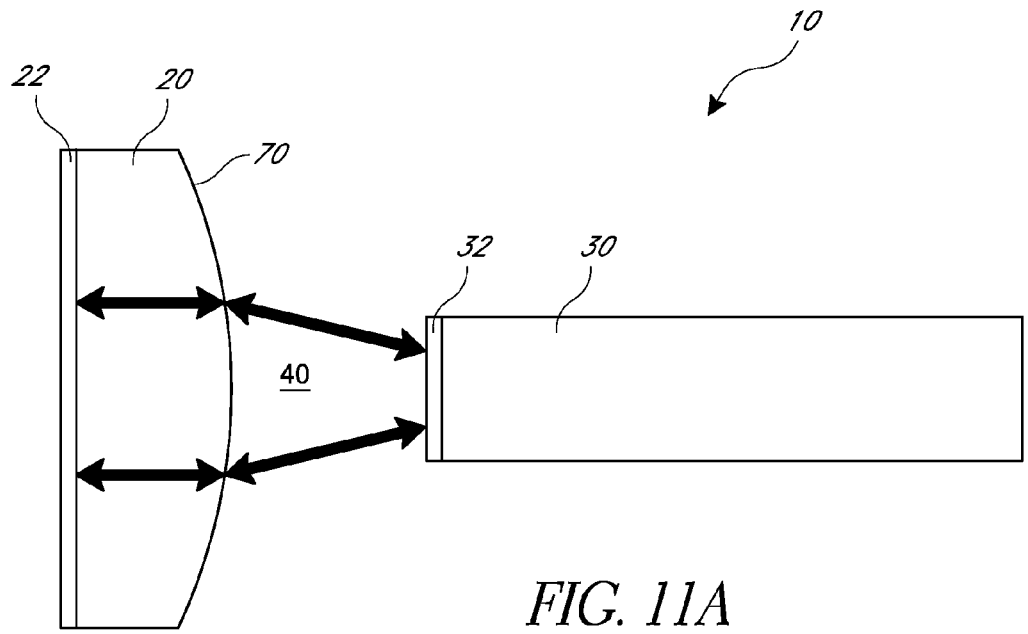
FIGS. 11A-11B schematically illustrate example focusing elements in accordance with certain embodiments described herein.
Figure 11B:
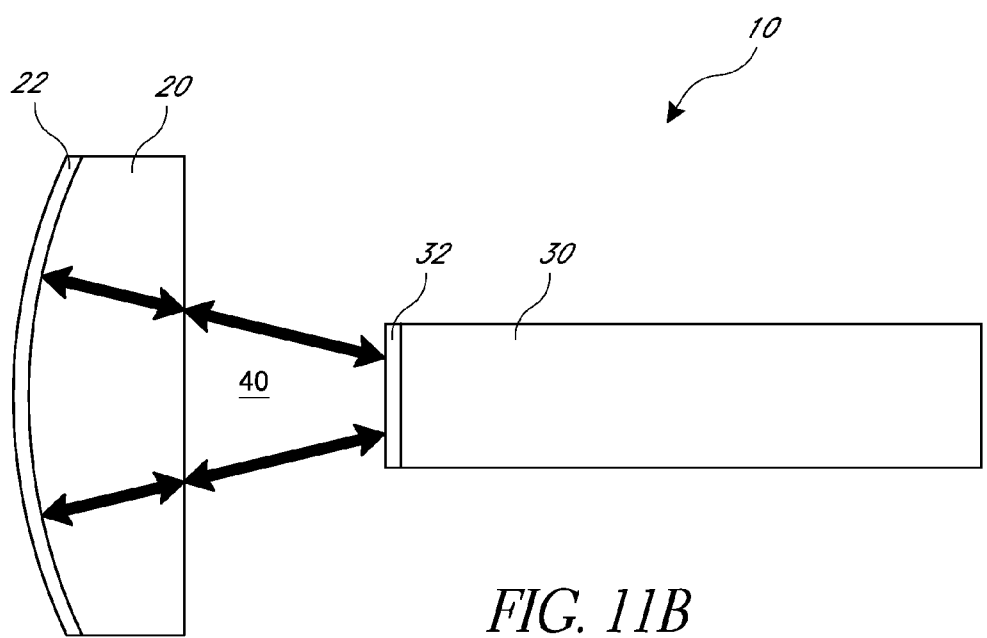

In certain embodiments, the sensor 10 comprises a focusing element 70 (e.g., a lens or curved mirror) as part of the optical path of the Fabry-Perot cavity 40 in order to reduce diffraction loss. FIGS. 11A-11B schematically illustrate two example focusing elements 70 in accordance with certain embodiments described herein. FIG. 11A schematically illustrates a diaphragm 20 comprising a lens structure 70 (e.g., a curved surface fabricated as at least a part of the surface of the diaphragm 20 facing towards the optical fiber 30). FIG. 11B schematically illustrates a diaphragm 20 comprising a curved reflective surface or layer 70 (e.g., a curved mirror fabricated as at least a part of the surface of the diaphragm 20 facing away from the optical fiber 30). In certain embodiments, the curvatures of either the lens structure or the reflective surface of layer 70 can be chosen so that the mode-field diameter of the light beam reflected back to the fiber's end face is matched to the mode-field diameter of the fiber mode, such that the diffraction loss can be substantially reduced or eliminated. For example, in certain embodiments, the radius of curvature of either the lens structure or the reflective surface of layer 70 is in a range between about 0.1 mm and about 0.6 mm.

As schematically illustrated by FIGS. 11A-11B, the focusing element 70 (e.g., the lens and/or curved mirror) of certain embodiments is a part of the diaphragm 20. In certain other embodiments, the focusing element 70 is separate from the diaphragm 20 but is still part of the optical path of the Fabry-Perot cavity 40. For example, the focusing element 70 can comprise a separate slab or structure spaced away from the diaphragm 20 (e.g., a lens structure between the diaphragm 20 and the optical fiber 30 or a structure positioned on the optical fiber 30). Other configurations are also compatible with certain embodiments described herein.

Improved Dynamic Range

Figure 12:
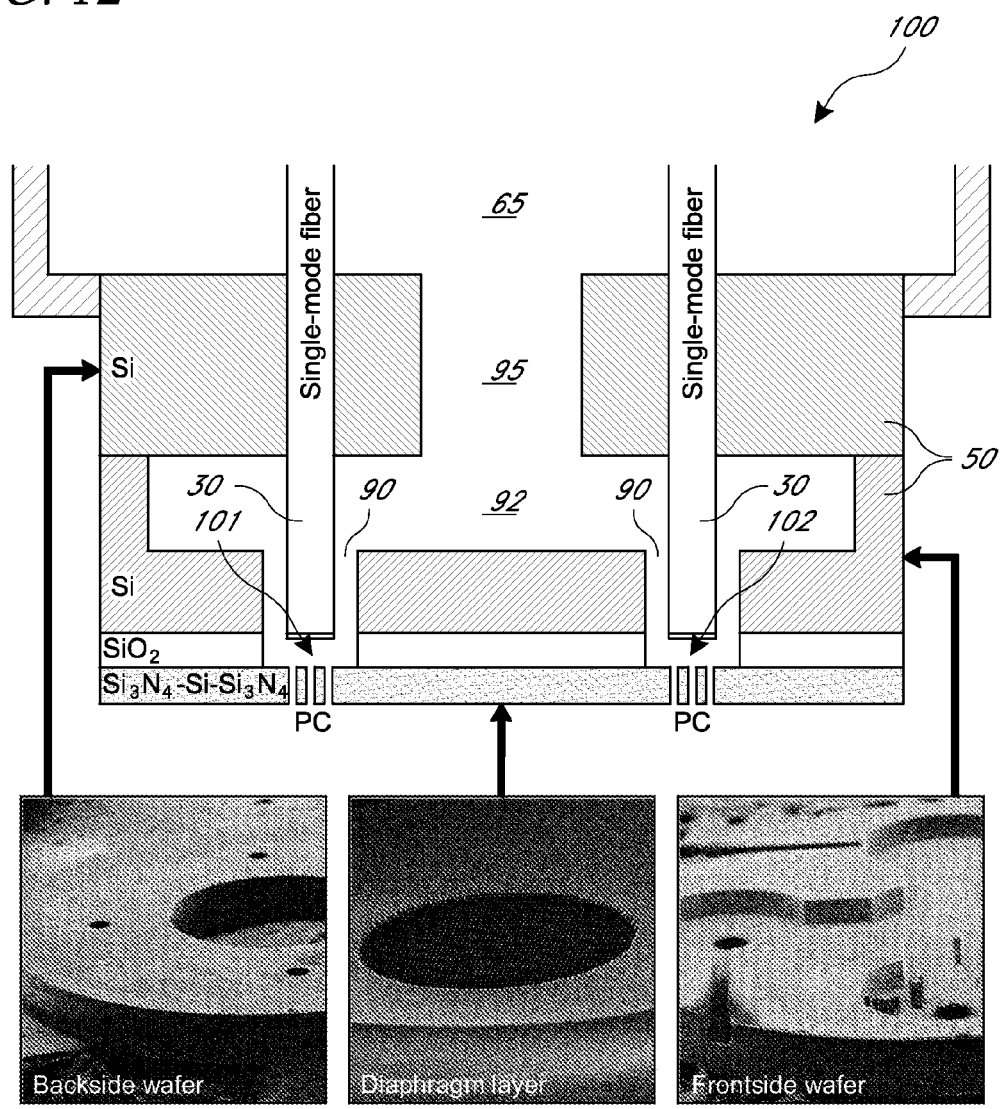
FIG. 12 schematically illustrates an example of an acoustic sensor compatible with certain embodiments described herein.

FIG. 12 schematically illustrates an example of an acoustic sensor system 100 having a plurality of sensors compatible with certain embodiments described herein. Scanning electron micrographs of an example backside wafer, diaphragm 20, and frontside wafer are shown beneath the schematic. In this example, the structural element 50 (comprising the backside wafer and the frontside wafer) is fabricated with silicon, and the reflective element 22 of the diaphragm 20 comprises photonic-crystal mirrors positioned to form optical cavities with the two single-mode optical fibers 30.

In ocean acoustics, because water is practically incompressible, the diaphragm 20 may not move against a small close Fabry-Perot cavity filled with water. Thus, channels 90, e.g., diaphragm-sized channels, can be fabricated around the fibers to allow water to flow out of the optical cavity 40 and to allow the diaphragm 20 to move. In certain embodiments, the diaphragm-sized channels 90 are between about 0.1 mm and about 0.4 mm in diameter, between about 0.15 mm and about 0.35 mm in diameter, or between about 0.2 mm and about 0.3 mm in diameter. In certain embodiments, the diaphragm-size channels 90 define the diameters of the diaphragms 20 and provide a connection around the optical fibers 30 to expanded channels 92. The expanded channels 92 can further lead to a backchamber channel 95. In certain embodiments, the expanded channels 92 are larger than the diaphragm-sized channels 90 to reduce flow resistance within the expanded channels 92. The backchamber channel 95 can be a large hole at the center of the structural element 50. In certain embodiments, the backchamber channel 95 is between about 1 mm and 2 mm in diameter, e.g., about 1.5 mm in diameter.

In certain embodiments, as shown in FIG. 12, two or more sensors 101, 102 that are responsive to different acoustic signal levels can be used in parallel with one another to improve the dynamic range of the sensor system 100. In certain such embodiments, the plurality of parallel sensors 101, 102 are placed close to each other, so that they are exposed to approximately the same acoustic signal. In certain embodiments utilizing two sensors (e.g., a first sensor 101 and a second sensor 102), the first sensor 101 can be used to measure weak acoustic signals, and the second sensor 102 can be used to measure stronger signals. In this way, the total dynamic range of sensor system 100 with the two combined sensors 101, 102 is larger than the dynamic range of either sensor 101 or 102 alone.

In certain embodiments, at least one sensor of the plurality of sensors (e.g., the second sensor 102 of the first and second sensors 101, 102) can measure stronger signals, but has a reduced sensitivity, as compared to the other sensors (e.g., the first sensor 101) of the plurality of sensors. In certain such embodiments, the sensitivity of at least one sensor is reduced by various methods, techniques, or modifications. For example, the finesse of the Fabry-Perot cavity 40 of the at least one sensor (e.g., the second sensor 102) can be reduced by using a reflective element 22 having a lower reflectivity, by using a longer Fabry-Perot cavity 40, or both. Such modifications of the Fabry-Perot cavity 40 cause a higher diffraction loss and thereby reduce the finesse of the Fabry-Perot cavity 40.

In certain other embodiments, the mechanical compliance of the diaphragm 20 in the at least one sensor (e.g., the second sensor 102) can be reduced as compared to the other sensors (e.g., the first sensor 101). For example, a thicker diaphragm 20, and/or a diaphragm 20 with a smaller diameter, and/or a diaphragm 20 made of a less compliant material can be used to reduce the mechanical compliance of the diaphragm 20.

In certain embodiments, at least one sensor can utilize an optical detection scheme different than that of a Fabry-Perot cavity 40. For example, at least one sensor can comprise a bare fiber 30 (e.g., a fiber 30 without any reflective element 32 on its end), such that there is no significant reflection from its end face (since silica-water interface reflection is less than 0.3%). The motion of the diaphragm 20 in certain such embodiments only affects the amount of light coupled back into the optical fiber 30, since the coupling is dependent on the spacing between the diaphragm 20 and the fiber end. The coupled signal, consequently, can be used in the same way the Fabry-Perot signal is used to measure the acoustic signal.

Reduced Cross-Coupling Between Sensors

Due to the low compressibility of water, movement of the diaphragm 20 in response to an acoustic signal results in a flow of water in and out of the optical cavity 40. In certain embodiments, a reservoir, referred to as the backchamber 65, is provided inside the sensor 10. The backchamber 65 comprises a volume of water (e.g., a few cubic millimeters in size) that is in fluidic communication with the optical cavity 40. When two or more sensors 101, 102 are employed in parallel to increase the dynamic range, as discussed above, the large size of the backchamber 65 may make it impractical in some embodiments to employ separate backchambers 65 for each sensor 101, 102. Therefore, in certain embodiments utilizing parallel sensors 101, 102, a single backchamber 65 can be shared by multiple, or even all, sensors 101, 102. However, such a configuration in certain embodiments can allow cross-coupling of the signal and noise between the sensors 101, 102 sharing a backchamber 65.

Figure 13A:
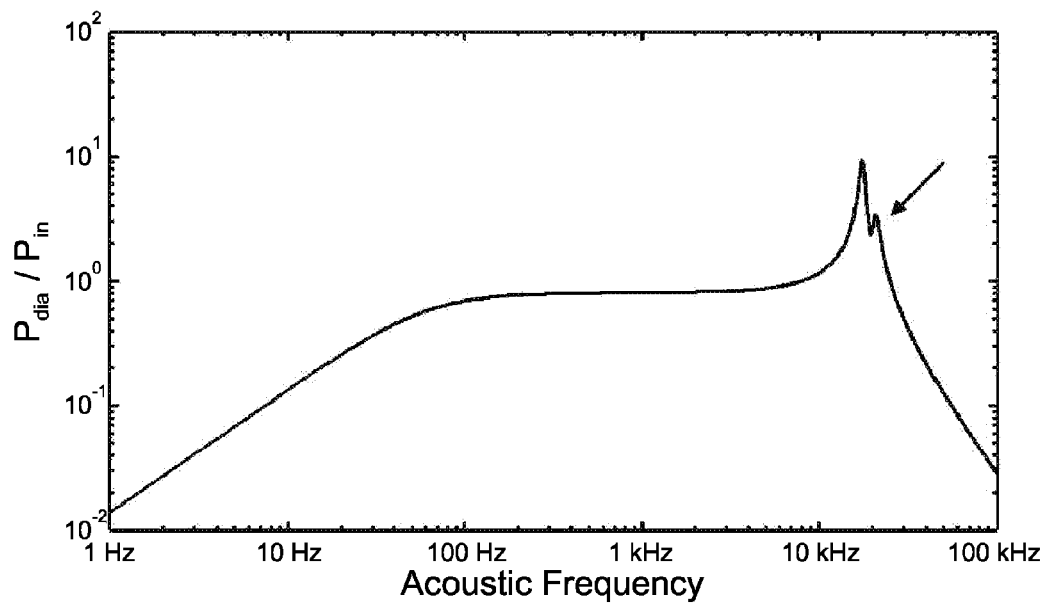
FIG. 13A is an example response curve exhibiting cross-coupling for a first sensor in parallel with a second sensor.
Figure 13B:
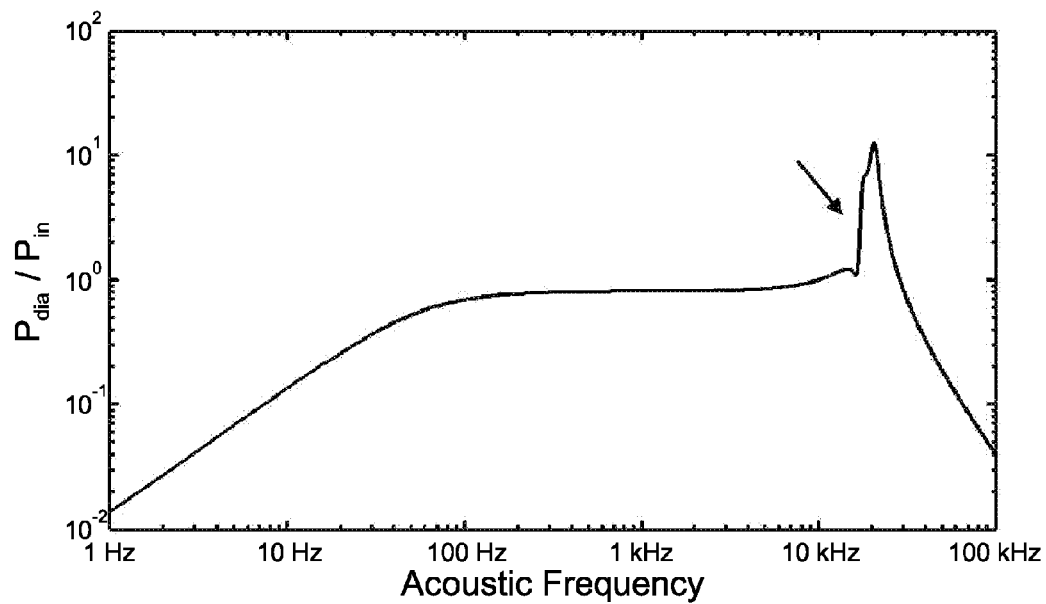
FIG. 13B is an example response curve exhibiting cross-coupling for a second sensor in parallel with a first sensor.

FIGS. 13A and 13B are plots of the example responses of a first sensor 101 (e.g., FIG. 13A) and a second sensor 102 (e.g., FIG. 13B) of a pair of two sensors 101, 102 in parallel with one another, sharing the same backchamber 65. For this particular example of FIGS. 13A and 13B, (i) the first sensor 101 has a 0.5-μm-thick diaphragm 20 with a diameter of 200 μm, and the resonance of the first sensor 101 is at 18 kHz, (ii) the second sensor 102 has a diaphragm 20 with the same thickness as the first sensor 101, but with a 180-μm-diameter and a resonance at 21 kHz, and (iii) the backchamber 65 is a cylindrical volume with a radius of 3 mm and a length of 5 mm, and it has a Helmholtz resonance of 82 kHz.

As is evident from FIGS. 13A and 13B, the two sensors 101, 102 couple to each other, and introduce additional resonant features. The arrow of FIG. 13A points to a resonance feature in the response of the first sensor 101 due to coupling from the signal of the second sensor 102, and the arrow of FIG. 13B points to a resonance feature in the response of the second sensor 102 due to coupling from the signal of the first sensor 101. This cross-coupling can be detrimental, in certain embodiments, to the sensor performance, since it complicates the response and couples noise between sensors 101, 102, so that the noise floor for each sensor 101, 102 is increased.

Figure 14A:
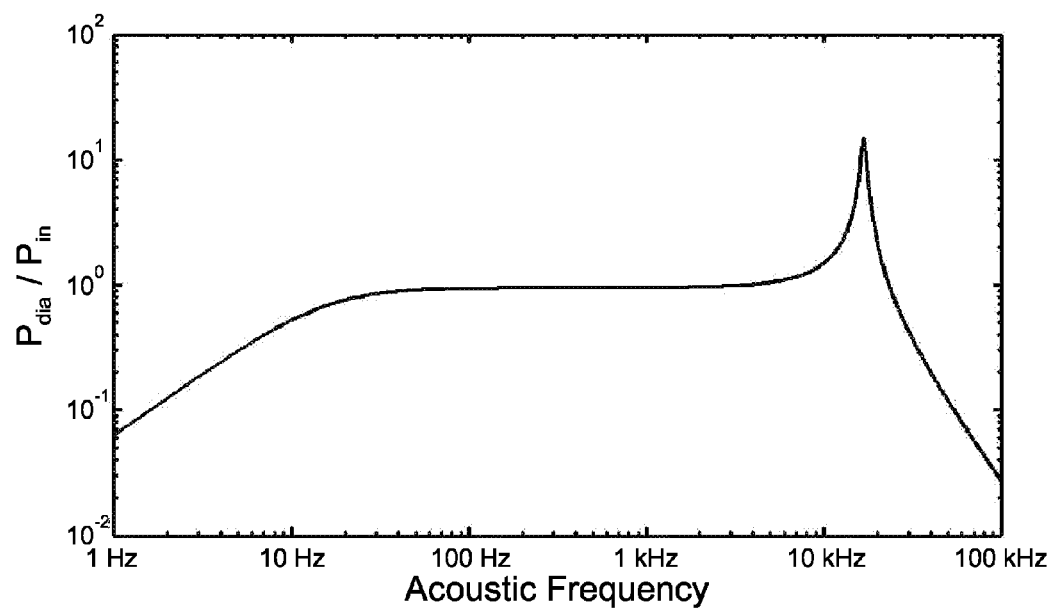
FIG. 14A is an example response curve exhibiting a reduced or substantially eliminated cross-coupling for a first sensor in parallel with a second sensor in accordance with certain embodiments described herein.
Figure 14B:
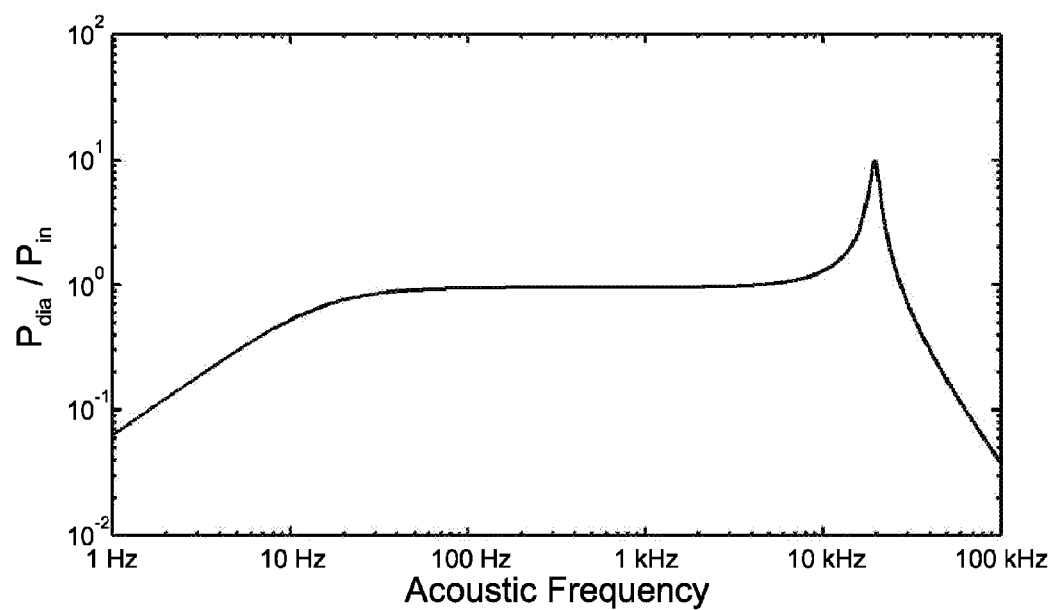
FIG. 14B is an example response curve exhibiting a reduced or substantially eliminated cross-coupling for a second sensor in parallel with a first sensor in accordance with certain embodiments described herein.
Figure 15A:
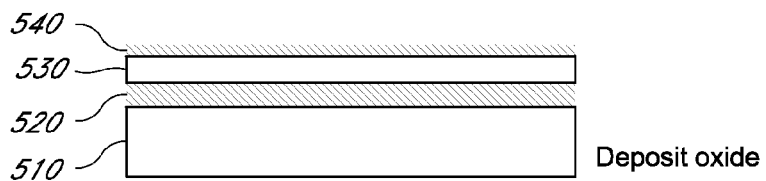
FIG. 15 schematically illustrates an example photolithography fabrication process in accordance with certain embodiments described herein.
Figure 15B:
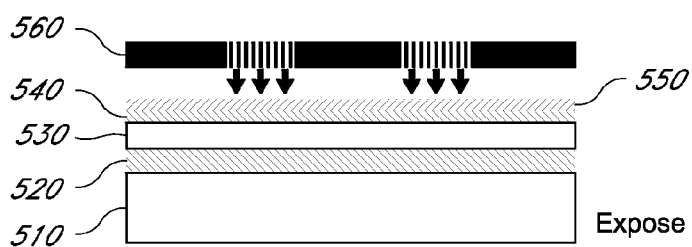
Figure 15C:
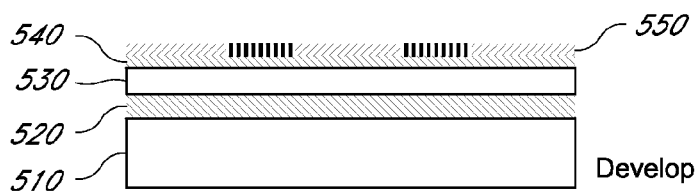
Figure 15D:
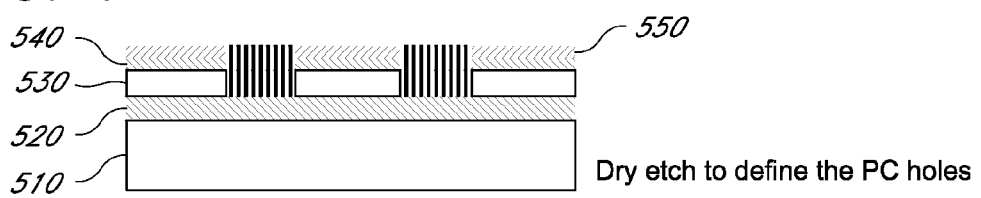
Figure 15E:
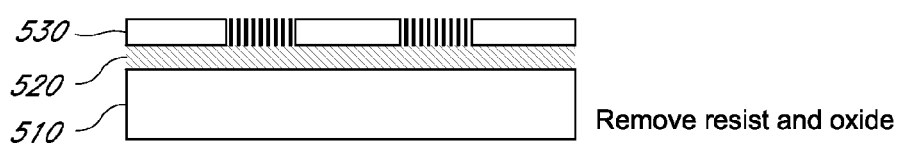
Figure 16A:
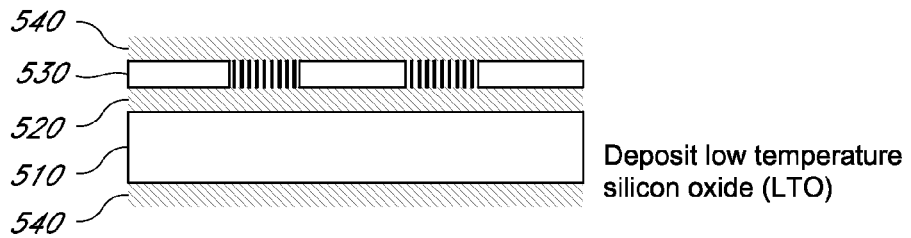
FIG. 16 schematically illustrates an example fabrication process for producing a backside pattern in accordance with certain embodiments described herein.
Figure 16B:
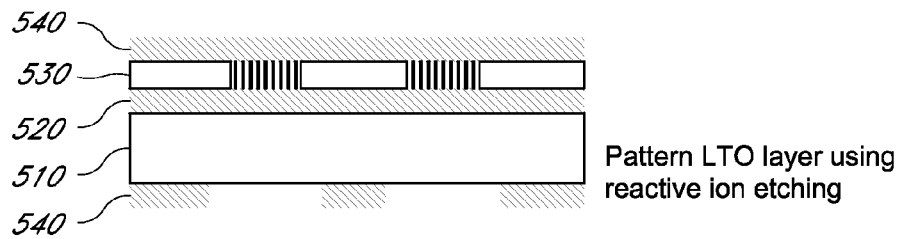
Figure 16C:
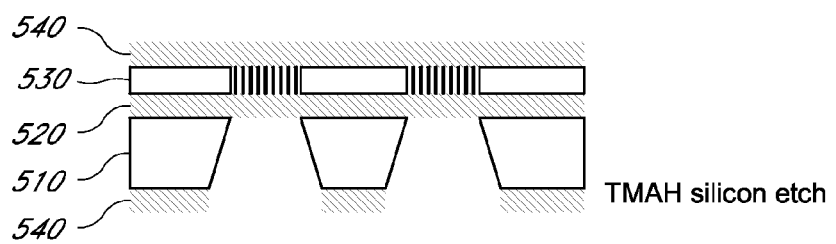
Figure 16D:
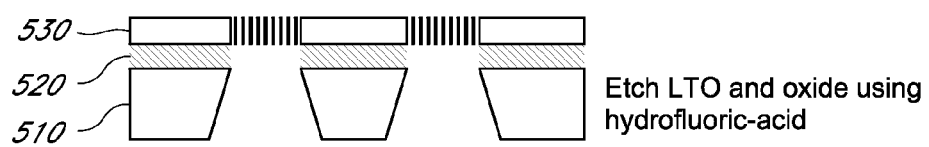

Certain embodiments described herein advantageously eliminate cross-coupling between the two or more parallel sensors 101, 102. In certain such embodiments, the Helmholtz resonance of the backchamber 65 and the sensor resonances are tailored so that they are substantially equal in frequency with one another. In certain such embodiments, at the Helmholtz resonance, the impedance of the backchamber 65 is zero such that the two parallel sensors 101, 102 are acoustically grounded, hence uncoupled. Certain such embodiments advantageously eliminate or reduce cross-coupling between the two or more sensors 101, 102, as illustrated in FIGS. 14A and 14B. For the case of FIGS. 14A and 14B, the backchamber length is increased to 23 mm, such that its Helmholtz resonance becomes 18 kHz. In this way, the sensor resonances are very close to the backchamber Helmholtz resonance, and cross-coupling between the first sensor 101 and the second sensor 102 is substantially eliminated. In certain embodiments, the Helmholtz resonance of the backchamber 65 and the sensor resonance are less than 1%, less than 2%, less than 3%, less than 5%, less than 8%, or less than 10% from each other. While the response curves of FIGS. 14A and 14B are plotted for the case when there is a first sensor 101 and a second sensor 102 in parallel, the curves substantially match the curve for an individual sensor, with no other sensor parallel to it. Thus, optimizing the Helmholtz resonance in certain embodiments can be an effective way to reduce or completely eliminate cross-coupling.

Air Bubbles to Increase Sensitivity

For a sensor 10 generally assembled in air, when it is immersed into water, water will gradually fill the sensor 10, which can provide insensitivity to hydrostatic pressure. Sometimes, however, some amount of air may remain inside the sensor 10 and one or more gas or air bubbles (ranging in size between about 0.1 mm and about 2 mm diameter) can be trapped inside the sensor 10. It is possible to generally avoid such gas or air bubbles by putting a surfactant into the water, such as a standard dish soap detergent, so that the surface tension of water is reduced, and water can flow easily into the sensor 10. In certain embodiments, however, it is beneficial to keep the one or more gas or air bubbles inside the sensor 10, or to introduce one or more gas or air bubbles deliberately into the sensor 10. In certain embodiments, the one or more gas or air bubbles advantageously generally increase the sensitivity of the sensor 10, while reducing its frequency bandwidth.

For example, in certain embodiments, the presence of a small air bubble in the backchamber 65 has a negligible effect on the acoustic mass. However, because of the compressibility of water is very small, the stiffness of the backchamber 65 can be dominated by the compressibility of the air bubble. The overall stiffness of the diaphragm 20 and backchamber 65 system can therefore be reduced in certain embodiments, which decreases the resonance frequency. The reduction in resonance frequency in certain embodiments is not strongly dependent on the size of the air bubble (as long as it is larger than approximately 100 μm), since the mass is generally dominated by water, and the compressibility is generally dominated by air. Certain embodiments of the sensor 10 can advantageously measure pressures as low as 3.5 $\mu Pa/Hz^{1/2}$ in a frequency range of 100 Hz to 10 kHz. This enhanced minimum detectable pressure can be provided by the increased compressibility in the backchamber 65 caused by the trapped air. In certain embodiments, the sensor 10 can advantageously measure pressures less than 10 $\mu Pa/Hz^{1/2}$, less than 9 $\mu Pa/Hz^{1/2}$, less than 8 $\mu Pa/Hz^{1/2}$, less than 7 $\mu Pa/Hz^{1/2}$, less than 6 $\mu Pa/Hz^{1/2}$, less than 5 $\mu Pa/Hz^{1/2}$, less than 4 $\mu Pa/Hz^{1/2}$, or less than 3 $\mu Pa/Hz^{1/2}$.

Thus, in certain embodiments, the one or more gas or air bubbles may be used where sensitivity is more significant for the application of the sensor 10, and bandwidth can be sacrificed. The one or more gas or air bubbles serve as a generally compressible (e.g., more compressible than water) and generally elastic element within the sensor 10 which substantially dominates the compressibility of the contents of the sensor 10.

Fabrication Process

In certain embodiments, the fabrication process of the acoustic sensor 10 involves silicon microfabrication techniques. FIG. 15 schematically illustrates an example fabrication process in accordance with certain embodiments described herein. Other techniques are possible. A silicon-on-insulator (SOI) wafer includes a silicon substrate 510, a buried oxide layer 520 having a thickness of approximately 1 μm, and a silicon device layer 530 having a thickness of approximately 450 nm. A low temperature oxide (LTO) layer 540 is deposited on the SOI wafter, as shown in (a) of FIG. 15. Then, the wafer is coated with photoresist 550 and exposed using photolithography, e.g. using a photolithography mask 560, as shown in (b) of FIG. 15. The LTO layer 540 is then etched with plasma etch to form the structure shown in (c) of FIG. 15. This patterned LTO layer 540 is used as a hard mask to etch the silicon layer 530 underneath, as shown in (d) of FIG. 15. Once the front side is patterned with the photonic-crystal structure, as shown in (e) of FIG. 15, the back side is patterned to release the photonic-crystal structure of the silicon device layer 530.

FIG. 16 schematically illustrates an example fabrication process for producing a backside pattern in accordance with certain embodiments described herein. As shown in (a) of FIG. 16, a low temperature silicon oxide (LTO) layer 540 is deposited on the silicon substrate 510 (e.g., the silicon substrate 510 resulting from the process described above in conjunction with FIG. 15). As drawn in (a) of FIG. 16, a LTO layer 540 can be deposited on each of both sides of the silicon substrate. In certain embodiments, one or more nitride layers (e.g., $Si_3N_4$ not shown) can be deposited on each of the LTO layers 540. These nitride layers can help compensate for residual stresses in the silicon layer 530. For example, in certain embodiments, $Si_3N_4$ is deposited under tensile stress, which can compensate for the compressive stress due to the silica ($SiO_2$) films. The LTO layer 540 on the surface of the silicon substrate 510 opposite to the silicon device layer 530 is patterned using reactive ion etching as shown in (b) of FIG. 16. At least a portion of the silicon substrate 510 on the backside is removed (e.g., using tetramethylammonium hydroxide (TMAH) wet etch), as shown in (c) of FIG. 16. Finally, as shown in (d) of FIG. 16, at least a portion of the buried oxide layer 520 and the remaining portions of the LTO layers 540 on each side of the silicon substrate 510 are removed (e.g., using hydrofluoric-acid) to release the structure of the silicon device layer 530. With this example fabrication method, more than 250 chips can be fabricated on a 4-inch wafer. Utilizing the parallel fabrication process provided by the example photolithography process of FIGS. 15 and 16, the number of sensors 10 that can be fabricated at a given time can be increased substantially, thus the cost can be reduced, which can be very important for commercial mass production.

Figure 18:
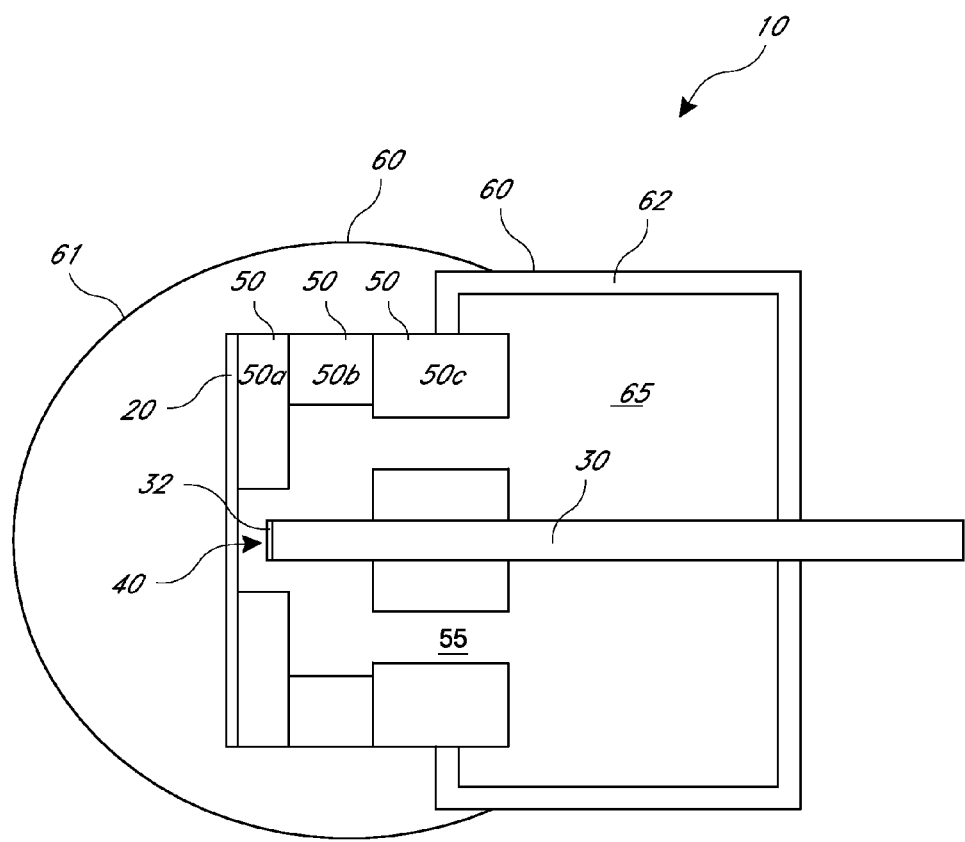
FIG. 18 schematically illustrates the wafers after they have been bonded together and attached to the photonic-crystal structure and the optical fiber to form the sensor head in accordance with certain embodiments described herein.

In certain embodiments, as shown in FIG. 1B, the body of the sensor 10, e.g. the structural element 50 can be fabricated of a plurality of elements. For example, the structural element 50 can be fabricated by bonding together several wafer portions (e.g., portions of 4"-diameter fused silica wafers), each of which has a different pattern of holes, e.g., pressure equalization channels as discussed above. FIGS. 17A-17C schematically illustrate example portions of three individual wafers 50a, 50b, 50c and their patterns of holes to be used as building blocks of the silica structural element 50 in accordance with certain embodiments described herein. While the holes of FIGS. 17A-17C are generally circular, other shapes of holes (e.g., square, rectangular, triangular, polygonal, oval, or irregular) may also be used. The diameters of the example holes are 0.3 mm, 2 mm, and 0.2 mm for 50a, 50b, and 50c of FIGS. 17A-17C, respectively. The diameters of the holes can be tailored to other diameters. FIG. 18 schematically illustrates example locations of the wafers 50a, 50b, 50c of FIGS. 17A-17C being bonded together and attached to the photonic-crystal structure of the diaphragm 20 and the optical fiber 30 to form the sensor head in accordance with certain embodiments described herein. In this embodiment, the photonic-crystal structure serves as the reflective element 22 of the diaphragm 20. The wafer thicknesses in certain embodiments are 0.5 mm. In other embodiments, the wafer thicknesses can be between about 0.3 mm and 0.7 mm, or between about 0.4 mm and 0.6 mm. Both sides of each wafer (e.g., 50a, 50b, 50c of FIGS. 17A-17C) can be polished for bonding purposes.

For producing the wafer portions, a two-dimensional array of circular holes can be etched through each wafer with the pattern or array comprising a plurality of cells with each cell corresponding to one sensor head. For example, FIGS. 17A-17C only show one cell of this pattern for the three wafers 50a, 50b, 50c with the one cell utilized to form one sensor head. In certain embodiments, the hole closest to the diaphragm 20 (e.g., shown in FIG. 17A and having a diameter of 0.3 mm) defines the dimension over which the diaphragm 20 of the acoustic sensor 10 will be allowed to flex, which affects the acoustic sensitivity of the final device (e.g., the larger the diaphragm 20, the more sensitive the sensor 10). The second and third layers (e.g., shown in FIG. 17B and FIG. 17C) of certain embodiments define the channels for the water flow from the diaphragm 20 to the backchamber 65 shown in FIG. 18 (e.g., in the case of a hydrophone). In certain embodiments, silica wafers produced at Valley Design of Santa Cruz, Calif. and patterned by Mindrum Precision of Rancho Cucamonga, Calif. can be utilized.

In certain embodiments, following the fabrication of the photonic-crystal structure of the diaphragm 20, the silicon-on-insulator (SOI) wafer is bonded to the silica wafers using a technique called silicate bonding (hydroxide-catalysis bonding as described in the Laser Interferometer Gravitational-Wave Observatory (LIGO) project). In this method, a hydroxide catalyzes the silica surface by hydration and dehydration. Because the surfaces are desired to be in close contact to bond, a flatness of $\lambda/10$ or better is used on the surfaces in certain embodiments. Furthermore, in certain embodiments, hydrophilic surfaces with a high density of Si—OH groups are utilized for a successful bonding. The procedure applied to achieve the bonding in certain embodiments includes rinsing the substrates under de-ionized (DI) water to wash off any particles, and wiping the surface with methanol to dry. Next, approximately 5 ml from a sodium silicate solution are drawn with a pipette, and DI water is transferred to the sodium silicate solution to obtain approximately 25 ml (1:4) of bonding solution. Approximately 1.0 ml of this bonding solution is extracted using a fresh pipette, and dispensed onto the glass. Then, the two surfaces to be bonded are brought together into contact with pressure.

In certain embodiments, this process is utilized to bond the SOI wafers having the diaphragms to the silica wafers, each of which are again bonded to another silica wafer using the same silicate bonding technique. In certain embodiments, two silica wafers, e.g., 50b shown in FIGS. 17B and 50c shown in FIG. 17C, are bonded together. On top of this stack, another silica wafer, e.g., 50a shown in FIG. 17A, is bonded to the wafer 50b. Then, the SOI wafer is bonded to wafer 50a. The alignments utilized during this example process to center the corresponding holes can be performed under a microscope. This stack comprising four 4" wafers, and the 2D array of sensors can be diced into individual cells to obtain the individual sensors. Bonding can be done using silicate bonding, or thermal bonding, as examples.

Once the silica wafers 50a, 50b, 50c and the SOI wafer comprising the diaphragm 20 are bonded using silicate bonding technique, the sensor 10 is further assembled. The sensor 10 assembly process of certain embodiments comprises holding the sensor head fixed with a vacuum chuck and moving an optical fiber 30 with a reflective element 32 (e.g., at the tip of the optical fiber 30) in close proximity to the diaphragm 20. During this process, the reflection spectrum can be monitored, with the cavity length 40 inferred from a classic measurement of the Fabry-Perot cavity free spectral range. Once the correct cavity length 40 is achieved, the optical fiber 30 can be bonded to the structural element 50. In certain embodiments, the fabrication process can be used to bond entire wafers together, then to dice into individual structural elements 50, as described above. Alternatively, in certain embodiments, the wafers can be diced first, then bonded into individual structural elements 50 one at a time. In certain embodiments, the optical fiber 30 can be mounted after dicing the wafers. In other embodiments, the optical fiber 30 can be mounted before dicing the wafers.

In certain embodiments, the method used to bond the optical fiber 30 to the structural element 50 advantageously provides a Fabry-Perot cavity 40 with a reproducible cavity length, e.g., a resonance wavelength that substantially does not change during the bonding process, during the curing process if the bonding requires curing, and over time after the device assembly is completed. In certain embodiments, it also advantageously yields a bond that substantially does not produce a change in the cavity length 40 as temperature varies. This goal can be met using a number of techniques, e.g., phenyl benzoate, arc splicing, or $CO_2$-laser fusion.

Figure 19:
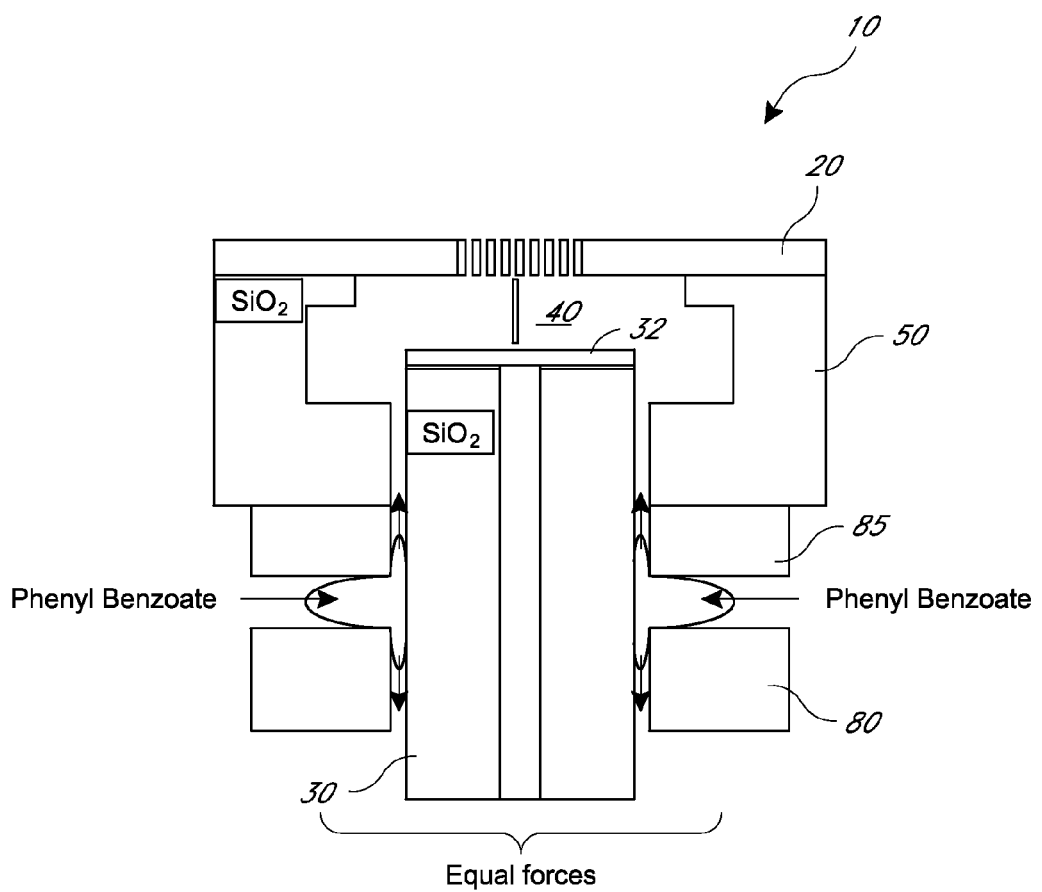
FIG. 19 schematically illustrates the forces due to phenyl benzoate in accordance with certain embodiments described herein.

In certain embodiments, as shown in FIG. 19, for the phenyl benzoate approach and for the epoxy approach, two through holes 85 of diameters 0.75 mm are drilled symmetrically on the sides of a silica capillary tube 80 of internal diameter close to that of the optical fiber 30 (for example, a diameter of 127 µm for a standard fiber, which typically have a diameter of 125 µm). The outside diameter of the capillary tube 80 is not critical; a value of 1.8 mm can be used. The holes 85 provide channels for the bonding material to reach and hold the optical fiber 30 inside the capillary tube 80. Phenyl benzoate ($C_{13}H_{10}O_2$), which is a powder at room temperature, is a bonding material which is compatible with certain embodiments described herein. The optical fiber 30 of certain embodiments is inserted into the capillary tube 80 to form a Fabry-Perot cavity 40 with the reflective element 20 of the diaphragm 20. The optical spectrum of the sensor 10 is monitored with an optical spectrum analyzer while the fiber end is brought in close proximity to the diaphragm 20 by a high-accuracy mechanical positioner. Once the correct cavity length is achieved, phenyl benzoate is applied through the holes 85, then heated above the melting point of phenyl benzoate (phenyl benzoate melts at 68° C.-70° C.). The molten phenyl benzoate flows into the holes 85, the heat source is removed, and the phenyl benzoate cools down and crystallizes as it solidifies and bonds the optical fiber 30 to the capillary tube 80. After the bonding process is complete, the output spectrum can be reexamined in certain embodiments. If a deviation is observed in the Fabry-Perot cavity length from the target value due to the bonding process, the phenyl benzoate can be reheated, at which point the optical fiber 30 is free to move, the cavity length is adjusted, and the spacing is measured again. The process can be repeated a few times until the desired cavity length is achieved. One further advantage of this example method is that because the side holes 85 are symmetrically located, the bonding material exerts equal forces on the optical fiber 30 (see FIG. 19), which would otherwise result in a shift in the cavity length.

Figure 20A:
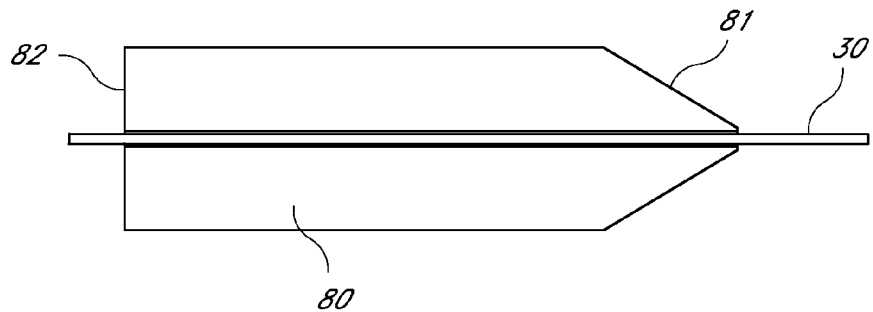
FIGS. 20A-20B schematically illustrate structures used in a method that reduces the arc current used to obtain a good bond between the two elements in accordance with certain embodiments described herein.
Figure 20B:
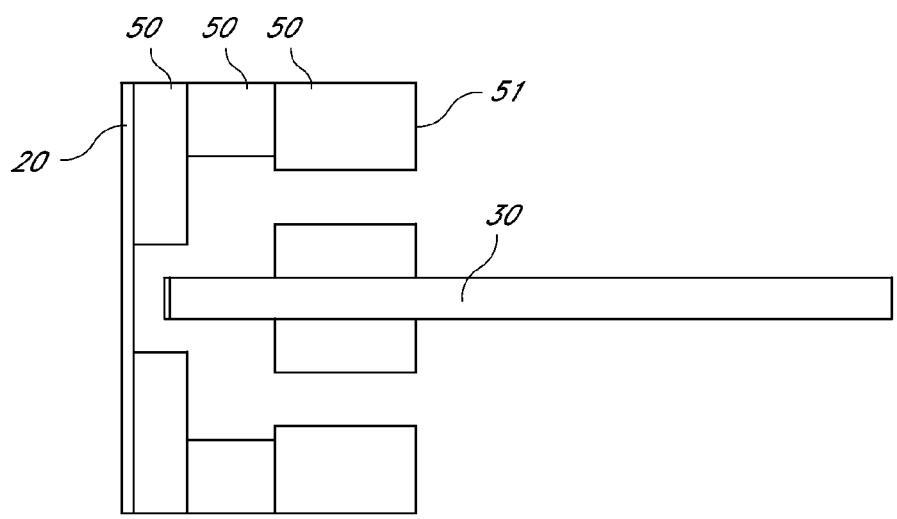

In another example fabrication method, an electric arc (for example from a commercial fiber splicer) is used to attach the optical fiber 30 to the silica capillary tube 80. FIGS. 20A-20B schematically illustrate structures used in a method that reduces the arc current used to obtain a good bond between the two elements in accordance with certain embodiments described herein. The capillary tube 80 of certain such embodiments is tapered at one end 81. The optical fiber 30 is inserted in the capillary tube 80, and the whole assembly is placed in a conventional arc splicer. With suitable choice of the arc current and arc duration, the optical fiber 30 is fused to the silica capillary tube 80. A similar goal can be met using a $CO_2$ laser. As illustrated in FIGS. 20A-20B, the untapered, large area side 82 of the silica capillary tube 80 is bonded to the side of the silica structural element 50 where the diaphragm 20 does not exist (e.g., side 82 shown in FIG. 20A is bonded to side 51 of the structural element 50 shown in FIG. 20B, which is not to scale). In certain embodiments, this bond can be achieved by silicate bonding, which works successfully for silica surface bonding purposes as described previously.

Figure 21:
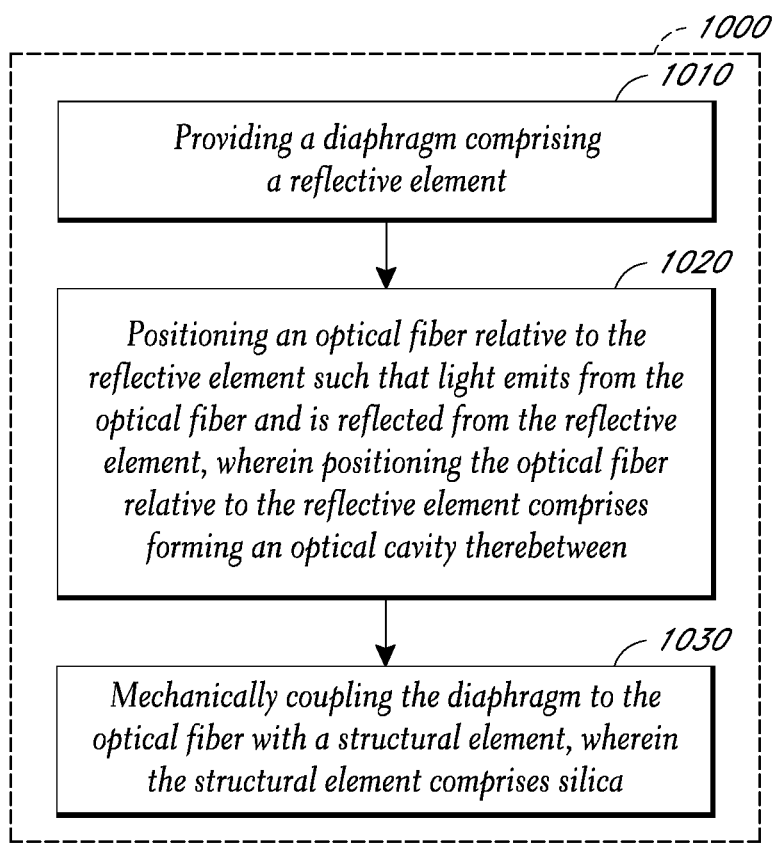
FIG. 21 is a flowchart of an example method of fabricating an acoustic sensor in accordance with certain embodiments described herein.

FIG. 21 is a flowchart of an example method 1000 of fabricating an acoustic sensor 10 in accordance with certain embodiments described herein. The method 1000 comprises providing a diaphragm 20 comprising a reflective element 22, as shown in operational block 1010 of FIG. 21. The method 1000 also comprises positioning an optical fiber 30 relative to the reflective element 22 such that light emits from the optical fiber 30 and is reflected from the reflective element 22, as shown in operational block 1020. Positioning the optical fiber 30 relative to the reflective element 22 comprises forming an optical cavity 40 therebetween. The method 1000 further comprises, as shown in operational block 1030, mechanically coupling the diaphragm 20 to the optical fiber 30 with a structural element 50. The structural element 50 comprises silica.

In certain embodiments of the method 1000, providing a diaphragm 20 comprising a reflective element 22, as shown in operational block 1010, comprises providing a photonic-crystal structure as the reflective element 22. Providing a photonic-crystal structure can comprise providing a photonic-crystal structure fabricated by photolithography. In certain embodiments, the method 1000 further comprises silicate bonding the diaphragm 20 to the structural element 50.

In various embodiments, the method 1000 further comprises employing an element 25 comprising silica within the optical cavity 40. The method 1000 can further comprise selecting a thickness for the element 25 comprising silica approximately equal to a distance between the first end 32 of the optical fiber 30 and the diaphragm 20.

In certain embodiments, the method 1000 can further comprise selecting a diaphragm diameter to increase mechanical compliance and/or selecting a diaphragm cross-sectional area to increase mechanical compliance. The method 1000 can also include employing one or more fluid conduits 55 separate from the reflective element 22 positioned on the diaphragm 20. The method 1000 can also include employing at least one generally compressible and generally elastic element within the optical cavity 40 to increase sensitivity.

Example Embodiment and Characterization of an Example Optical Acoustic Sensor

Figure 22:
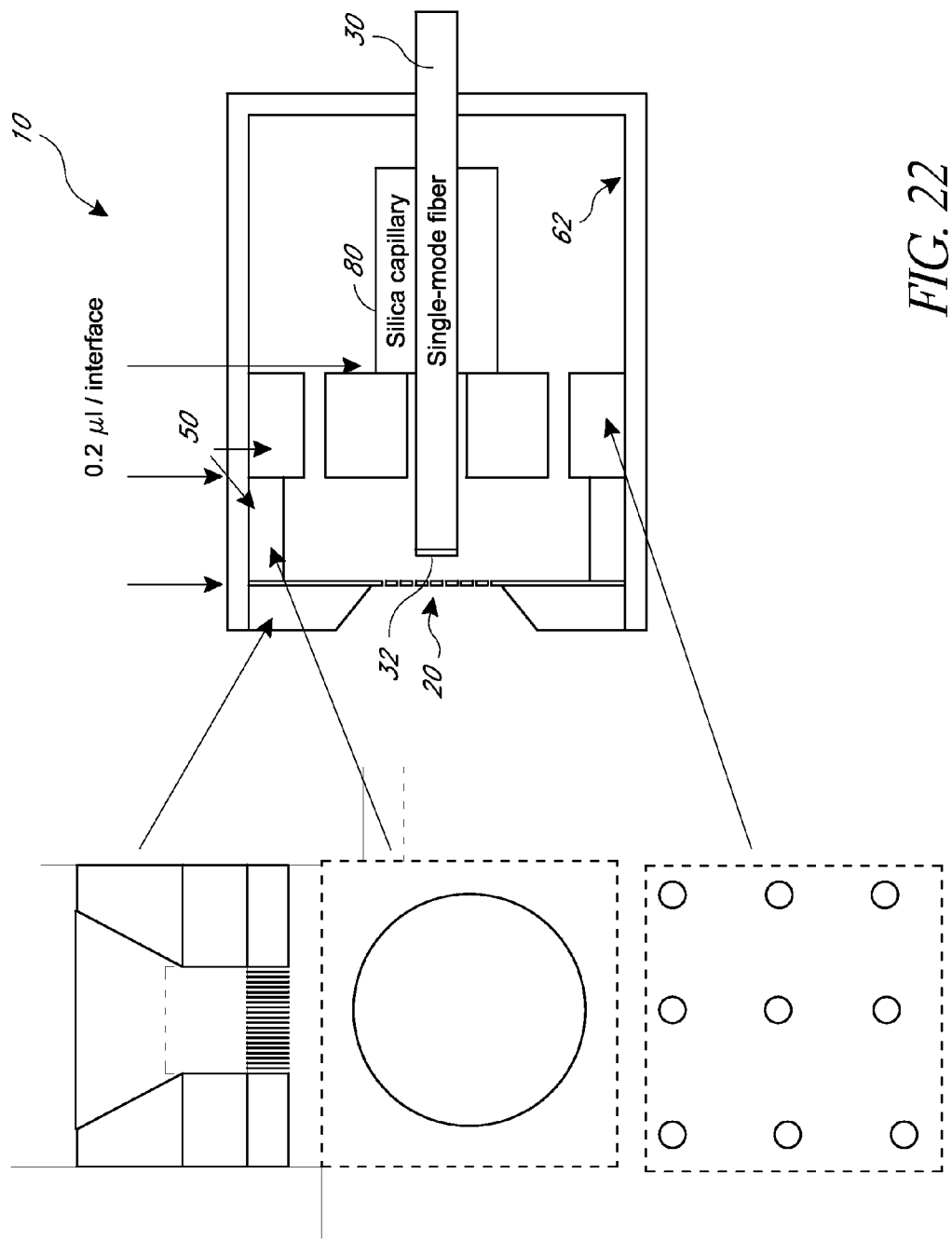
FIG. 22 schematically illustrates an example acoustic sensor fabricated and assembled in accordance with certain embodiments described herein.
Figure 23A:
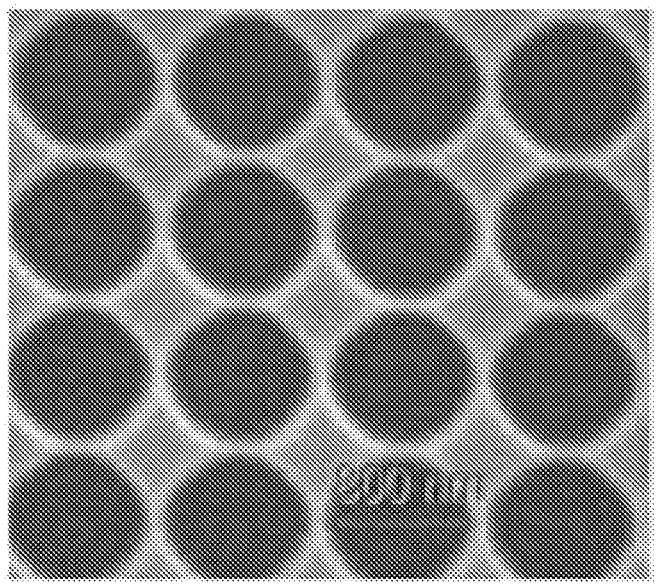
FIG. 23A shows a scanning electron micrograph of a top view of a fabricated photonic-crystal mirror in accordance with certain embodiments described herein.
Figure 23B:
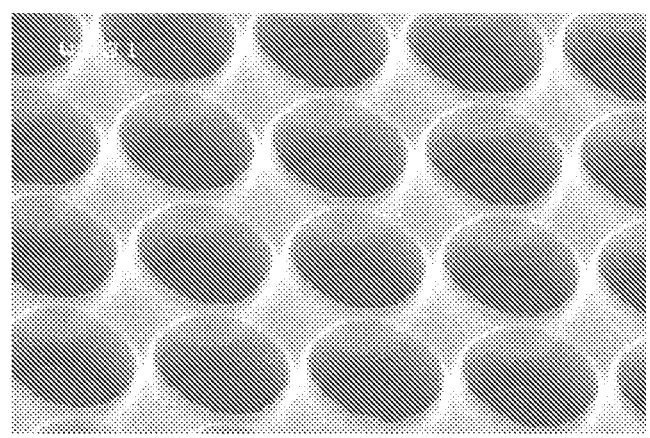
FIG. 23B shows a scanning electron micrograph of an angled view of a fabricated photonic-crystal mirror in accordance with certain embodiments described herein.
Figure 23C:
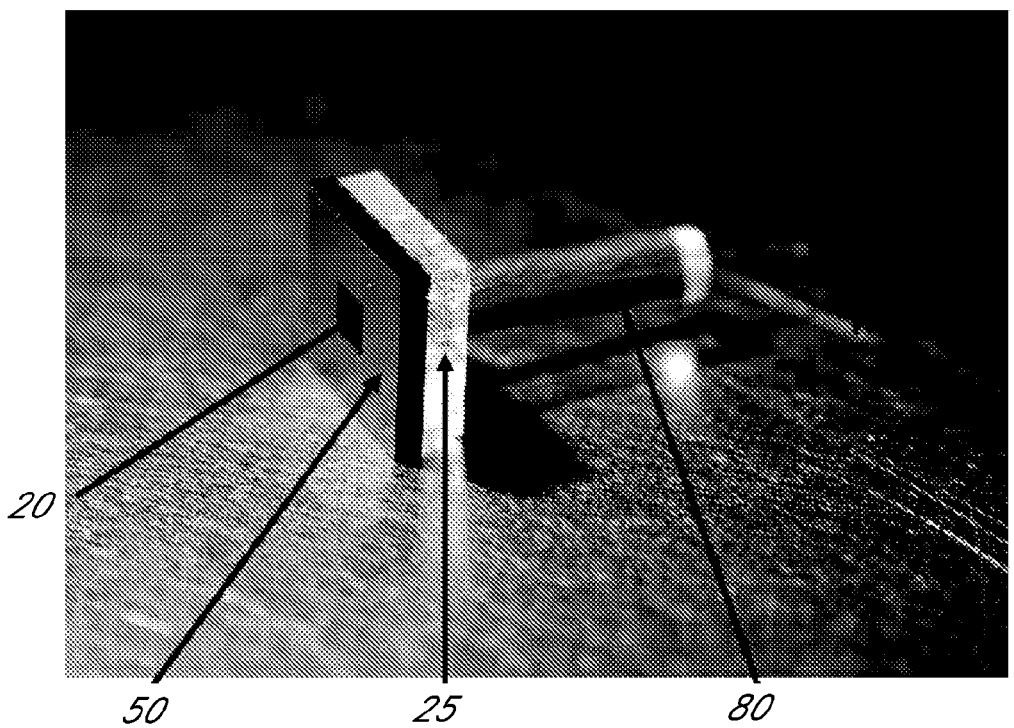
FIG. 23C is a photograph of a fabricated sensor in accordance with certain embodiments described herein.

FIG. 22 schematically illustrates an example acoustic sensor 10 fabricated and assembled in accordance with certain embodiments described herein. In this example, the sensor 10 comprises a deflectable diaphragm 20 comprising a 450 nm thick single-crystal silicon photonic-crystal structure placed in close proximity (approximately 25 µm) to the stationary tip 32 of a single-mode fiber 30 coated with 15 nm of gold serving as the reflective element 32 of the optical fiber 30. The photonic-crystal structure is a square 300 µm on each side. The photonic-crystal structure has a square lattice of 800 nm diameter holes on a 900 nm pitch, e.g., a minimum wall thickness on the order of 100 nm. The sensor 10 was fabricated using the photolithography and silicate bonding methods described herein. FIG. 23A shows a scanning electron micrograph of a top view of the fabricated photonic-crystal structure of the diaphragm 20. FIG. 23B shows a scanning electron micrograph of an angle view of the fabricated photonic-crystal structure of the diaphragm 20. Shown in FIG. 23C, the fabricated sensor 10 is 5×5×5 mm in dimension. Further miniaturization is possible.

Experimental Characterization of the Example Optical Acoustic Sensor

Figure 24:
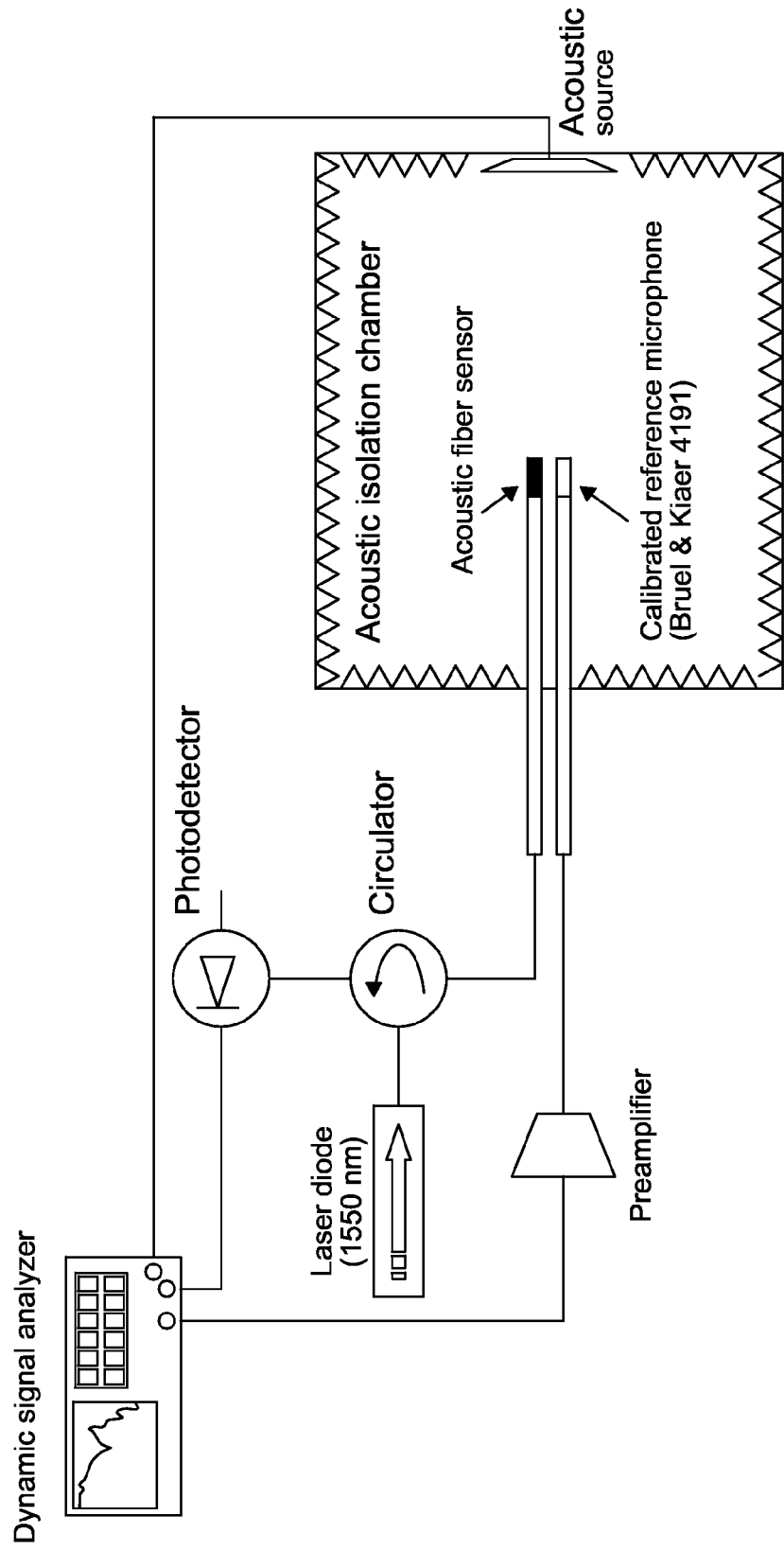
FIG. 24 schematically illustrates an acoustic characterization setup to test example sensors.

The example fiber acoustic sensor 10 was tested in an acoustically isolated enclosure using a conventional calibrated microphone as a reference. A schematic of the acoustic characterization setup is shown in FIG. 24. The sensor 10 was interrogated with a 15-kHz linewidth, low-noise, 1550-nm laser diode. The laser light was coupled into the sensor 10 via an optical circulator, and the light reflected by the sensor 10 was detected with a PIN photodiode.

The electrical outputs of the calibrated reference microphone and the acoustic sensor 10 were connected to a dynamic signal analyzer (DSA), which measured the frequency response and noise spectrum of the two sensors, and the coherence between them. Coherence is a measure of the degree of linear correlation between two signals. When two signals are uncorrelated, such as if one is dominated by noise, the coherence value is zero. In the case of complete correlation, the coherence value is one. The electrical signal from the reference microphone was used as a feedback signal on the DSA to adjust the output of the acoustic source such that a constant pressure of 1 Pa was incident on the sensors at all frequencies. The measurements were conducted up to an acoustic frequency of 30 kHz, which is the frequency band that the calibrated reference microphone is specified and measured to have a flat frequency response.

Figure 25:
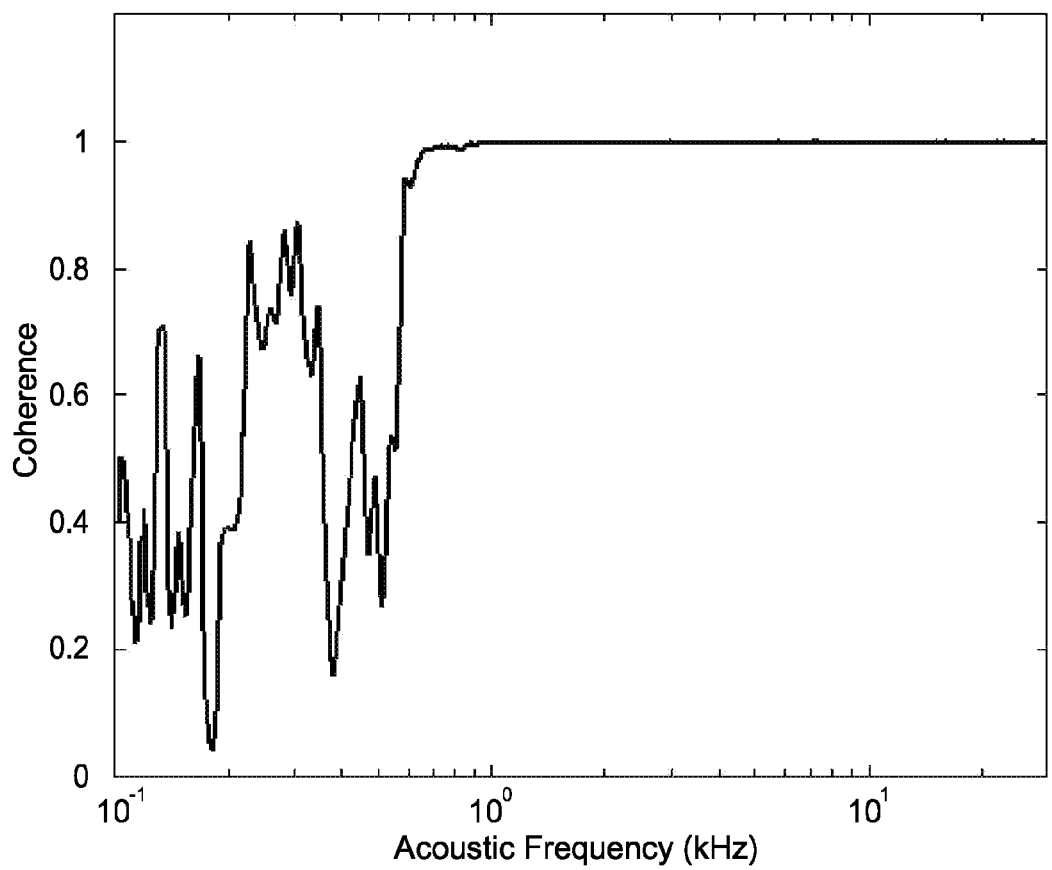
FIG. 25 shows the measured coherence between a calibrated reference microphone and an example acoustic sensor.
Figure 26:
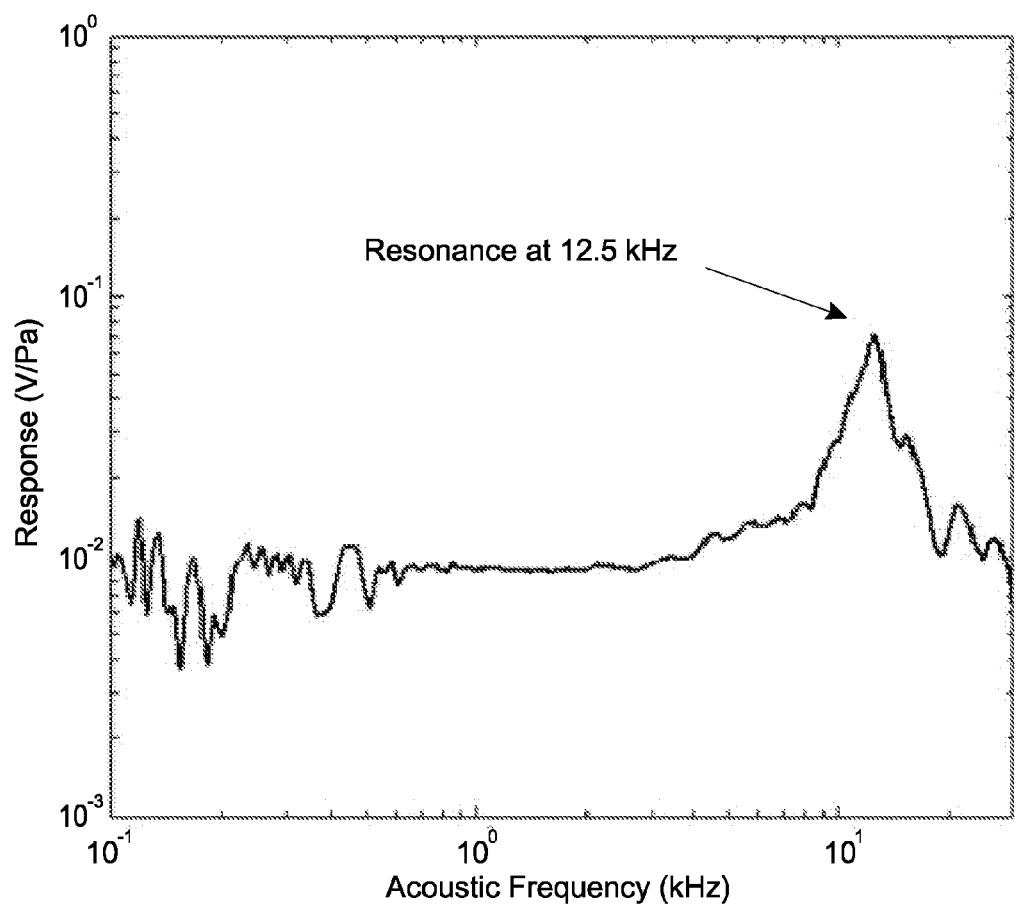
FIG. 26 shows the measured frequency response of an example sensor.

FIG. 25 shows that there is a strong coherence (~1) between the two sensor outputs for frequencies higher than ~700 Hz, which establishes that the data in this frequency band is accurate. The low coherence at lower frequency might be because one or both of the sensors has a signal-to-noise lower than unity. FIG. 26 shows the measured frequency response of the example fiber acoustic sensor 10, which is the ratio of the power spectrum of the acoustic fiber sensor 10 (in volts V) and the power spectrum of the reference microphone (in Pascals Pa). This sensor 10 has a measured finesse of ~6. There is a flat band with a bandwidth greater than 8 kHz, and a resonance arising from a mechanical resonance in the FP sensor at ~12.5 kHz. The other small resonances above ~700 Hz are mainly due to residual resonances in the acoustic chamber.

Figure 27:
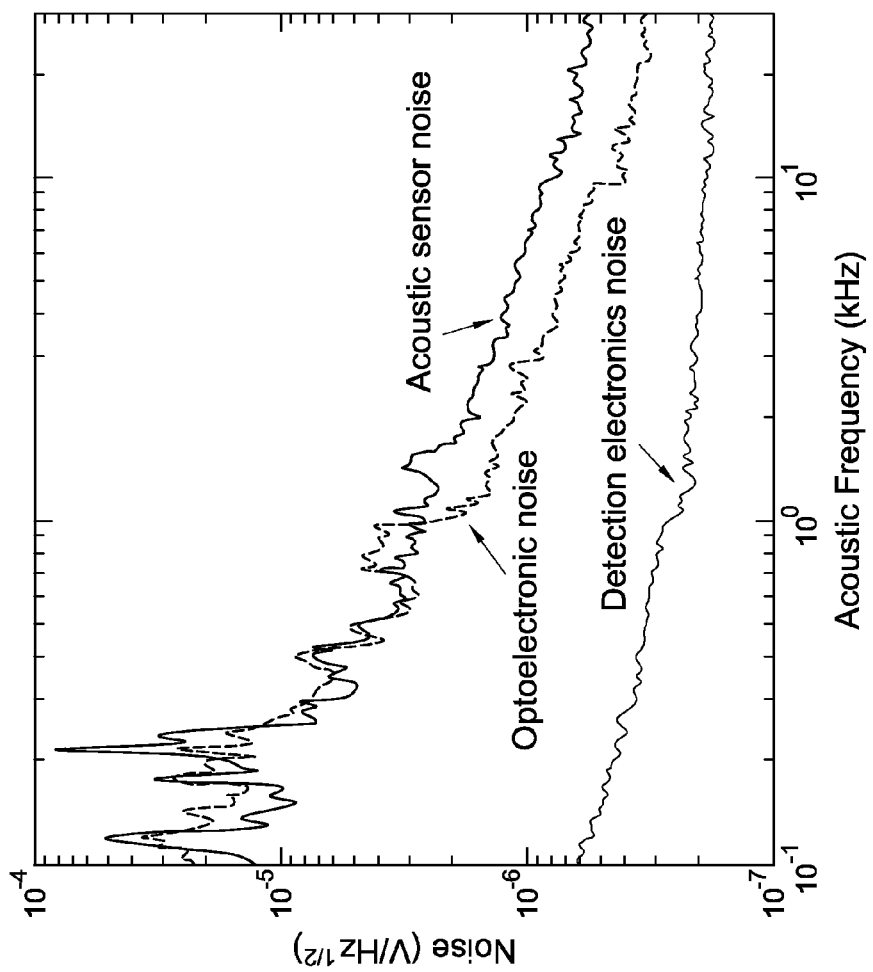
FIG. 27 shows the measured noise (top curve), optoelectronic noise (middle curve), and the noise due to detection electronics (bottom curve) for an example sensor.

FIG. 27 plots three example noise curves, measured on a different example sensor 10 with the same apparatus as FIG. 24 but in the absence of acoustic signal. In this example, noise can be measured between about $10^{-4}$ and about $10^{-7}$ V/Hz$^{1/2}$. The top curve is the noise of the sensor 10. The middle curve is the noise measured when replacing the acoustic fiber sensor 10 with a reflector. The lowest curve was measured when the laser was off. It represents the noise due to the detection electronics (photodetector plus DSA). The middle curve represents the optoelectronic noise: it includes the detection electronics and the laser noise. It has a white-noise component dominated by the relative intensity noise of the laser (−141 dB V/√Hz) at the highest frequencies, and by a 1/f noise component below ~10 kHz. The sensor 10 noise (top curve) is a little larger than the optoelectronic noise; this increase can be assigned to thermo-mechanical noise of the sensor 10, as well as conversion of laser phase noise into intensity noise.

Figure 28:
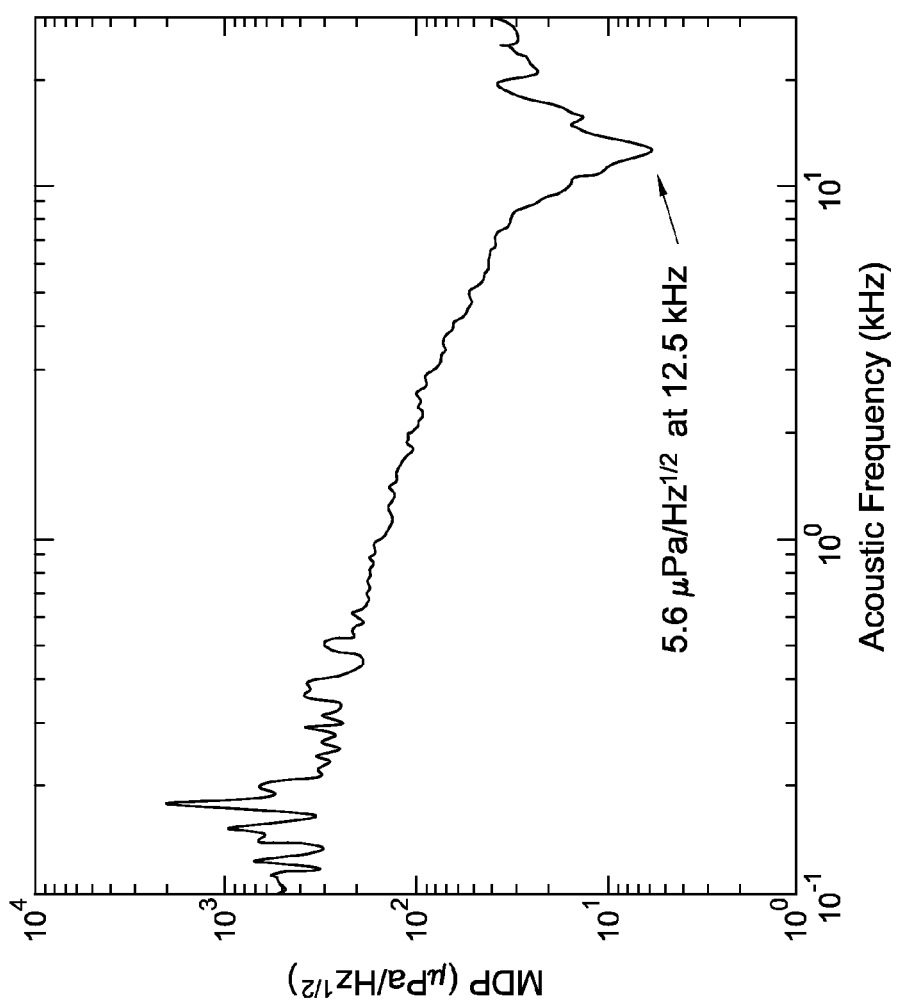
FIG. 28 shows the measured minimum detectable pressure (MDP) of an example sensor with the frequency response shown in FIG. 26.

FIG. 28 shows the minimum detectable pressure (MDP) of the sensor 10 with the frequency response shown in FIG. 26. This spectrum was obtained by dividing the noise spectrum of this sensor 10 by its frequency response. The data below ~700 Hz is again not accurate because of the low coherence of the measurement. From ~700 Hz to 8.6 kHz, the MDP is in the range of ~180 to ~27 µPa/√Hz. Above 8.6 kHz the MDP improves as the frequency approaches the device's main mechanical resonances, and becomes as low as about 5.6 µPa/√Hz at 12.5 kHz. The average MDP over the frequency band of 1 kHz to 30 kHz is about 33 µPa/√Hz. This result demonstrates that certain embodiments as described herein are capable of providing the sensitivity and bandwidth performance desired for implementation in, e.g., Navy acoustic systems. In certain embodiments, these MDP values are limited in part by the optoelectronic noise, and they can be further reduced with straightforward improvements in the detection electronics. At low frequencies, the acoustic noise of the laboratory environment can also be responsible for some degradation in the MDP observed during measurements.

Thermal Stability of the Example Optical Acoustic Sensor

Figure 29:
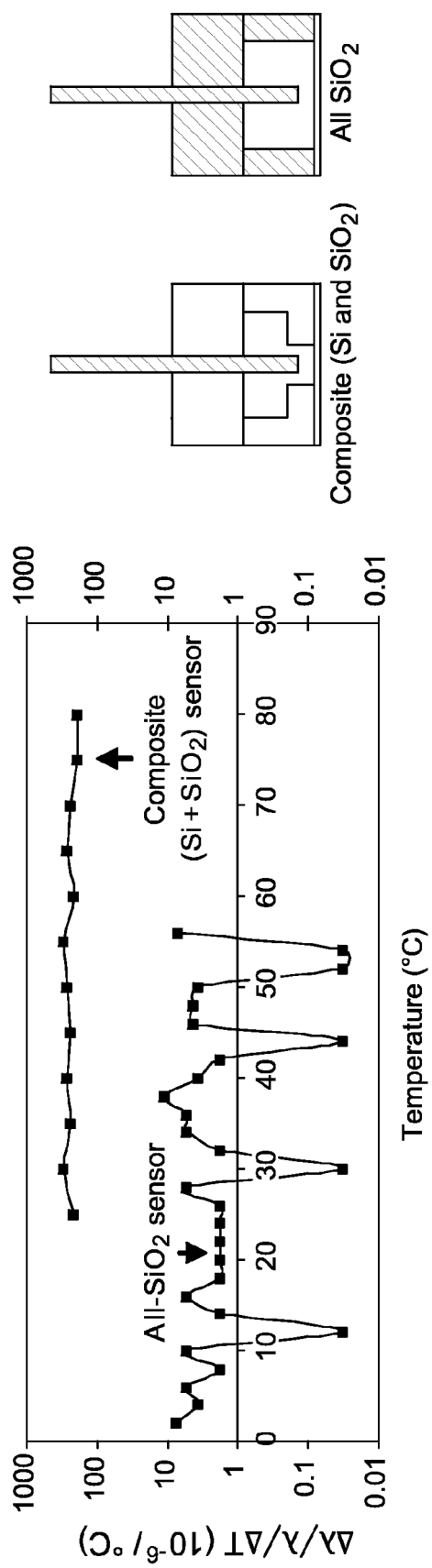
FIG. 29 shows the measured thermal stability of the resonance wavelengths for a silicon sensor (top curve) and an example silica sensor (bottom curve).

To characterize the thermal stability of the example fiber acoustic sensor 10, its temperature was varied from 2° C. to 58° C., and the resulting shift in the resonance wavelengths was recorded using an optical spectrum analyzer. The same measurement was also carried out with a first-generation fiber sensor, e.g., silica fiber and silicon structural element. The variations in resonance wavelength measured for the two sensors are shown in FIG. 29. The normalized wavelength shift with temperature is ~70 times lower in the sensor of certain embodiments described herein than the earlier sensor ($3.3 \times 10^{-6}$/° C. v. $2.4 \times 10^{-4}$/° C.). The thermal stability of the all-silica fiber sensor (e.g., silica fiber 30, silica capillary tube, 80 and silica structural element 50) was expected to be $\Delta\lambda/\lambda/\Delta T = \alpha_{SiO_2} = 0.55 \times 10^{-6}$. The measured value is higher mostly because of the silicate-bonding material. For certain embodiments, this result constitutes a major step towards highly stable acoustic sensors, and it is more than adequate for larger-scale sensor networks.

Figure 30:
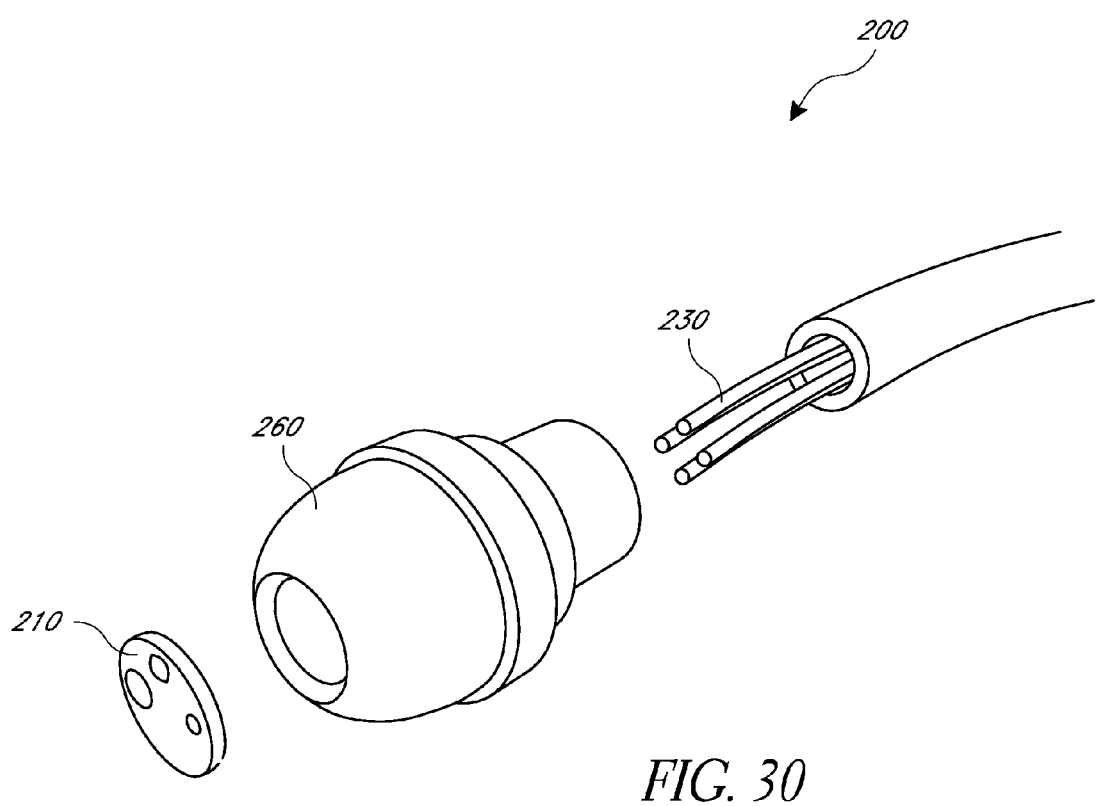
FIG. 30 shows an example optical acoustic sensor system for ocean acoustics in accordance with certain embodiments described herein.

Example Embodiment and Characterization of an Example Optical Acoustic Sensor System FIG. 30 is an example optical acoustic sensor system 200 for ocean acoustics. See also O. Kilic, M. Digonnet, G. Kino, and O, Solgaard, *"Photonic-crystal-diaphragm-based fiber-tip hydrophone optimized for ocean acoustics,"* Proc. of SPIE, vol. 7004, 700405 (2008). In the exploded view of FIG. 30, the sensor system 200 comprises a face 210 of the sensor head. The face 210 of the sensor head can comprise a reflective element 22 of a diaphragm 20 and a structural element 50 in accordance with certain embodiments described above. The sensor system 200 in this embodiment can comprise a plurality 230 of optical fibers 30, each having a reflective element 32 on the end of the optical fiber 30. The sensor 200 can further comprise a backchamber housing 260. A cross-section of the sensor system 200 is similar to the sensor system 100 shown in FIG. 12.

Referring to FIG. 12, the reflective element 20 can comprise a photonic-crystal reflective element 22 micro-machined on a silicon structural element 50. As shown in FIG. 30, the plurality 230 of optical fibers 30 can comprise four SMF-28 fibers, each one transmitting and returning a different optical signal. In other embodiments, more than four optical fibers 30 can be used. As depicted in FIG. 12, three of the four optical fibers 30 can lead to the photonic-crystal reflective elements 22 of the diaphragm 20 placed at the face of the sensor head. In this embodiment, the photonic-crystal structures are reflective elements 22 with high reflectivity (>95%). In accordance with certain embodiments described herein, the ends of each optical fiber 30 can be coated with a reflective element 32, so that when placed in close proximity (~20 µm) with the photonic-crystal reflective elements 22, they each form a Fabry-Perot optical cavity 40. By deforming the compliant diaphragm 20, an incident acoustic signal 400 can modulate the spacings of the optical cavities 40, giving rise to a change in the power of the laser light reflected back into the optical fibers 30.

The three sensors of the sensor system 200 shown in FIG. 30 can be localized in a region of about 2.5-mm diameter which is approximately an order of magnitude smaller than one of the shortest acoustic wavelengths of interest (15 mm at 100 kHz), so they can be exposed to approximately the same acoustic amplitude. In other embodiments, the sensor system 200 can be localized in a region of about 2 mm to about 3 mm in diameter. The three diaphragms 20 can have different diameters (e.g., 150 µm, 212 µm, and 300 µm) and hence different compliances (relative compliances are, e.g., x1, x4, and x16, respectively). In other embodiments, the diaphragms 20 can have diameters between about 100 µm and about 400 µm, between about 150 µm and about 350 µm, or between about 200 µm and about 300 µm. As disclosed herein, each of the three sensors can address a different range of pressures to increase the dynamic range of the sensor 200 head over that of a single sensor. Calculations show that this range can span pressures as low as the ocean's ambient thermal noise (~10 µPa/Hz$^{1/2}$) all the way up to 160 dB larger signals. The fourth fiber can be connected to a reference reflective element for calibration purposes in sensor-array applications. It can provide a static reference signal transmitted along with the acoustic signals from the other three fibers in order to account for loss and noise associated with the path through which the signals travel. As described herein and shown in FIG. 12, the sensor system 200 can comprise diaphragm-sized channels 90, expanded channels 92, and a backchamber channel 95.

Fabrication of the Example Optical Acoustic Sensor System

The sensor system 200 can be fabricated using silicon micro-fabrication techniques, for example, as shown in FIG. 31. The fabrication can include the following steps: (a)-(c) etching the diaphragm-sized channels 90 and expanded channels 92, (d) bonding the backside wafer, (d) defining the photonic-crystal reflective elements 22, and (e) etching the backchamber channels 95 and fiber alignment channels 97.

In (a) of FIG. 31, a 2-µm-thick low-temperature silicon oxide (LTO) layer 610 is deposited using low-pressure chemical-vapor deposition (LPCVD) on both sides of a 400-µm-thick silicon wafer 620. In other embodiments the wafer 620 can be between about 300-µm-thick and about 700-µm-thick, between about 350-µm-thick and about 650-µm-thick, or between about 400-µm-thick and about 600-µm-thick. LTO, instead of thermally grown silicon-oxide, has a low stress, which can be advantageous in later fabrication steps. The LTO layer 610 on the backside is subsequently patterned using a wet oxide etch (buffered hydrofluoric acid). This step defines the shapes of the expanded channels 92.

Before etching the expanded channels 92 into the wafer 620, the backside is covered with a thick (>10 µm) photoresist (not shown) and is patterned with shapes defining the diaphragm-size channels 90 as shown in (b) of FIG. 31. This step also determines the diameters of each of the three diaphragms 20. The next step involves etching the backside using deep-reactive ion-etching (DRIE). The etch can be timed so that the diaphragm-size channels 90 are only etched partially into the wafer 620.

In (c) of FIG. 31, the resist is then stripped off, so that the LTO layer 610 on the backside with the expanded channel patterns are exposed. Then, a second DRIE step is employed, so that the expanded channels 92 are etched partially into the wafer 620. This step also continues to etch the partially etched diaphragm-size channels 90, until they reached the LTO layer 610 on the frontside.

In (d) of FIG. 31, the LTO layer 610 on the backside is stripped off using a timed hydrofluoric-acid etch, while protecting the front side of the wafer 620 with photoresist. Afterwards, a second 400 µm-thick silicon wafer 620 is bonded to the backside of the first wafer 620 at 1000° C. In other embodiments the second wafer 620 can be between about 300-µm-thick and about 700-µm-thick, between about 350-µm-thick and about 650-µm-thick, or between about 400-µm-thick and about 600-µm-thick. This is followed by LPCVD deposition of the diaphragm layer 630, comprising of a 450-nm polysilicon layer sandwiched between two 25-nm silicon nitride layers. In other embodiments the total diaphragm can be between about 400-µm-thick and about 700-µm-thick, or between about 450-µm-thick and about 650-µm-thick. The thin nitride layers can serve to compensate for the residual stress in the polysilicon layer. See, e.g., S. Kim, S. Hadzialic, A. Sudbo, and O. Solgaard, "*Single film broadband photonic crystal micro-mirror with large angular range and low polarization dependence*," in Conference on Lasers and Electro-Optics (CLEO), Baltimore, Md., p. CThP7, (2007). This low stress can provide relatively flat diaphragms 20, e.g, as shown in FIG. 32.

Figure 32:
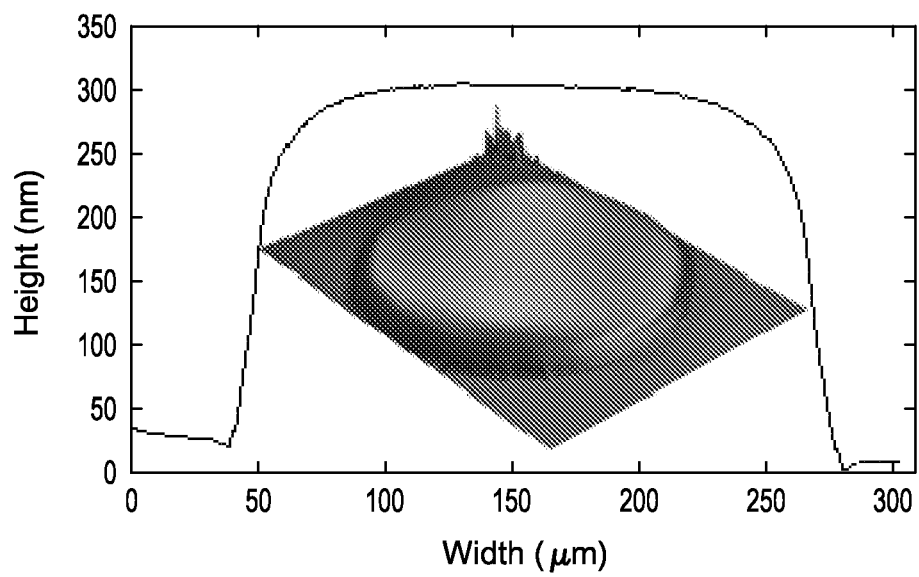
FIG. 32 shows an optical profilometry measurement on an example diaphragm in accordance with certain embodiments described herein.

FIG. 32 shows an optical profilometry measurement on a mid-sized diaphragm (e.g., 212 µm diameter) comprising of a 450-nm polysilicon layer sandwiched between two 25-nm silicon nitride layers, without any oxide underneath. The measurement indicates that the diaphragm 20 is elevated from the surface of the wafer 620 by a relatively small amount of about 300 nm. The top region is flat within about 10 nm in a 130-µm diameter central region.

After the diaphragm layer 630 is deposited, it is patterned with a photonic-crystal mirror pattern. To make the holes of the photonic-crystal reflective elements 22, a relatively thin (e.g., between about 100 nm and about 200 nm, here, about 150 nm) LTO layer 610 is deposited to serve as an etch mask (not shown). A polymethylmethacrylate (PMMA) resist layer is spun on the LTO layer 610 and is patterned with e-beam lithography. Other method of patterning are possible, e.g., photolithography. The holes of the photonic-crystal reflective elements 22 are then etched into the LTO layer 610 using magnetically-enhanced reactive-ion etching (MERLE), and then into the diaphragm layer 630 through subsequent MERLE etches.

In (e) of FIG. 31, DRIE is used to etch the backchamber channel 95 and the fiber alignment channels 97 on the backside. During the etch, the photonic-crystal reflective elements 22 are protected by the remaining LTO layer 610, which is stripped off in the last step with a short hydrofluoric-acid etch.

The various channels are etched into the silicon wafer 620 anisotropically through a series of alternating passivation and isotropic-etch steps, which can create scalloping on the sidewalls with a mean depth of ~0.25 µm (or between about 0.15 µm and about 0.35 µm or between about 0.2 µm and about 0.3 µm). In the passivation step, a plasma conformally deposits a layer of a PTFE-like fluorocarbon polymer. This polymer protects the sidewalls from etching, and remains there after the etch is completed. The hydrophobic nature of this passivation film, combined with the scalloping geometry of the sidewalls, makes the wetting of the DRIE etched channels substantially low. In certain embodiments, this makes it challenging to properly fill the optical cavity 40 with water. To provide sufficient wettability in certain embodiments, the sidewall polymers can be removed, in some embodiments completely removed, after the DRIE steps. Employing an asher that etches organics away with an oxygen plasma, followed by a hot Piranha wet etch (9:1 sulfuric acid:hydrogen peroxide) is sufficient in certain embodiments for stripping off the sidewall polymers in the wafers 620.

The reflective elements 32 on each of the optical fibers 30 within the plurality 230 of fibers 30 can be deposited using e-beam evaporation on cleaved SMF-28 fibers. The reflective elements 22 in the example embodiment comprised of a 4-nm chrome adhesion layer, followed by a 20-nm gold reflection layer, and finally a 15-nm magnesium fluoride protection layer. In other embodiments, the chrome layer can be between about 2-nm and about 5-nm thick. The gold reflection layer can be between about 15-nm and about 25-nm or between about 18-nm and about 22-nm thick. Additionally, the protection layer can be between about 10-nm and about 20-nm or between about 18-nm and about 22-nm thick. Other dimensions are possible. Gold is advantageous because of its low absorption and superior reflective properties at wavelengths around 1550 nm, the operation wavelength of the laser to address the sensor system 200.

Figure 33:
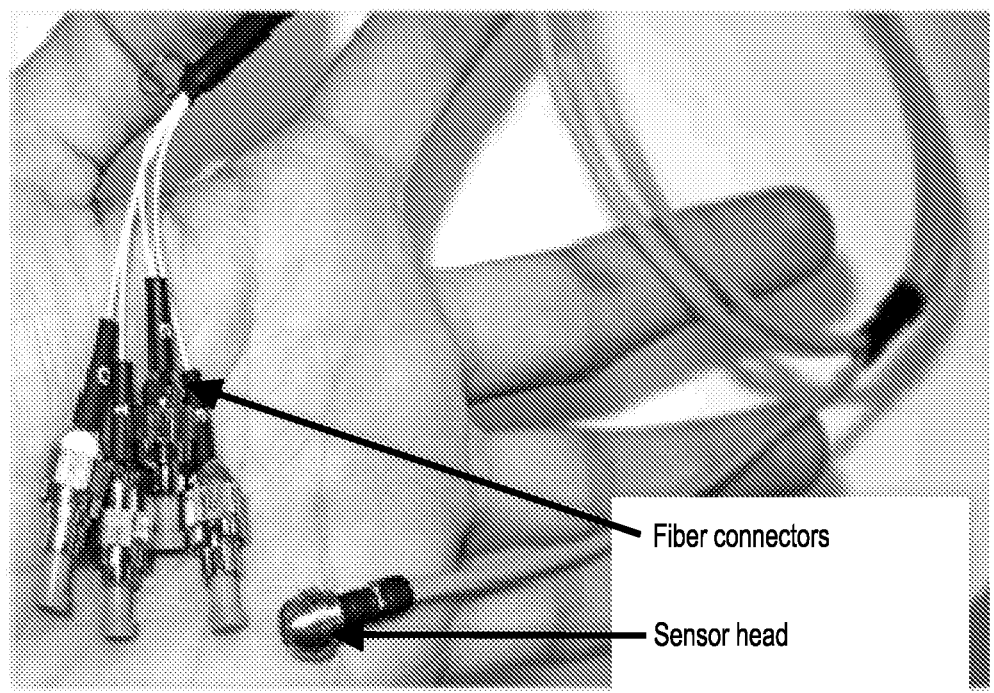
FIG. 33 shows a photograph of an example packaged sensor system in accordance with certain embodiments described herein.

Methods of assembly of the plurality 230 of fibers 30 to the structural element 50 described herein in certain embodiments of sensors 10 can be employed in sensor systems 200, The optical fibers 30 are pushed through the fiber alignment channels 97 while the spectrum of the Fabry-Perot interferometers are monitored using an optical-spectrum analyzer. After the target spacing for the Fabry-Perot optical cavity 40 is reached, the optical fibers 230 are secured with epoxy (while monitoring and adjusting the spacing). Finally, the face 210 of the sensor head is attached to the backchamber housing 260 with epoxy, and the plurality 230 of optical fibers 30 are tighted with heat-shrink tubing. The backchamber housing 260 can be a commercial ball-end hose barb. A complete, packaged sensor system 200 is shown in the photograph in FIG. 33.

Theoretical Modeling

The optimization of a sensor system 200 design for ocean acoustics is challenging in that the ocean noise spectrum is complex, and an analysis of the parameter space utilizes interdisciplinary modeling: optical modeling of the displacement detection, mechanical modeling of the diaphragm motion, acoustic modeling of the sensor baffle and the backchamber design, and microfluidics modeling of the channel structures. Also, a single parameter can affect several sensor features simultaneously. For example, the size of the perforations in the diaphragm affect the optical reflection, the hydrostatic sensitivity, and the mechanical compliance of the diaphragm. Hence, an optimization process through a direct finite-element numerical simulation is impractical, and it also does not provide insight into how the various sensor parameters can be adjusted. Therefore, an analytical model as described herein is utilized that provides information on how the design parameters can be tailored to meet the demands of ocean acoustics.

Lumped-Element Equivalent-Circuit Model

The characteristic sensor system dimensions (~1 mm) are substantially smaller than the acoustic wavelengths of interest. In other embodiments, the sensor system dimensions can be between about 1.5 mm and about 2 mm. Therefore, it is possible to approximate spatially distributed elements with a single lumped element to model the noise of the sensor system 200 and thermal-mechanical noise. See, e.g., T. B. Gabrielson, "*Mechanical thermal noise in micromachined acoustic and vibration sensors*," IEEE Trans. Electron Devices, vol. 40, pages 903-909 (1993). In this lumped model, the distributed potential and kinetic energies in the sensor system 200 are described through a single acoustic compliance C and acoustic mass M, respectively. Likewise, the dissipation in the sensor system 200 is modeled with a single acoustic resistance R.

Figure 34:
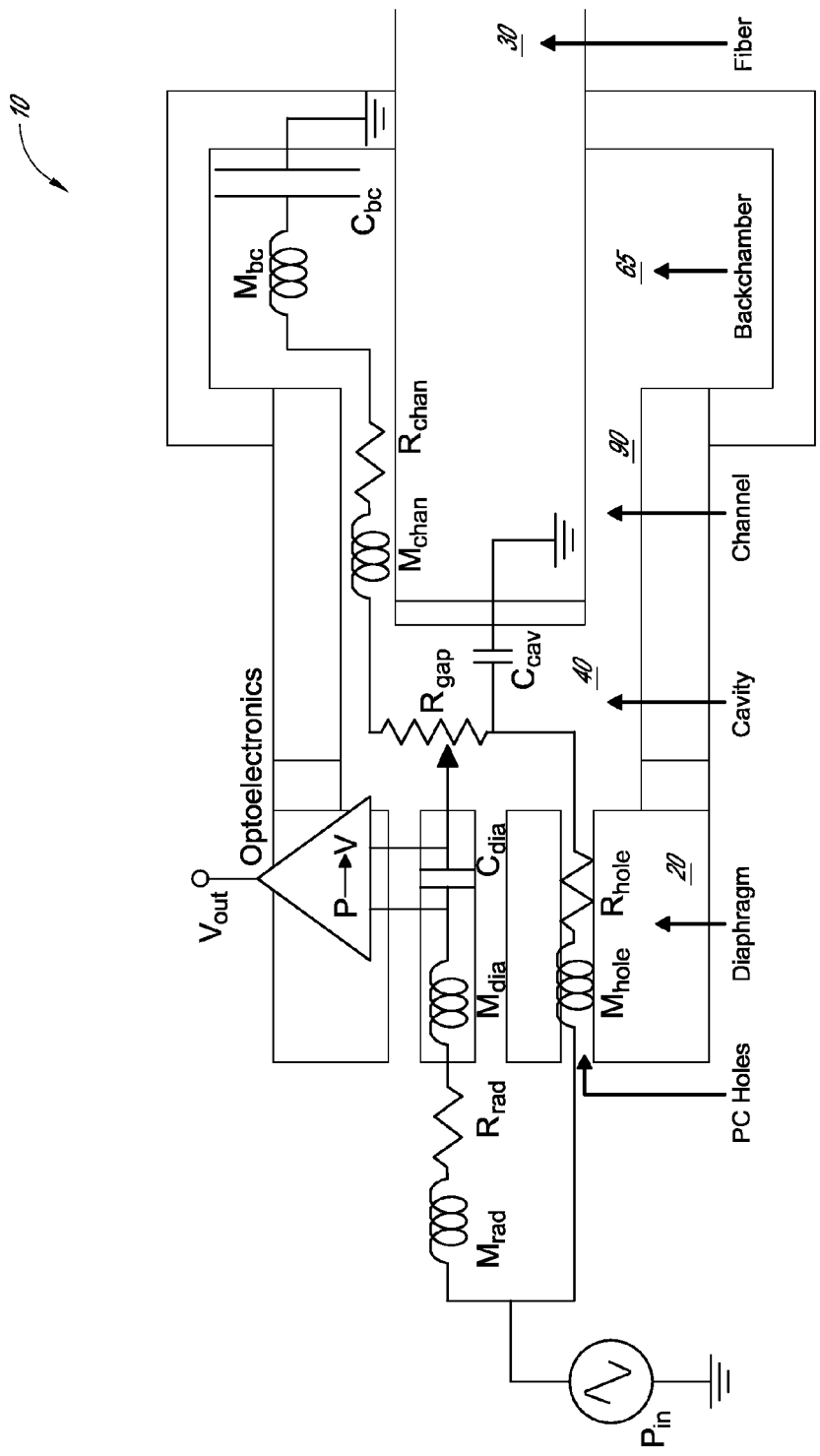
FIG. 34 shows an example equivalent circuit formed by various lumped elements describing sensor system acoustics and the interfacing with optoelectronics in accordance with certain embodiments described herein.

Using lumped elements to describe the physical mechanisms in the sensor system 200, it is possible to analyze the sensor system 200 through an equivalent circuit formed by these elements, as shown in FIG. 34. In this circuit, the acoustic compliance C is similar to electrical capacitance, and the acoustic mass M is analogous to electrical inductance. In the same convention, the acoustic resistance R is similar to electrical resistance. The acoustic impedances (Z) for these lumped elements are $1/(j\omega C)$, $j\omega M$, and R, respectively. The relationship between the pressure drop (P) and flow rate ($\bar{u}$) across these impedances is assumed to be $P=\bar{u}Z$, which is valid as long as the flow is not turbulent or the diaphragm displacement is small compared to its thickness. For clarity, a model of only one sensor 10 is shown in FIG. 34, while in this example, there are three different sensors in parallel in the sensor system 200 connecting to the same backchamber 65.

The incident acoustic signal is represented by a pressure source ($P_n$). The acoustic signal can travel to the optical cavity 40 through two pathways, either as a volume flow through the holes of the photonic-crystal reflective elements 22 (the path $M_{hole}$-$R_{hole}$), or through a motion of the compliant diaphragm 20. Once the signal reaches the optical cavity 40, it is transmitted through the diaphragm-sized channel 90 around the optical fiber 30 leading to the backchamber 65. The small volume of the optical cavity 40 makes its acoustic compliance low, which means that the water is not compressed between the optical fiber 30 and the diaphragm 20 but is forced to flow into the backchamber 65. Without the backchamber 65, the motion of the diaphragm 20 would be inhibited by a stiff optical cavity 40, so that the response of the sensor 10 would drop by more than 80 dB in water compared to air. Since the quantity measured by the optics of the sensor 10 is only the diaphragm displacement, this equivalent-circuit model can be used to calculate the fraction of incident pressure that drops across the diaphragm compliance to obtain the sensor response. Similarly, the amount of noise transferred to the diaphragm compliance from dissipative elements can be calculated using this equivalent-circuit model to obtain the thermal-mechanical noise limitation of the sensor system 200.

Acoustic Impedance of the Diaphragm

The equation of motion for the small transverse displacement u of a stretched circular diaphragm 20 fixed around its periphery, with thickness h, radius a, and density ρ is:

$$\left(h\rho \frac{\partial^2}{\partial t^2} + D\nabla^4 - h\sigma\nabla^2\right)u = Pe^{j\omega t} \quad (5)$$

See, e.g., S. Timoshenko and S. Woinowsky-Krieger, Theory of Plates and Shells (McGraw-Hill, New York, 1959); and M. Di Giovanni, Flat and Corrugated Diaphragm Design Handbook (Marcel Dekker, New York, 1982). Here σ is the residual stress and D is the flexural rigidity, defined as $$D = \frac{1}{12}Eh^3/(1-\upsilon^2),$$

with E being Young's modulus, and υ Poisson's ratio. The diaphragm size is small in comparison to the acoustic wavelength, so the incident pressure is modeled as a plane wave with amplitude P and frequency ω. (Frequencies in units of Hz refer to f=ω/2π.)

Equation (5) can be solved analytically to obtain expressions for the resonance frequencies and mode profiles. The bending profile for a diaphragm 20 with low residual stress (e.g., $a^2h\sigma \ll D$) can be expressed as:

$$u(r,t) = u_0 e^{j\omega t}(1-r^2/a^2)^2 \quad (6)$$

here $u_0 = c_m P$ is the center displacement amplitude, and $c_m = a^4/64D$ is the mechanical compliance (the inverse of stiffness) of the diaphragm 20. In water, the mechanical resonances of the diaphragm 20 can be disregarded, since the impedance of water dominates the diaphragm mechanics. Therefore, Eq. (6) is assumed valid over the frequency range of interest. For large displacements ($u_0 > h/5$), the tensile stress of the bending diaphragm 20 becomes significant so that the diaphragm 20 becomes harder to deflect for a given pressure. The center displacement in this case can be calculated with:

$$u_0 = c_m P - \frac{(1+v)(7-v)}{16h^2} u_0^3 \tag{7}$$

See, e.g., M. Di Giovanni, Flat and Corrugated Diaphragm Design Handbook (Marcel Dekker, New York, 1982). Equation (5) models a solid diaphragm, hence does not account for the effects of the holes of the photonic-crystal reflective element 22 on the diaphragm's mechanical properties. The perforations make the elasticity of the diaphragm 20 highly anisotropic, which complicates the mechanical modeling. Nonetheless, it is possible to approximate the structure as a homogenous diaphragm by using modified elastic constants. The effective elastic constants of the photonic-crystal reflective element 22 are found by equating the strain energy of a perforated diaphragm to the one of an equivalent solid diaphragm. See, e.g., M. Pedersen, W. Olthuis, and P. Bergveld, "*On the mechanical behaviour of thin perforated plates and their application in silicon condenser microphones*," Sensors and Actuators A, vol. 54, pages 499-504 (1996).

A perforated plate can be modeled as a solid isotropic plate with modified elastic constants. The effective elastic constants are found by equating the strain energy of the two plates, yielding the following material constants:

$$\frac{v'E'}{1-v'^2} = \frac{vE}{1-v^2}(1-\wp^{1/2}) \tag{8}$$

$$\frac{E'}{1-v'^2} = \frac{E}{1-v^2}\left((1-\wp^{1/2}) + 1/2\wp^{1/2}(1-\wp^{1/2})^2(1-v^2)\right) \tag{9}$$

It is possible to solve Eqs. (8) and (9) together to calculate the effective Young's modulus E', and the effective Poisson's ratio $v'$. Alternatively, Eq. (9) yields the effective flexural rigidity D':

$$D' = D(1-\wp)(1 \tfrac{1}{2} \wp^{1/2}) + O(v^2) \tag{10}$$

Ignoring second order terms in v yields the expression of D' in Eq. (11).

$$\rho' = \rho(1-\wp)$$

$$\sigma' = \sigma(1-\wp)^{1/2}$$

$$D' = D(1-\wp)(1-1/2\wp^{1/2})$$

Here $\wp = 0.50$ is the fill factor, defined as the ratio of the open area to the total area of the photonic-crystal reflective element 22. The total area on which the photonic-crystal reflective element 22 is defined (radius of $a_{PC}=25$ μm) is smaller than the diaphragm 20 (radius of $a=150$ μm). Therefore, the elastic coefficients are not constant throughout the diaphragm 20. Specifically, the flexural rigidity of the diaphragm $D_{dia}$ varies with radial position, such that $D_{dia}(r>a_{PC})=D$ and $D_{dia}(r\leq a_{PC})=D'$. To employ the simple model in Eq. (5), the composite diaphragm is assumed equivalent to a uniform diaphragm with an effective flexural rigidity D" satisfying approximately $\nabla^2 D_{dia} \nabla^2 \equiv D'' \nabla^4$. Similarly, a single density $\rho''$ is employed. To calculate these effective elastic constants, it is possible to use finite-element analysis or the superposition method. A finite-element simulation of a composite 300-μm-diameter diaphragm with a 50-μm-diameter central region represented with the modified elastic constants of Eq. (11) yields an effective flexural rigidity (D"=0.76D), and an effective density ($\rho''=0.70\rho$). The residual stress is negligible in the fabricated structures. These values were obtained for the linear displacement regime. A simulation accounting for the nonlinear displacement regime yielded the same results, in agreement with Eq. (7).

The acoustic mass of the diaphragm 20 is determined by calculating the kinetic energy ($U_k$) of the diaphragm 20, then equating it to an equivalent system including of a lumped mass ($M_{dia}$) with a single speed ($\bar{u}$), defined as $\bar{u} = \int_0^a v(r) 2\pi r dr$ corresponding to the volumetric flow rate. The results are assumed to be time harmonic as $e^{j\omega t}$, hence $u(r)=j\omega u(r)$. The acoustic mass of the diaphragm 20 is calculated then using $$U_k = \frac{1}{2} M_{dia} \bar{u}^2$$

as:

$$M_{dia} = \frac{9h\rho''}{5\pi a^2} \tag{12}$$

Similarly, the potential energy ($U_p$) in the diaphragm 20 is calculated, and then related to an equivalent system with a lumped spring constant ($k_{dia}$) and a single displacement ($\bar{u}$), defined as $\bar{u} = \int_0^a u(r) 2\pi r dr$, which is the volume displacement. The equivalent spring constant is calculated using $$U_p = \frac{1}{2} k_{dia} \bar{u}^2.$$

The compliance of the diaphragm ($C_{dia}$) is the inverse of this spring constant, hence from $C_{dia}=1/k_{dia}$, the acoustic compliance is:

$$C_{dia} = \frac{\pi a^6}{192 D''} \tag{13}$$

The compliance of the diaphragm 20 is of particular importance, because it determines the displacement of the diaphragm 20 as a function of pressure. Since the optical part of the sensor 10 only senses the diaphragm displacement, the main purpose of the lumped model is to calculate the pressure ($P_{dia}$) and noise across this particular compliance.

Radiation Impedance of the Diaphragm

The ambient fluid plays an important role in the overall mechanics of the sensor 10, and necessitates modeling of other acoustic masses and compliances that have a significant effect on the sensor dynamics. The presence of the fluid also creates dissipation, causing thermal-mechanical noise, which also utilizes modeling the loss through an acoustic resistance. When calculating the acoustic mass and resistance, it can be assumed that in certain embodiments, the flow is laminar and the fluid is incompressible. To calculate the compliance, the compressibility of the fluid is taken into account.

In certain embodiments, the effective acoustic mass of the diaphragm 20 in water is more than one order of magnitude larger than the acoustic mass in vacuum. This is because the fluid moves with the diaphragm 20 when it oscillates. Therefore, a mass term can be included to account for the moving fluid, referred to as the radiation mass ($M_{rad}$). The oscillating diaphragm 20 also radiates part of its energy into the fluid, creating a channel of dissipation. To account for this radiative loss, an acoustic radiation resistance ($R_{rad}$) can be included. The radiation mass and resistance can be calculated by approximating the diaphragm as a rigid piston mounted in an infinite baffle, yielding:

$$M_{rad} = \frac{8\rho_0}{3\pi^2 a} \quad (14)$$

$$R_{rad} = \frac{\rho_0}{2\pi c}\omega^2 \quad (15)$$

See, e.g., L. L. Beranek, Acoustics (American Institute of Physics, New York, 1986); and M. Rossi, Acoustics and Electroacoustics (Artech House, Inc., 1988). Here $\rho_0$ is the density of the fluid and c denotes the speed of sound in the fluid. The modeling described herein uses the convention of a frequency-dependent resistance in series with the mass reactance, in contrast to a constant shunt resistance parallel to the mass reactance. See, e.g., L. L. Beranek, Acoustics (American Institute of Physics, New York, 1986).

In certain embodiments, an infinite baffle approximation is too simplistic, considering that the sensor-head size is sub-wavelength over most of the frequency range of interest. Since the sensor desirably has a self noise that can be limited by radiation loss above 30 kHz, where the ocean noise is dominated by the Brownian motion of water molecules, the accurate modeling of the radiation loss can be significant in certain embodiments. A finite closed baffle may be a better description of the structure in certain embodiments. Modeling a finite baffle can be rather challenging, but the results can be summarized as follows: At low frequencies, the sensor acts like a piston at the end of an infinite tube, such that the radiation loss is approximately half of the value for an infinite baffle. At higher frequencies, when the size of the head becomes comparable to the wavelength, the impedance values approach those for an infinite baffle. See, e.g., P. H. G. Crane, "*Method for the calculation of the acoustic radiation impedance of unbaffled and partially baffled piston sources*," J. Sound Vib., vol. 5, pages 257-277 (1967); and T. Mellow and L. Kärkkäinen, "*On the sound field of an oscillating disk in a finite open and closed circular baffle*," J. Acoust. Soc. Am., vol. 118, pages 1311-1325 (2005).

However, in characterization experiments and envisioned practical applications, the sensor 10 is mounted on a larger structure. The theoretical treatment based on the size, shape, and rigidity of such actual baffle structures can be too complicated. Nonetheless, based on the fact that these baffles are usually larger than the wavelengths above 30 kHz (<5 cm), the infinite baffle model in Eqs. (14) and (15) can be assumed sufficient in the modeling of certain embodiments of the sensor 10. If a more elaborate baffle model were to be used, the thermal noise contribution to the ambient sea noise can be adjusted to reflect the minimum noise level such a sensor-baffle structure is exposed to.

Flow Through Holes of the Photonic-Crystal Reflective Element

Water flowing through the holes of the photonic-crystal reflective element 22 can encounter viscous resistance. The hole resistance has two contributions, which are due to the horizontal flow of the fluid from the surroundings of the hole (squeeze-film flow), and the vertical flow of the fluid through the hole (Poiseuille flow). The horizontal-flow contribution from each hole is:

$$\overleftrightarrow{R}_{hole} = \frac{6\mu}{\pi l^3}\left(\wp - \frac{1}{4}\wp^2 - \frac{1}{2}\ln\wp - \frac{3}{4}\right), \quad (16)$$

where m is the dynamic viscosity of the fluid and l is the cavity spacing. See, e.g., D. Homentcovschi and R. N. Miles, "*Modeling of viscous damping of perforated planar microstructures. Applications in acoustics*," J. Acoust. Soc. Am., vol. 116, pages 2939-2947 (2004); and Z. Škvor, "*On acoustical resistance due to viscous losses in the air gap of electrostatic transducers*," Acustica, vol. 19, pages 295-299 (1967). In contrast to most microphones that employ a perforated backplate, the boundary conditions can prevent the diaphragm motion to induce this squeeze-film flow. The perforated diaphragm 20 can be moved by the same pressure field that forces the flow through the holes. As a result, the presence of the holes on the diaphragm 20 may not significantly reduce the squeeze-film damping.

The vertical-flow contribution from each hole, on the other hand, is:

$$\overleftrightarrow{R}_{hole}^{\uparrow} = \frac{8\mu h'}{\pi a_{hole}^4} \quad (17)$$

See, e.g., L. L. Beranek, Acoustics (American Institute of Physics, New York, 1986); M. Rossi, Acoustics and Electroacoustics (Artech House, Inc., 1988); and D. Homentcovschi and R. N. Miles, "*Modeling of viscous damping of perforated planar microstructures. Applications in acoustics*," J. Acoust. Soc. Am., vol. 116, pages 2939-2947 (2004). In the equation, an effective thickness $$h' = h + \frac{3\pi}{8}a_{hole}$$

can be employed. This modified thickness can be used to make corrections for the effect of the hole end, when the hole radius $a_{hole}$ and the thickness h are comparable. See, e.g., D. Homentcovschi and R. N. Miles, "*Viscous damping of perforated planar micromechanical structures*," Sensors and Actuators A, vol. 119, pages 544-552 (2005). The radiation resistance of the holes can be insignificant compared to the flow resistance and is not included in the modeling. The acoustic mass of the hole can also be considered, and taken as:

$$M_{hole} = \frac{4\rho_0 h''}{3\pi a_{hole}^2} \quad (18)$$

See, e.g., L. L. Beranek, Acoustics (American Institute of Physics, New York, 1986); and M. Rossi, *Acoustics and Electroacoustics* (Artech House, Inc., 1988). To include the radiation mass of the holes, an effective thickness $$h'' = h + \frac{2}{\pi}a_{hole}$$

can be defined. Since the holes in certain embodiments provide parallel channels, the overall hole impedance can be reduced by a factor equal to the hole number.

Cavity Effects

The fluid moving through the optical cavity 40 to the diaphragm-sized channel 90 can encounter a resistance, referred to as squeeze-film resistance:

$$R_{gap} = \frac{3\mu}{2\pi l^3} \tag{19}$$

See, e.g., J. B. Starr, "*Squeeze film damping in solid-state accelerometers*," in IEEE Workshop in Solid-State Sensor and Actuator 4th Technical Digest, pages 44-47 (1990). All the volume flow through the holes of the photonic-crystal reflective element 22 can go through the optical cavity 40, hence its resistance can be expressed through Eq. (19). However, since the diaphragm diameter is significantly larger than the fiber diameter in certain embodiments, only a portion of the volume flow induced by the moving diaphragm 20 has to flow through the cavity 40. Therefore, the effective resistance for the two cases is different, such that the flow induced by the diaphragm motion encounters a fraction of the actual cavity resistance, which yields in the rigid piston approximation:

$$R'_{gap} = R_{gap} \frac{a_f^2}{a^2}, \tag{20}$$

where $a_f$ is the radius of the optical fiber 30. The Fabry-Perot cavity 40 and the backchamber 65 are fluid volumes that store potential energy, hence can impede the diaphragm movement through a spring effect. This effect can be accounted for by the two acoustic compliances, the cavity compliance ($C_{cav}$), and the backchamber compliance ($C_{bc}$):

$$C_{cav} = \frac{\pi a_f^2 l}{\rho_0 c^2},$$

$$C_{bc} = \frac{\pi a_{bc}^2 L}{\rho_0 c^2}, \tag{21}$$

where $a_{bc}$ and L are the radius and length of the backchamber 65, respectively. See, e.g., L. L. Beranek, Acoustics (American Institute of Physics, New York, 1986); and M. Rossi, Acoustics and Electroacoustics (Artech House, Inc., 1988). The cavity compliance can be ignored in the calculations because its reactance is very large in the frequency range of interest, due to the small cavity volume. The relatively large volume of the backchamber 65, on the other hand, includes its acoustic mass:

$$M_{bc} = \frac{\rho_0 L}{3\pi a_{bc}^2} \tag{22}$$

See, e.g., id. In certain embodiments, the reactance of this mass is small for low frequencies but can dominate the backchamber impedance above the Helmholtz frequency of 27 kHz.

Flow Through Annular Channel Around the Fiber

The optical fiber 30 and the diaphragm-size channel 90 through which it passes defines an annular opening that connects the optical cavity 40 to the backchamber 65. The resistance and acoustic mass of these annular channels can be included in the modeling of the sensor 10. Calculations yield expressions similar to Eqs. (17) and (18):

$$R_{chan} = \frac{8\mu l}{\pi a^4} f_R(\varepsilon), \tag{23}$$

$$M_{chan} = \frac{4\rho_0 l}{3\pi a^2} f_M(\varepsilon), \tag{24}$$

Where l is the length of the annular channel. The terms $f_R(\varepsilon)$ and $f_M(\varepsilon)$ are functions of $\varepsilon = a_f/a$ The profile of the axial pressure flow u through an annular channel with a length l, outer diameter a, and inner diameter $a_f$, is described through:

$$\frac{\partial v}{\partial r} = \frac{Pa}{2\mu l}(\kappa^2/\xi - \xi), \tag{25}$$

where $\xi = r/a$. See, e.g., R. A. Worth, "*Accuracy of the parallel-plate analogy for representation of viscous flow between coaxial cylinders*," J. Appl. Polym. Sci., vol. 24, 319-328 (1979). The plane $\xi = \kappa$ corresponds to zero shear stress. Integrating Eq. (25), and using the no-slip boundary conditions u=0 for $r = a_f$ and r=a, the axial velocity is obtained as:

$$v = \frac{Pa^2}{4\mu l}[(1-\xi^2) - (1-\varepsilon^2)\ln\xi/\ln\varepsilon], \tag{26}$$

where $\varepsilon = a_f/a$. Using $P = \bar{u}R$, the acoustic resistance of an annular channel yields:

$$R_{chan} = \frac{8\mu l}{\pi a^4} f_R(\varepsilon), \tag{27}$$

where $$f_R(\varepsilon) = \frac{\ln\varepsilon}{(1-\varepsilon^4)\ln\varepsilon + (1-\varepsilon^2)^2}$$

Similarly, employing $$U_k = \frac{1}{2}M\bar{u}^2,$$

the acoustic mass of an annular channel yields:

$$M_{chan} = \frac{4\rho_0 l}{3\pi a^2} f_M(\varepsilon), \tag{28}$$

where $$f_M(\varepsilon) = \frac{6(1-\varepsilon^2)^3 + 9(1-\varepsilon^2)(1-\varepsilon^4)\ln\varepsilon + 4(1-\varepsilon^6)\ln^2\varepsilon}{4[(1-\varepsilon^4)\ln\varepsilon + (1-\varepsilon^2)^2]^2}$$

In the limit of a circular channel ($a_f = 0$), Eqs. (27) and (28) become equivalent to Eqs. (17) and (18), respectively, because $$\lim_{\varepsilon \to 0} f_R(\varepsilon) = \lim_{\varepsilon \to 0} f_M(\varepsilon) = 1.$$

While the surface of the optical fiber 30 can be considered perfectly smooth, as mentioned earlier the silicon sidewalls etched with DRIE can have a scalloping structure with a mean height of ~0.25 μm. Such a rough surface can increase the flow resistance, which can be modeled through an increase in the viscosity of water or a decrease in the channel diameter. Based on measurements and calculations in G. M. Mala and D. Li, "Flow characteristics of water in microtubes," Int. J. Heat Fluid Flow, vol. 20, pages 142-148 (1999); and Y. Hu, C. Werner, and D. Li, "Influence of three-dimensional roughness on pressure-driven flow through microchannels," J. Fluids Eng., vol. 125, pages 871-879 (2003), the scalloping roughness (~0.25 μm) can increase the flow resistance by more than about 10%. Therefore, the optimum channel size may be adjusted to compensate for this effect.

Modeling Results

Sensor System Response

Figure 35A:
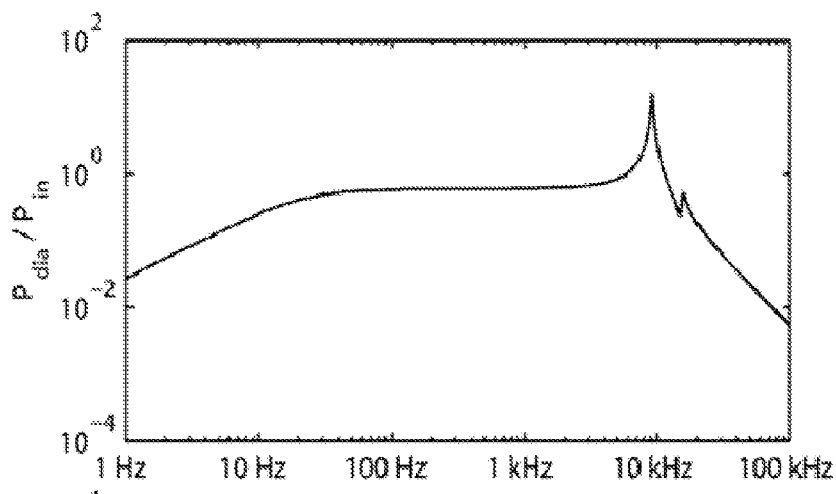
FIG. 35A shows an example calculated response curve of a first sensor as a function of frequency calculated with the lumped-element model.

In the example embodiment, the response of a first sensor (e.g., 300-μm-diameter diaphragm) over the frequency range of 1 Hz-100 kHz calculated with the lumped-element model is shown in FIG. 35A. The structural parameters of the first sensor design are summarized in Table I.

TABLE I

Structural dimensions of an example sensor within the sensor system

| Parameter | Value | Symbol |
| --- | --- | --- |
| Diaphragm radius (largest) | 150 μm | a |
| (intermediate) | 106 μm | |
| (smallest) | 75 μm | |
| Diaphragm thickness | 500 nm | h |
| Hole radius | 322 nm | $a_{hole}$ |
| PC radius | 25 μm | $a_{PC}$ |
| PC fill factor | 0.50 | A |
| Cavity length | 25 μm | l |
| Fiber radius | 62.5 μm | $a_f$ |
| Channel length | 100 μm | l |
| Backchamber radius | 3 mm | $a_{bc}$ |
| Backchamber length | 15 mm | L |

At low frequencies, with a high-pass cutoff at 25 Hz, water tends to flow through the holes of the photonic-crystal reflective element 22 instead of moving the diaphragm 20. The first sensor is insensitive to hydrostatic pressure variations, so that it can be used in, for example, deep-sea applications. At ~10 kHz, there is a resonance determined by the diaphragm mechanics and the additional water mass moving with it. The water mass can increase the effective mass of the diaphragm 20 by about 60 times, so that the resonance drops compared to operation in air. The resonance frequency can be determined from the high-frequency portion of the acoustic circuit in FIG. 34 as $w_0 = (M_0 C_0)^{-1/2}$, where $M_0 = M_{rad} + M_{dia} + M_{chan} + M_{bc}$ and $1/C_0 = 1/C_{dia} + 1/C_{bc}$. Between the cutoff and the resonance there is a wide useful flat band where most of the incident pressure drops across the diaphragm 20.

As described herein, the shared backchamber 65 allows cross coupling between sensors within the sensor system 200. As shown in FIG. 35A, in the form of an additional resonant feature at about 16 kHz. This frequency corresponds to the resonance of the second sensor (e.g., 212 μm diameter), and hence the resonant feature is a result of cross coupling from this sensor. There is no coupling from the third sensor (e.g., 150 μm diameter), which has a resonance at 23 kHz. The resonance frequency of the third sensor is substantially close to the Helmholtz frequency of the backchamber, which is $w_H = (M_{bc} C_{bc})^{-1/2} = \sqrt{3} c/L$, corresponding to 27 kHz. As disclosed herein, by designing the backchamber 65 and parallel sensors such that the resonances coincide to the vicinity of the Helmholtz resonance, coupling can be suppressed.

One limitation of the lumped modeling is that it does not account for the acoustic resonances that appear inside the backchamber 65 above $\omega = \pi c/L$, corresponding to about 50 kHz. These resonances affect the backchamber impedance such that it fluctuates from a low value to a high value in the vicinity of the resonance frequency. See, e.g., L. L. Beranek, Acoustics (American Institute of Physics, New York, 1986). This effect is not nearly as strong as the reduction of the impedance by the Helmholtz resonance. Although the variation of the backchamber impedance has a secondary effect on the sensor response, these resonances may be visible in the actual response spectrum, and hence are not desirable in certain embodiments. Such resonances can be reduced by similar methods used in loudspeaker enclosures: e.g., by lining the backchamber 65 with sound absorbing or impedance matching layers, so that standing waves are suppressed. The methods may be modified due to the small size of the backchamber 65 relative to typical loudspeaker enclosures.

Thermal Noise

Figure 35B:
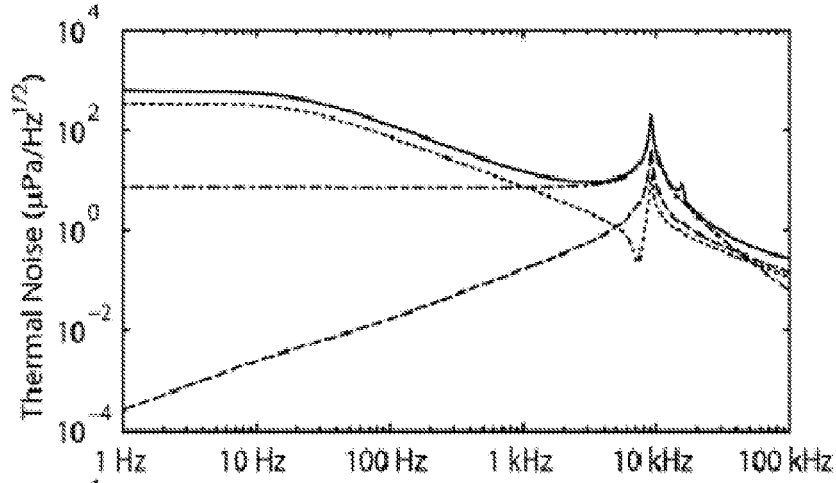
FIG. 35B shows the calculated noise spectrum (solid line) transferred to an example diaphragm showing contributions from radiation resistance (dashed line), hole resistance (dotted line), and channel resistance (dash-dotted line).
Figure 35C:
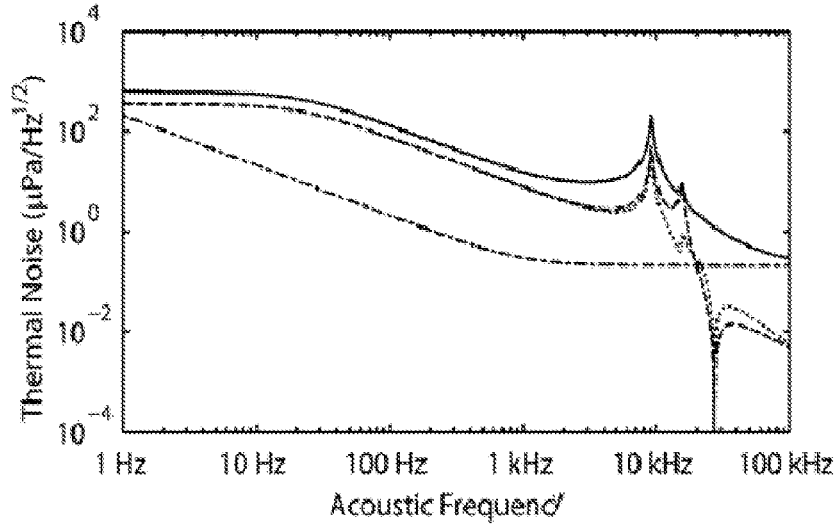
FIG. 35C shows the calculated noise spectrum (solid line) showing contributions from the noise coupling from a second sensor (dashed line) and a third sensor (dotted line), and optoelectronic noise (dash-dotted line) in an example sensor system in accordance with certain embodiments described herein.

FIG. 35B shows the total thermal noise (at 20° C.) transferred to the diaphragm 20, along with contributions from several dissipation channels, which are radiation loss (dashed line), flow through the holes of the photonic-crystal reflective element 22 (dotted line), and flow through the optical cavity 40 and annular channels (dash-dotted line). At low frequencies, the highly dissipative flow through the small holes of the photonic-crystal reflective element 22 can dominate the noise floor. Above about 1 kHz, the flow through the holes of the photonic-crystal reflective element 22 can be reduced substantially, so that the dissipation through the annular channels can dominate the noise. Above about 40 kHz, the motion of the diaphragm 20 re-radiates more energy than lost through other channels, so that the radiation loss can dominate the noise floor. A radiation-loss-limited noise floor is the fundamental minimum such a sensor system 200 can reach. FIG. 35C shows the total noise, along with the contributions from the second sensor (dashed line), and the third sensor (dotted line). The noise contribution from the second and third sensors is minimum at about 27 kHz, because the backchamber 65 is at its Helmholtz resonance, and prevents cross coupling between sensors, as explained above. A typical optoelectronic noise spectrum encountered in actual measurements is shown (dash-dotted line) for an optical finesse of ~10. The noise has a white-noise component dominated by the relative intensity noise (RIN) of the laser (−155 dB/Hz), and by a 1/f-noise component below 1 kHz.

Minimum Detectable Pressure

Figure 36A:
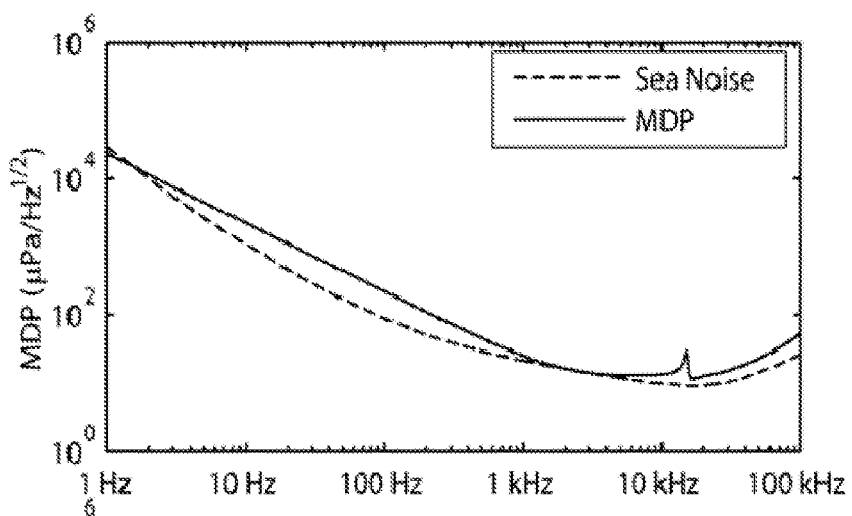
FIG. 36A shows the calculated minimum detectable pressure (MDP) as a function of frequency on an example diaphragm in accordance with certain embodiments with the minimum ambient noise in the sea shown for reference.
Figure 36B:
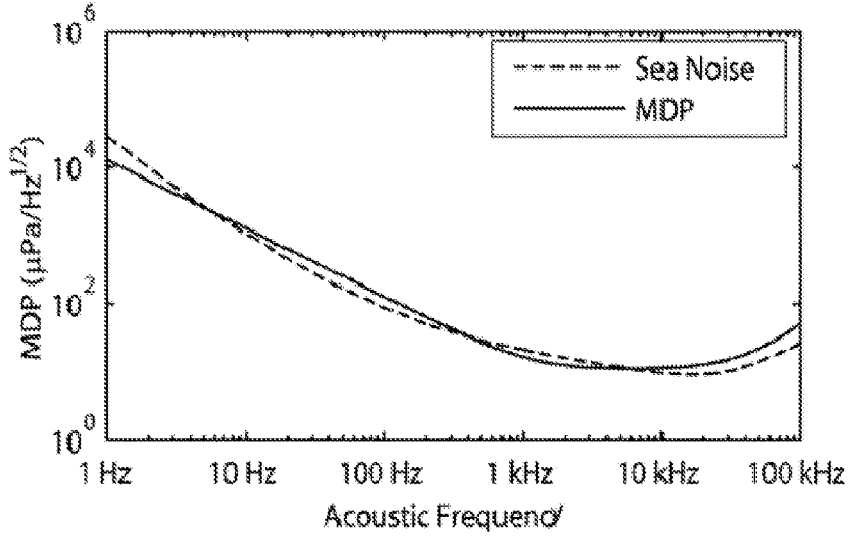
FIG. 36B shows the minimum detectable pressure as a function of frequency when two parallel sensors are non-operational.

The noise on the diaphragm 20 normalized to the response yields the minimum detectable pressure (MDP) shown in FIG. 36A. The MDP curve shows that there is substantially no resonance in the sensitivity in certain embodiments. Resonance effects can be cancelled out, other than the small resonant feature due to crosstalk. Because the noise floor is set by the thermal-mechanical noise of the sensor (self noise), the noise at resonance can be amplified too. Through design, the compliance of the sensor system 200 can be adjusted to a high value, so that self noise is dominant over optoelectronic noise. Although increasing the compliance makes the sensor system 200 more susceptible to Brownian motion, it increases the signal too. This can make the signal-to-noise ratio (SNR) ultimately larger compared to the case when the noise floor is set by the optoelectronic noise. The fundamental limit of the SNR can be reached by employing this method. In one way, the sensitivity of the sensor system 200 is increased by making the sensor system 200 noisier. Since in this case the signal and noise are from the same source (acoustic), the resonances in the noise and signal cancel out, so that no peak in the MDP is observed in FIG. 36A. In this embodiment, the MDP curve was optimized to match the minimum ambient noise level of the ocean by tuning various parameters such as the channel lengths, backchamber volume, and number of holes in the photonic-crystal structure (see Table I). The match between the calculated MDP curve and the ocean noise gives this sensor system 200 one of the highest possible sensitivity over a very wide frequency range of at least 1 Hz-100 kHz. An even better match can be obtained, as shown in FIG. 36B, when only one sensor is employed.

Dynamic Range

Among the three diaphragms 20 within the sensor system 200, the largest diaphragm 20 (e.g., 300 µm diameter) is generally the most fragile one. Therefore, the pressure range of safe operation for the sensor system 200 may be limited by the fracture strength of this diaphragm 20. The maximum pressures the sensor system 200 can be exposed to without damaging the diaphragm 20 is ~1 MPa (240 dB re. 1 µPa), for a 1 GPa yield strength, (see, e.g., W. N. Sharpe, Jr., K. Jackson, K. J. Hemker, and Z. Xie, "*Effect of specimen size on Young's modulus and fracture strength of polysilicon*," J. Micromech. Syst., vol. 10, pages 317-326 (2001)), and assuming the holes of the photonic-crystal reflective element 22 do not act as crack-propagation points. However, in certain embodiments, at such large pressures it may be challenging to calibrate the sensor system 200 due to turbulent flow and possible cavitation. In certain embodiments, cavitation effects may also damage the sensor system 200 at lower pressures than the fracture limit of the diaphragm 20, reducing the maximum safe pressure. In seawater, cavitation can occur at pressures as low as about 0.18 MPa (measured at about 10 kHz at a depth of 10 m). See, e.g., V. A. Akulichev and V. I. Il'ichev, "*Acoustic cavitation thresholds of sea water in different regions of the world ocean*," Acoust. Phys., vol. 51, pages 128-138 (2005). The maximum safe pressure can be reduced to ~220 dB.

Figure 37A:
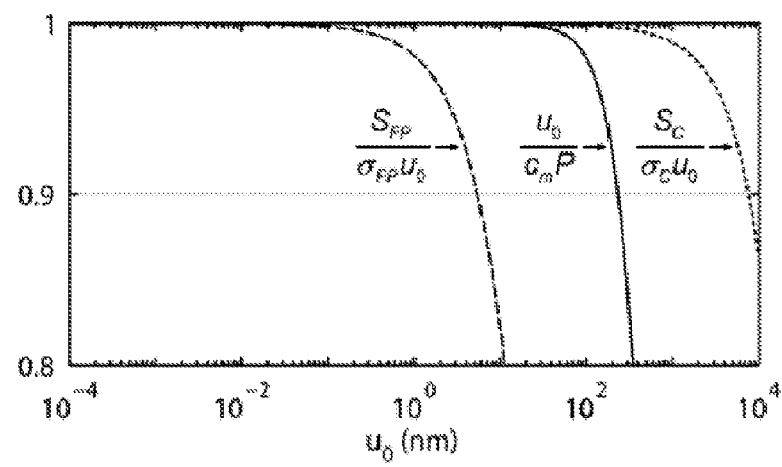
FIG. 37A shows the calculated linearity as a function of diaphragm displacement, showing the normalized linearities of the diaphragm displacement (solid line), Fabry-Perot response (dashed line), and power coupled back into the optical fiber (dotted line).

For high-performance applications, the limiting factor in the dynamic range, in certain embodiments, may be the linearity of the sensor system response. FIG. 37A shows the calculated linearity of the optical signal and the diaphragm displacement. Because the values are normalized, they are independent of the diaphragm size. $S_{FP}$ is the optical signal amplitude from the Fabry-Perot optical cavity 40. In the linear regime, this amplitude is proportional to the diaphragm displacement amplitude $u_0$ through a constant such that $S_{FP}=\sigma_{FP}u_0$. The plot in FIG. 37A assumes an optical finesse of ~10 (referring to the finesse of a fiber Fiber-Fabry interferometer, which is different from the finesse of a free-space Fabry-Perot cavity. See, e.g., O. Kilic, M. Digonnet, G. Kino, and O, Solgaard, "*Asymmetrical spectral response in fiber Fabry-Perot interferometers*," J. Lightwave Technol., vol. 28, pages 5648-5656 (2009). Although Fabry-Perot detection provides the high displacement sensitivity to detect small pressure amplitudes, its linearity may be limited. For pressure amplitudes of only ~5 nm, the linearity of the Fabry-Perot optical cavity 40 can drop to 90%. Such a nonlinearity in certain embodiments can cause harmonic distortion in the sensor system signal. Although the factors for the linearity of the sensor system response can vary depending on the specific application, the sensor system dynamic range for certain embodiments disclosed herein is calculated for a total harmonic distortion (THD) of about −30 dB. To determine the THD for a given pressure, the amplitude of a pure sine wave is distorted with the linearity curves of FIG. 37A. A Fourier transform of this distorted wave yields the power spectrum of the harmonics. The THD is calculated by dividing the total power in higher harmonics to the power in the fundamental harmonic.

Figure 37B:
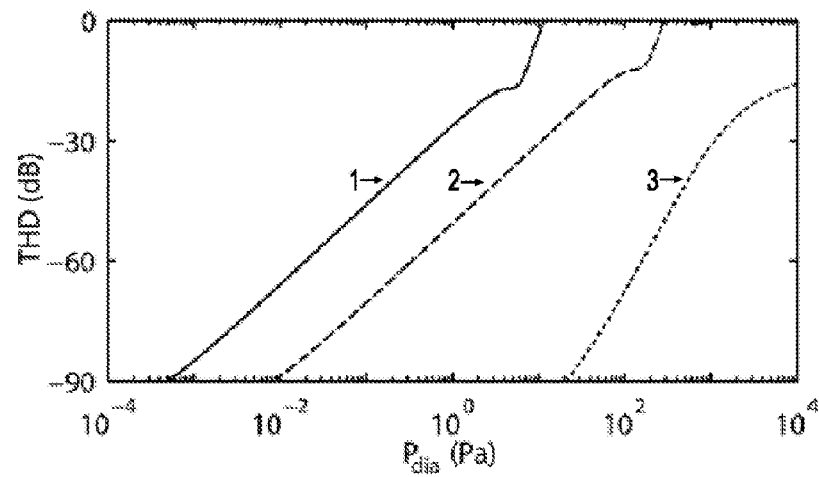
FIG. 37B shows the total harmonic distortion (THD) as a function of pressure amplitude for a first sensor (solid line), a second sensor (dashed line), and a third sensor (dotted line) in a sensor system in accordance with certain embodiments described herein.

For the first sensor within the sensor system 200, a pressure amplitude of about 0.6 Pa (115 dB) introduces a THD of about −30 dB as shown in FIG. 37B. The minimum pressure the first sensor can detect in a 1-Hz bandwidth is ~10 µPa (20 dB). Therefore, the first sensor can address pressures limited to the range of about 20 dB to 115 dB. As disclosed herein, it is possible to increase this dynamic range by utilizing a second sensor and a third sensor. Although all three sensors within the sensor system 200 measure the same acoustic signal, they are optically decoupled. Therefore, the optical parameters, such as finesse, can be varied for the second and third sensors without compromising the high sensitivity of the first sensor. The optical finesse of the second sensor can be reduced to ~1, corresponding essentially to two-beam interference. The smaller compliance and reduced finesse allow detection of larger signals at the expense of sensitivity, providing a pressure range of about 35 dB to 140 dB for this sensor.

As disclosed herein, the optically decoupled sensors within the sensor system 200 allow even greater freedom in tailoring the optical detection schemes. For example, in certain embodiments, the third sensor does not require a high displacement sensitivity, since it is designed to measure large signals. Therefore, as described herein, another optical detection scheme that has less sensitivity but more linearity than the Fabry-Perot detection can be employed. For example, an optical fiber without a reflective element on its end is used, so that there is no significant reflection from its end face (silica-water interface reflection is less than 0.3%). In this embodiment, optical interference is prevented. The diaphragm displacement is detected instead by measuring the optical power coupled back into the fiber. This coupling changes with the spacing of the optical cavity 40 because of the diffraction of the light emerging from the tip of the optical fiber 30. See, e.g., O. Kilic, M. Digonnet, G. Kino, and O, Solgaard, "*Asymmetrical spectral response in fiber Fabry-Perot interferometers*," J. Lightwave Technol., vol. 28, pages 5648-5656 (2009). In the linear regime, the signal coupling amplitude is proportional to the diaphragm-displacement amplitude through a constant $\sigma_c$, such that $S_C=\sigma_C u_0$. With this detection scheme, the limiting factor can be the linearity of the diaphragm displacement, as shown in FIG. 37A. Due to the poor sensitivity of this scheme, the minimum displacement that the third sensor can measure is limited by the RIN. This is in contrast to the Fabry-Perot detection employed in the first sensor and the second sensor, where the limitation is mainly the self noise of the sensor. The third sensor within the sensor system 200 can detect pressures in the range of about 80 dB to 180 dB. Therefore, this example demonstrates as disclosed herein, with the utilization of parallel sensors, the sensor system 200 can be capable of a dynamic range of about 160 dB (20 dB to 180 dB), limited in certain embodiments, only by the linearity of the diaphragm displacement with pressure.

The dynamic ranges of the first sensor and the third sensor can overlap by about 35 dB (80 dB to 115 dB). Therefore, in certain embodiments, the second sensor may not be utilized for applications utilizing a THD of −30 dB. However, for THD levels below −65 dB, the dynamic ranges of the first sensor and the third sensor may not overlap at all because the slopes of the THD curves as shown in FIG. 37B for the first sensor and the third sensor are substantially different. For the power-coupling detection, the change in THD with respect to the pressure amplitude may be twice as fast as for the Fabry-Perot-detection (about 30 dB/16 dB vs. about 30 dB/32 dB), so that the overlap between the dynamic ranges can gradually decrease for lower THD. As a result, for applications utilizing a THD of around −60 dB or better, the second sensor within the sensor system 200 can be used so that there is sufficient overlap between the dynamic ranges. As an example, the dynamic ranges for a −70 dB THD are about 20 dB-75 dB, about 35 dB-100 dB, and about 80 dB-160 dB for the first sensor, the second sensor, and the third sensor, respectively.

Under certain conditions, the lower and upper limits of the pressure ranges can be different. For the lower limits, a 1-Hz detection bandwidth can be assumed. Therefore, for larger bandwidths, the MDP for each sensor can be increased, hence the dynamic range can be reduced. This reduction also can reduce the overlap in the pressure ranges of the parallel sensors within the sensor system 200. As an example, even for a large measurement bandwidth of about 100 Hz, there is still an overlap of about 15 dB between the first sensor and the third sensor in a −30 dB THD regime. However, for a slightly more stringent THD of better than −40 dB, the overlap may not be sufficient so that the second sensor can be used also to cover the complete dynamic range. For the upper limits, it is assumed that no turbulent flow occurs, so that the analytical model based on laminar flow is still valid. Turbulent flow can occur in microfluidic channels for Reynolds numbers (Re) larger than 1500. See, e.g., K. V. Sharp and R. J. Adrian, "*Transition from laminar to turbulent flow in liquid filled microtubes*," Exp. Fluids, vol. 36, pages 741-747 (2004); and C. Rands, B. W. Webb, and D. Maynes, "*Characterization of transition to turbulence in microchannels*," Int. J. Heat Mass Transfer, vol. 49, pages 2924-2930 (2006).

Figure 38:
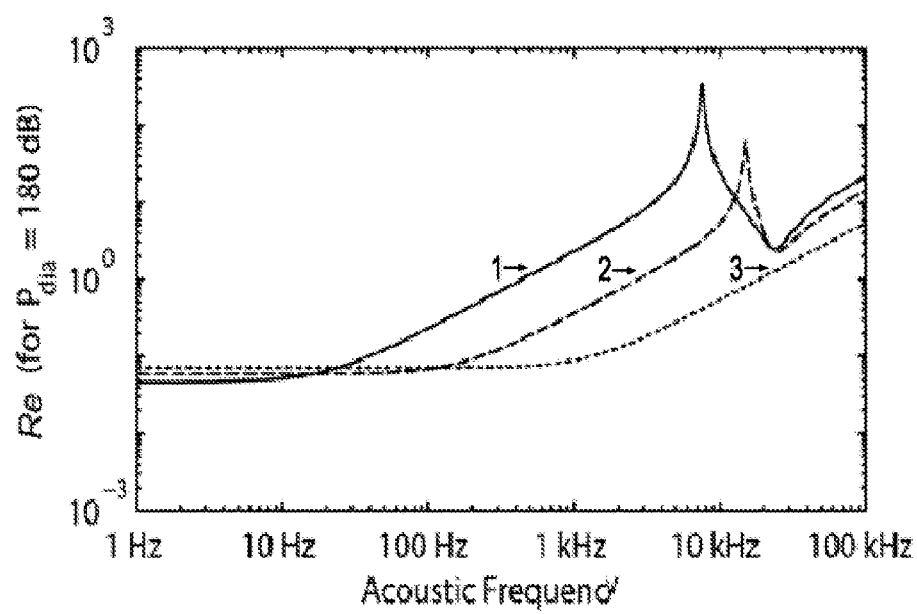
FIG. 38 show Reynolds number as a function of frequency for annular channels for a first sensor (solid line), a second sensor (dashed line), and a third sensor (dotted line) in a sensor system in accordance with certain embodiments described herein.

An advantage of the analytical model described herein is that it allows the calculation of the flow rate through each diaphragm-sized channel 90. Since the Reynolds numbers are proportional to the flow rate, it is possible to analyze various parts of the sensor system 200 to obtain the flow characteristics. The first places for turbulent flow to set on are the annular channels (e.g., diaphragm-size channels 90), because they can accommodate all the flow (unlike, e.g., the optical cavity 40) despite their relatively small hydraulic diameters. FIG. 38 shows the Reynolds number for the three flow channels 90 for a constant pressure of about 180 dB incident on the third sensor of the sensor system 200. The Reynolds numbers were calculated at different frequencies, and the incident pressure was varied so that the pressure on the smallest diaphragm (e.g., 150 µm diameter) was constant at the maximum assumed range of the sensor system 200 (about 180 dB).

In this embodiment, the results shown in FIG. 38 indicate that within the dynamic range of the sensor system 200 no turbulent flow is expected, hence the laminar-flow model and the upper limits of the pressure ranges it predicts are valid. In certain embodiments, the dynamic range cannot be increased substantially because of turbulence. Even with more linear diaphragm structures and displacement sensing mechanisms, the dynamic range can be ultimately limited by turbulent flow.

Experimental Characterization of Example Optical Acoustic Sensor System

Figure 39:
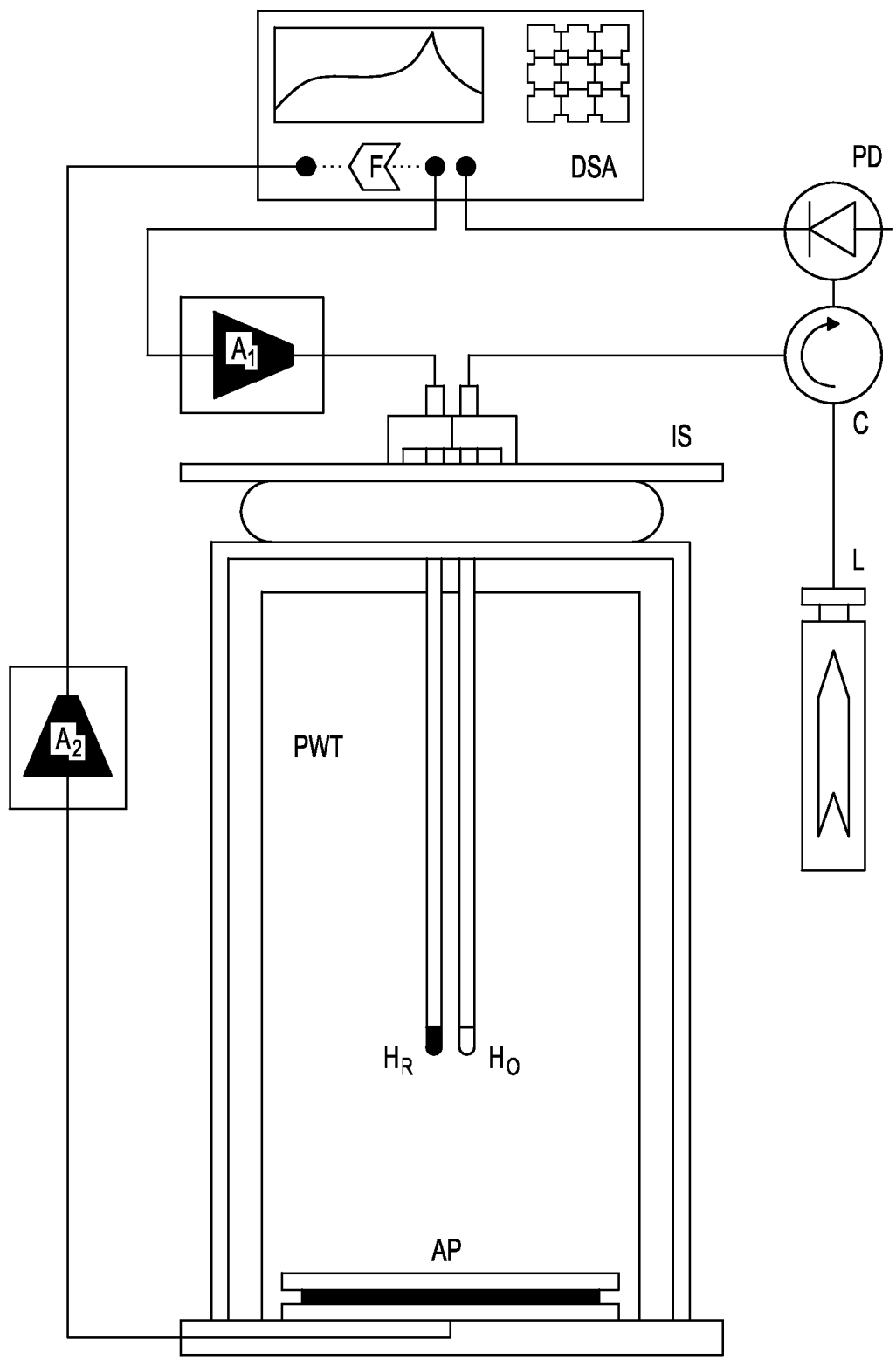
FIG. 39 schematically illustrates an example setup to characterize example sensor systems in accordance with certain embodiments described herein.

The example optical sensor system 200 was characterized inside a container filled with distilled water, in the setup shown in FIG. 39. The optical sensor system 200 was interrogated by a fiber-coupled laser with a wavelength of 1550 nm. The laser light first passed through an optical circulator, which fed the light to the optical sensor system 200 and directed the reflected light from the sensor system 200 to a photoreceiver (e.g., New Focus 2053-FC). The photoreceiver consisted of an indium-gallium-arsenide PIN photodiode, a gain stage set to 10, and a high-pass filter set to 10 Hz.

The optical sensor system 200 was calibrated with a reference sensor system (e.g., Celesco LC-10). The reference sensor system had a lead-zirconate-titanate reflective element 22, with a calibrated sensitivity of about 39.8 µV/Pa in a wide frequency range of about 0.1 Hz to 120 kHz. The reference sensor system 200 was connected to a low-noise preamplifier (e.g., Ithaco 1201) with a gain of about 10 and a high-pass cutoff of about 10 Hz.

The electrical outputs of the two sensor systems were connected to a dynamic signal analyzer (DSA) (e.g., HP 3562A), which converted the raw signal into various data such as frequency response, coherence, noise spectrum, and total-harmonic distortion. The DSA also had a built-in signal source that was used to drive the sound source. The drive signal from the DSA was fed to a wideband power amplifier (e.g., Krohn-Hite 7500) connected to the sound source. The sound source was an acoustic projector consisting of a rigid circular piston (e.g., USRD C100) with a diameter matching the container diameter of 20 cm. Sound was generated by moving the water column in the cylinder-shaped container up and down. The measured signal from the reference sensor system was fed through an internal feedback circuit in the DSA to the signal source to continuously adjust the output of the sound source. This was done to keep the pressure amplitude incident on the sensor systems at a constant 1 Pa throughout the frequency range. A constant incident pressure provided a smoother frequency response for both sensor systems, yielding a more accurate calibration of the optical sensor system 200.

The two sensor systems were mounted on a vibration-isolation stage that comprised of a metal plate resting on a slightly deflated air-filled rubber cushion with a torus shape. The metal container was in the form of a plane-wave tube with a height of about 56 cm. The cutoff frequency of the first cross mode was expected to be ~4 kHz. Therefore, standing-wave resonances were present in the tube above this frequency. Any effect these resonances could have on the calibration process was suppressed in two ways: The two sensor systems were mounted close to each other (<1 cm distance), and for higher frequencies, an additional metal tube with a smaller diameter of 2.5 cm was used in the setup. The tube was covered on the outside with a standard pipe-heat isolation material consisting of 0.95-cm-thick polyethylene with closed air pockets. The isolation material provided a good acoustic isolation from the container resonances, due to the large impedance mismatch between air pockets and water. The smaller diameter of the tube provided a higher cross-mode cutoff of ~35 kHz, yielding a smoother response for frequencies above about 1 kHz.

Figure 40:
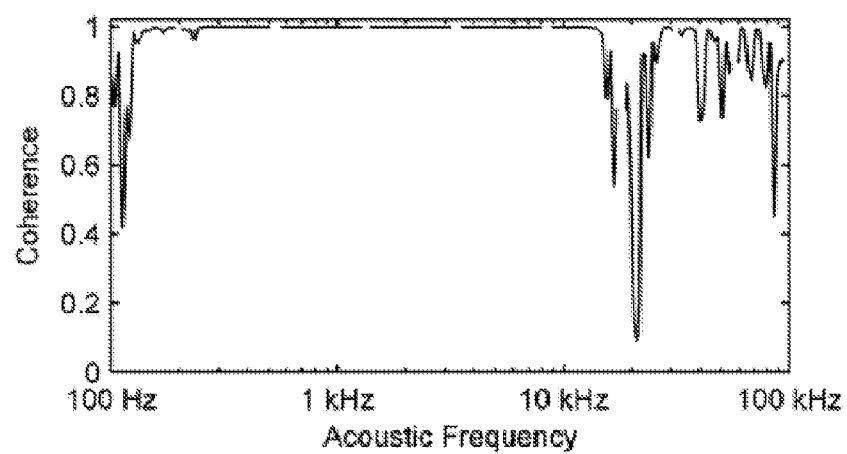
FIG. 40 shows the coherence between a reference sensor system and an example sensor system in accordance with certain embodiments described herein.
Figure 41A:
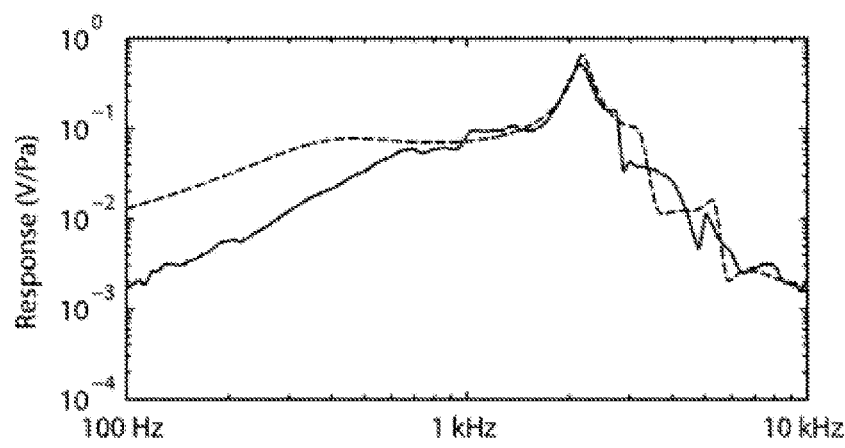
FIG. 41A shows the measured frequency response for an example sensor system (solid line) and a theoretical fit (dashed line).

The coherence between the reference and optical sensor system spectra, measured with the DSA, is shown in FIG. 40. FIG. 40 indicates that the two sensor system signals are strongly correlated from ~150 Hz to ~15 kHz. The weak correlation above kHz suggests that the optical sensor system signal is dominated by noise. FIG. 41A shows the measured frequency response of the optical sensor system 200. The frequency response is calculated by the DSA by dividing the power spectrum of the optical sensor system 200 (in units of V), to the power spectrum of the calibrated reference sensor system (in units of Pa). The response has a resonance at ~2.2 kHz. Above the resonance frequency, the response gradually drops, approaching the noise level above ~10 kHz, so that the coherence degrades.

Figure 41B:
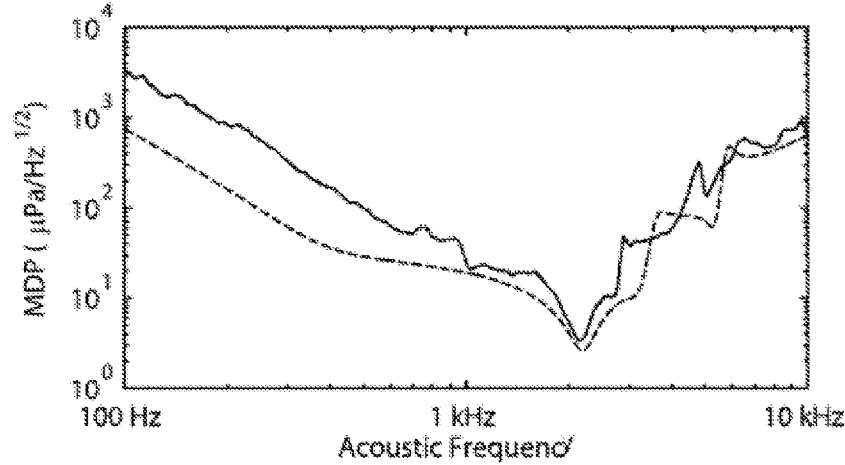
FIG. 41B shows the measured minimum detectable pressure (MDP) for an example sensor system (solid line) and a theoretic fit (dashed line).

The resonance for the sensor system 200 occurs at a rather low frequency, deviating from the calculated values (2.2 kHz instead of 10 kHz). Among various reasons, such as a slightly larger and less stiff diaphragm 20 caused by fabrication errors, an important reason as described herein is trapped air in the backchamber 65. The exact size of the air bubble was not measured, but visually estimated to be on the order of about 1-2 mm through a semitransparent part of the sensor head. The theoretical fit in FIG. 41A was obtained with the analytical model for an air bubble with an equivalent radius of 1 mm. FIG. 41B shows the experimental MDP of the sensor system 200 with a theoretical fit also obtained with the model. As mentioned above, the sensor system 200 is able to measure pressures as low as 3.5 µPa/Hz$^{1/2}$ for a frequency range of 100 Hz to 10 kHz provided by the increased compressibility in the backchamber 65 caused by the trapped air.

Figure 42:
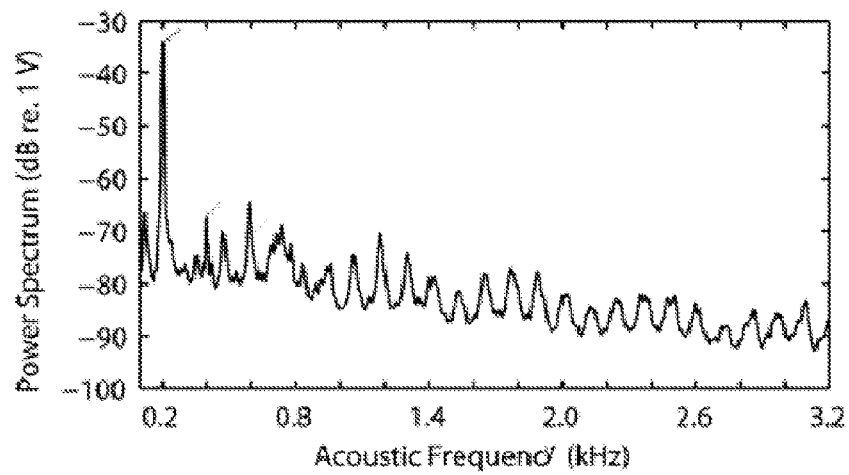
FIG. 42 shows the measure power spectrum of an example sensor system in accordance with certain embodiments described herein.

To measure the linearity of the sensor system response, the acoustic source was driven at 200 Hz, and the power spectrum of the optical sensor system 200 was measured. The incident pressure at 200 Hz was measured as 4 Pa with the calibrated reference sensor system. FIG. 42 shows the measured power spectrum of the optical sensor system 200. It shows that the signal from the fundamental harmonic is substantially strong, despite the relatively large incident power (e.g., saturation is weak). The DSA measured a THD of −29 dB, proving that the response of the sensor is very linear.

Various embodiments have been described above. Although the invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An acoustic sensor comprising:
   a reflective element;
   an optical fiber positioned relative to the reflective element such that light emitted from the optical fiber is reflected by the reflective element, wherein a first end of the optical fiber and the reflective element form an optical cavity therebetween, the optical cavity comprising a medium having a refractive index change with temperature; and
   an element within the optical cavity having a coefficient of thermal expansion and thickness that compensate the refractive index change with temperature.

2. The acoustic sensor of claim 1, wherein the medium is water.

3. The acoustic sensor of claim 2, wherein the element within the optical cavity comprises silica and has a thickness approximately equal to a distance between the first end of the optical fiber and the reflective element.

4. The acoustic sensor of claim 1, wherein the element within the optical cavity is a diaphragm comprising the reflective element.

5. The acoustic sensor of claim 4, wherein the element within the optical cavity is mechanically coupled to the optical fiber.

6. The acoustic sensor of claim 1, wherein at least a portion of the light reflected by the reflective element propagates into the optical fiber.

7. The acoustic sensor of claim 1, wherein the first end of the optical fiber comprises a second reflective element, the second reflective element and the reflective element forming a Fabry-Perot cavity therebetween.

8. The acoustic sensor of claim 1, wherein the element within the optical cavity comprises silica.

9. The acoustic sensor of claim 1, wherein the element within the optical cavity is spaced from the reflective element.

10. The acoustic sensor of claim 1, wherein the reflective element comprises a photonic-crystal structure.

11. The acoustic sensor of claim 1, wherein the element within the optical cavity comprises a diaphragm comprising the reflective element.

12. The acoustic sensor of claim 11, wherein the diaphragm comprises silica having a thickness approximately equal to a distance between the first end of the optical fiber and the diaphragm.

13. The acoustic sensor of claim 11, further comprising a structural element mechanically coupling the reflective element and the optical fiber, wherein the structural element comprises silica.

14. The acoustic sensor of claim 13, wherein the optical fiber comprises fused silica and the structural element comprises fused silica.

15. The acoustic sensor of claim 11, wherein the diaphragm has a lateral dimension and a ratio of the lateral dimension to the optical fiber diameter is in a range between 1.2 and 8.

16. The acoustic sensor of claim 11, wherein the diaphragm has a movable portion having an area and a ratio of the area to a cross-sectional area of the optical fiber is in a range between 1.4 and 64.

17. The acoustic sensor of claim 11, wherein the diaphragm comprises one or more fluid conduits.

18. The acoustic sensor of claim 17, wherein the one or more fluid conduits are separate from the reflective element.

19. The acoustic sensor of claim 1, wherein the medium is a liquid.

20. The acoustic sensor of claim 19, further comprising at least one generally compressible and generally elastic element.

21. The acoustic sensor of claim 20, wherein the at least one generally compressible and generally elastic element is a gas bubble.

* * * * *

UNITED STATES PATENT AND TRADEMARK OFFICE
CERTIFICATE OF CORRECTION

PATENT NO.         : 8,542,956 B2                                Page 1 of 1
APPLICATION NO.    : 13/047668
DATED              : September 24, 2013
INVENTOR(S)        : Onur Can Akkaya et al.

It is certified that error appears in the above-identified patent and that said Letters Patent is hereby corrected as shown below:

In the Specification

In column 7, line 36, please replace "microns," with -- 5 microns, --.

Signed and Sealed this
Thirteenth Day of May, 2014

Michelle K. Lee
*Deputy Director of the United States Patent and Trademark Office*